(12) United States Patent
Duval

(10) Patent No.: US 7,798,035 B2
(45) Date of Patent: Sep. 21, 2010

(54) MECHANICAL ARM INCLUDING A COUNTER-BALANCE

(76) Inventor: Eugene F. Duval, 2141 Camino a Los Cerros, Menlo Park, CA (US) 94025

( * ) Notice: Subject to any disclaimer, the term of this patent is extended or adjusted under 35 U.S.C. 154(b) by 92 days.

(21) Appl. No.: 12/103,891

(22) Filed: Apr. 16, 2008

(65) Prior Publication Data

US 2008/0277552 A1 Nov. 13, 2008

Related U.S. Application Data

(63) Continuation of application No. 10/443,459, filed on May 22, 2003, now Pat. No. 7,428,855.

(60) Provisional application No. 60/382,654, filed on May 23, 2002, provisional application No. 60/382,497, filed on May 22, 2002.

(51) Int. Cl.
    *B25J 17/00* (2006.01)
(52) U.S. Cl. ............... 74/490.01; 74/490.05; 901/48
(58) Field of Classification Search ........... 74/490.01, 74/490.05; 414/719; 901/48
    See application file for complete search history.

(56) References Cited

U.S. PATENT DOCUMENTS

| | | | |
|---|---|---|---|
| 316,459 A | 4/1885 | How ........................ 248/586 |
| 428,249 A | 5/1890 | Harfield .................... 114/162 |
| 1,459,650 A | 6/1923 | Burnett ...................... 74/508 |
| 2,293,437 A | 4/1942 | La Coste et al. ........... 265/1.4 |
| 2,605,494 A | 7/1950 | Lyons, Jr. et al. ............ 16/1 |
| 3,194,343 A | 7/1965 | Sindlinger .................. 185/10 |
| 3,487,716 A | 1/1970 | Hirst ......................... 74/516 |
| 3,782,355 A | 1/1974 | Hamman ................. 123/185.3 |
| 4,019,490 A | 4/1977 | Reese ..................... 123/185.2 |
| 4,378,959 A | 4/1983 | Susnjara ................... 414/732 |
| 4,480,605 A | 11/1984 | Bloemers ................ 123/185.3 |
| 4,500,251 A | 2/1985 | Kiryu et al. ............... 414/719 |
| 4,546,233 A | 10/1985 | Yasuoka ................. 219/125.1 |
| 4,592,697 A | 6/1986 | Tuda et al. ................ 414/719 |
| 4,598,601 A | 7/1986 | Molang ..................... 74/469 |
| 4,685,648 A | 8/1987 | Dobner et al. ............. 248/572 |
| 4,753,128 A | 6/1988 | Bartlett et al. ............. 74/469 |
| 4,784,010 A | 11/1988 | Wood et al. ................ 74/479 |
| 4,953,748 A | 9/1990 | Wheelock .................. 221/59 |
| 5,435,515 A | 7/1995 | DiGiulio et al. ........... 248/576 |
| 5,807,377 A | 9/1998 | Madhani et al. ............. 606/1 |
| 5,976,122 A | 11/1999 | Madhani et al. ............. 606/1 |
| 6,371,592 B1 | 4/2002 | Otsuka et al. .............. 347/19 |
| 6,419,221 B1 | 7/2002 | Spall ....................... 271/31.1 |
| 6,434,851 B1 | 8/2002 | Nishina ...................... 33/559 |
| 6,474,637 B1 | 11/2002 | Spall et al. ................ 271/160 |

OTHER PUBLICATIONS

Tuijthof, G.J.M., et al., "Design, actuation and control of an anthropomorphic robot arm," *Mechanism and Machine Theory*, vol. 35C, 2000, Elsevier Science, Ltd., pp. 945-962.

*Primary Examiner*—William C Joyce
(74) *Attorney, Agent, or Firm*—Fliesler Meyer LLP

(57) ABSTRACT

A mechanical arm comprises a forearm, a spring, and an upper arm disposed between the forearm and the spring, wherein the forearm applies a moment to the upper arm. A copying device associated with the upper arm copies a force associated with the moment to the spring. The spring is adapted to apply a counter-force resisting at least a portion of the moment to reduce a torque for urging the forearm.

17 Claims, 61 Drawing Sheets

Gravity Counterbalance
Free Body Diagram

Helical Spring Force Deflection Curves

Rotary Link
Gravity Counterbalance Mechanism

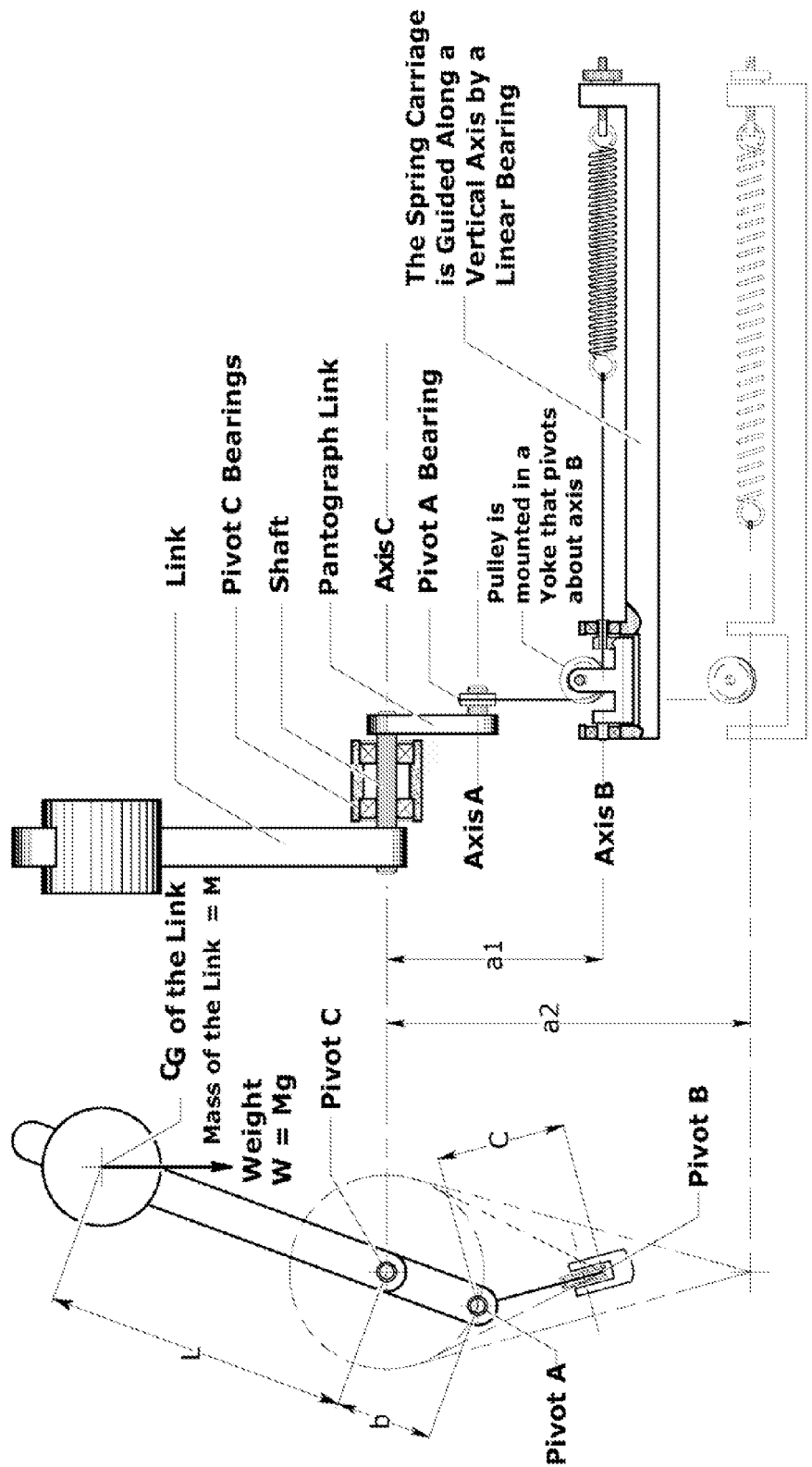

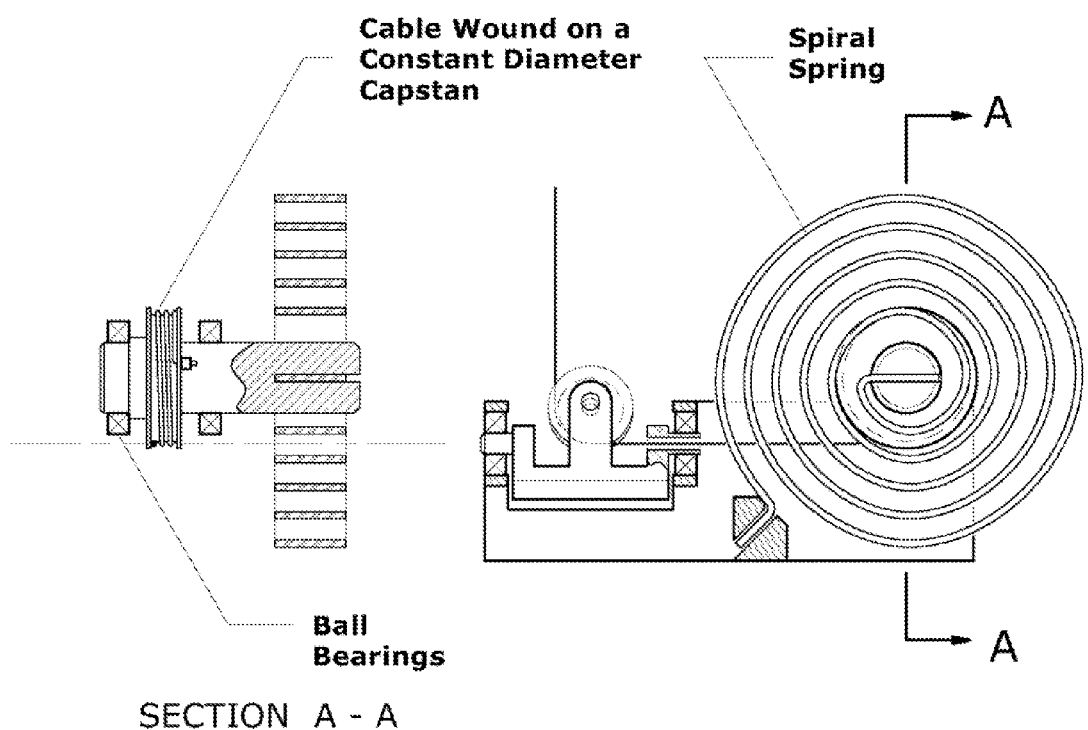
SECTION A - A
Figure 05b  Figure 05a
Spiral Spring
Mechanism

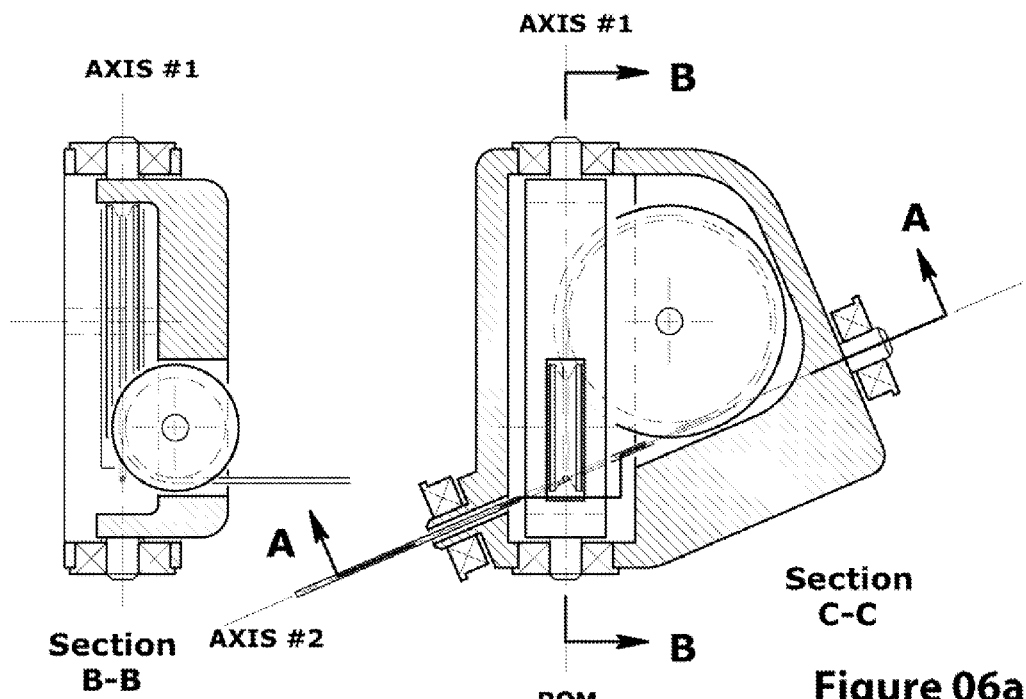
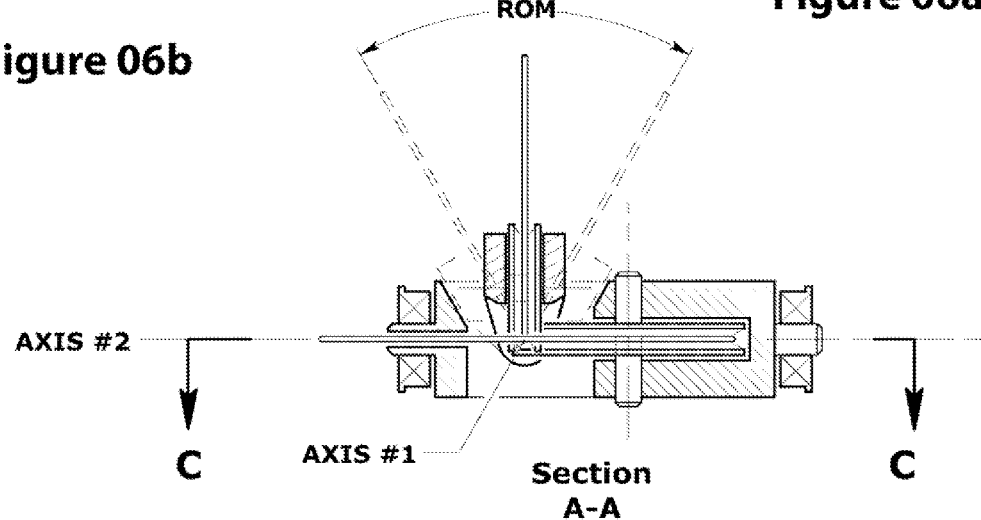
Figure 06c
Two Degree of Freedom
Cable Gimbal Mechanism

This end of the cable goes to the U-joint on the counterbalanced link

This end of the cable goes to the counterbalance spring

ROM

All pulleys are mounted in a yoke that pivots about this axis

Two Degree of Freedom Cable Gimbal with Meshing Pulleys

ROM

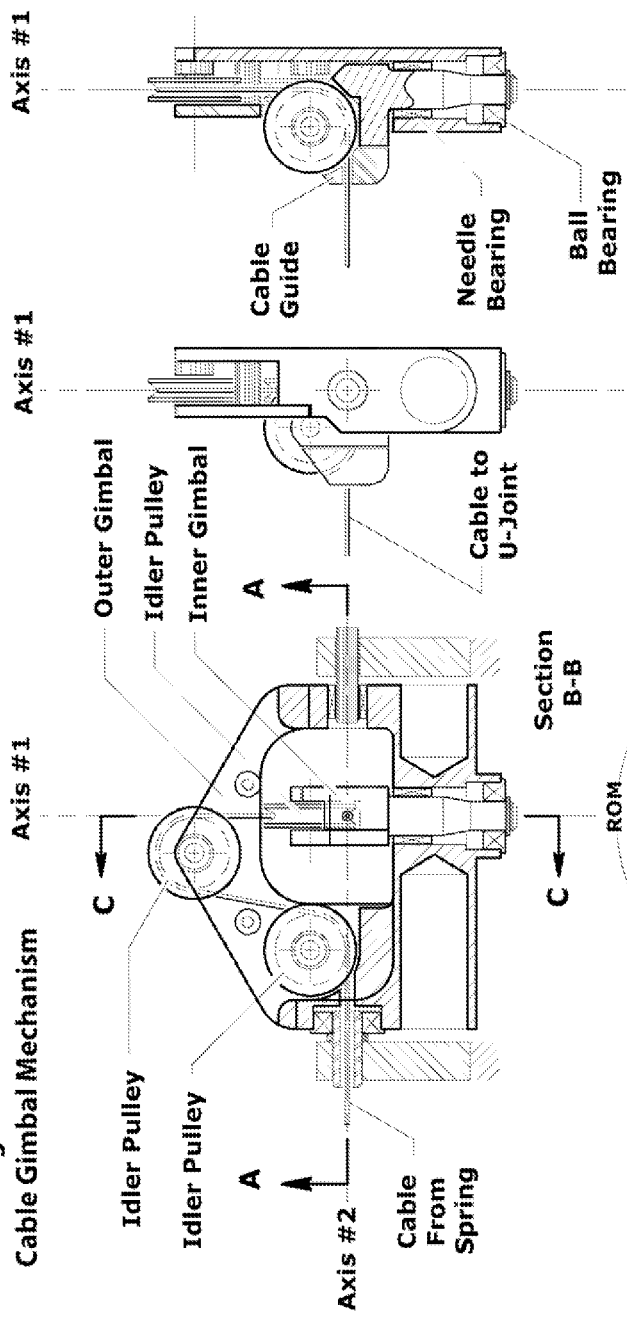

Manual Adjustment

Motorized Adjustment

Free Body Diagram of the
Counterbalance Adjustment Force

A graph of force $F_1$ required to adjust the counterbalance mechanism as a function of Dimension "a"

A graph of force $F_1$ as a function of Dimension "p"

Load Adjustment Counterbalance

Free Body Diagram of Spiral Pulley #1 With a Sliding Pivot

Figure 14 a – Equations for a Sliding Pivot Spiral Pulley

| | A | B | C | D | E | F | G | H | I | J | K | L |
|---|---|---|---|---|---|---|---|---|---|---|---|---|
| 1 | | Alpha | Delta Alpha | Beta 0 | Beta n | Theta | Beta n | Omega | K1 | F1 | Tau | a |
| 2 | | Pulley Angle | Step Angle | | | Link Angle | | Cable Wrap Angle | Spring Constant | Force | Pulley Torque | |
| 3 | | degrees | degrees | radians | radians | radians | degrees | degrees | lbf/in | lbf. | in-lbf | inch |
| 4 | Initial Conditions | 0 | 0.1 | | | =PI()/2 | | | 14.4 | | | |
| 5 | Calculated Initial Conditions | | | =ATAN(Z5/R6)-ATAN(O6/N6) | | | | | | | =90 | |
| 6 | | =B4 | =C4 | =D5 | =ATAN(Z6/R6)-ATAN(O6/N6) | =F4 | =E6*180/PI() | =B6+G5-(D6*180/PI()) | =I4 | | =K5 | =((K6*COS(E6))/(I6*S6))+(M6*COSF6)) |
| 7 | | =B6+C6 | =C6 | =D6 | =ATAN(Z7/R7)-ATAN(O7/N7) | =F6 | =E7*180/PI() | =B7+G7-(D7*180/PI()) | =I6 | | =K6 | =((K6*COS(E6))/(I6*S6))+(M6*COSF6)) |
| 8 | | =B7+C7 | =C7 | =D7 | =ATAN(Z8/R8)-ATAN(O8/N8) | =F7 | =E8*180/PI() | =B8+G8-(D8*180/PI()) | =I7 | | =K7 | |
| 9 | | =B8+C8 | =C8 | =D8 | =ATAN(Z9/R9)-ATAN(O9/N9) | =F8 | =E9*180/PI() | =B9+G9-(D9*180/PI()) | =I8 | | =K8 | |
| 10 | | =B9+C9 | =C9 | =D9 | =ATAN(Z10/R10)-ATAN(O10/N10) | =F9 | =E10*180/PI() | =B10+G10-(D10*180/PI()) | =I9 | | =K9 | |
| 11 | | =B10+C10 | =C10 | =D10 | =ATAN(Z11/R11)-ATAN(O11/N11) | =F10 | =E11*180/PI() | =B11+G11-(D11*180/PI()) | =I10 | | =K10 | |
| 12 | | =B11+C11 | =C11 | =D11 | =ATAN(Z12/R12)-ATAN(O12/N12) | =F11 | =E12*180/PI() | =B12+G12-(D12*180/PI()) | =I11 | | =K11 | |
| 13 | | =B12+C12 | =C12 | =D12 | =ATAN(Z13/R13)-ATAN(O13/N13) | =F12 | =E13*180/PI() | =B13+G13-(D13*180/PI()) | =I12 | | =K12 | |
| 14 | | =B13+C13 | =C13 | =D13 | =ATAN(Z14/R14)-ATAN(O14/N14) | =F13 | =E14*180/PI() | =B14+G14-(D14*180/PI()) | =I13 | | =K13 | |
| 15 | | =B14+C14 | =C14 | =D14 | =ATAN(Z15/R15)-ATAN(O15/N15) | =F14 | =E15*180/PI() | =B15+G15-(D15*180/PI()) | =I14 | | =K14 | |
| 16 | | =B15+C15 | =C15 | =D15 | =ATAN(Z16/R16)-ATAN(O16/N16) | =F15 | =E16*180/PI() | =B16+G16-(D16*180/PI()) | =I15 | | =K15 | |
| 17 | | =B16+C16 | =C16 | =D16 | =ATAN(Z17/R17)-ATAN(O17/N17) | =F16 | =E17*180/PI() | =B17+G17-(D17*180/PI()) | =I16 | | =K16 | |
| 18 | | =B17+C17 | =C17 | =D17 | =ATAN(Z18/R18)-ATAN(O18/N18) | =F17 | =E18*180/PI() | =B18+G18-(D18*180/PI()) | =I17 | | =K17 | |
| 19 | | =B18+C18 | =C18 | =D18 | =ATAN(Z19/R19)-ATAN(O19/N19) | =F18 | =E19*180/PI() | =B19+G19-(D19*180/PI()) | =I18 | | =K18 | |
| 20 | | =B19+C19 | =C19 | =D19 | =ATAN(Z20/R20)-ATAN(O20/N20) | =F19 | =E20*180/PI() | =B20+G20-(D20*180/PI()) | =I19 | | =K19 | |
| 21 | | =B20+C20 | =C20 | =D20 | =ATAN(Z21/R21)-ATAN(O21/N21) | =F20 | =E21*180/PI() | =B21+G21-(D21*180/PI()) | =I20 | | =K20 | |
| 22 | | =B21+C21 | =C21 | =D21 | =ATAN(Z22/R22)-ATAN(O22/N22) | =F21 | =E22*180/PI() | =B22+G22-(D22*180/PI()) | =I21 | | =K21 | |
| 23 | | =B22+C22 | =C22 | =D22 | =ATAN(Z23/R23)-ATAN(O23/N23) | =F22 | =E23*180/PI() | =B23+G23-(D23*180/PI()) | =I22 | | =K22 | |
| 24 | | =B23+C23 | =C23 | =D23 | =ATAN(Z24/R24)-ATAN(O24/N24) | =F23 | =E24*180/PI() | =B24+G24-(D24*180/PI()) | =I23 | | =K23 | |
| 25 | | =B24+C24 | =C24 | =D24 | =ATAN(Z25/R25)-ATAN(O25/N25) | =F24 | =E25*180/PI() | =B25+G25-(D25*180/PI()) | =I24 | | =K24 | |
| 26 | | =B25+C25 | =C25 | =D25 | =ATAN(Z26/R26)-ATAN(O26/N26) | =F25 | =E26*180/PI() | =B26+G26-(D26*180/PI()) | =I25 | | =K25 | |
| 27 | | =B26+C26 | =C26 | =D26 | =ATAN(Z27/R27)-ATAN(O27/N27) | =F26 | =E27*180/PI() | =B27+G27-(D27*180/PI()) | =I26 | | =K26 | |
| 28 | | =B27+C27 | =C27 | =D27 | =ATAN(Z28/R28)-ATAN(O28/N28) | =F27 | =E28*180/PI() | =B28+G28-(D28*180/PI()) | =I27 | | =K27 | |
| 29 | | =B28+C28 | =C28 | =D28 | =ATAN(Z29/R29)-ATAN(O29/N29) | =F28 | =E29*180/PI() | =B29+G29-(D29*180/PI()) | =I28 | | =K28 | |
| 30 | | =B29+C29 | =C29 | =D29 | =ATAN(Z30/R30)-ATAN(O30/N30) | =F29 | =E30*180/PI() | =B30+G30-(D30*180/PI()) | =I29 | | =K29 | |
| 31 | | =B30+C30 | =C30 | =D30 | =ATAN(Z31/R31)-ATAN(O31/N31) | =F30 | =E31*180/PI() | =B31+G31-(D31*180/PI()) | =I30 | | =K30 | |
| 32 | | =B31+C31 | =C31 | =D31 | =ATAN(Z32/R32)-ATAN(O32/N32) | =F31 | =E32*180/PI() | =B32+G32-(D32*180/PI()) | =I31 | | =K31 | |
| 33 | | =B32+C32 | =C32 | =D32 | =ATAN(Z33/R33)-ATAN(O33/N33) | =F32 | =E33*180/PI() | =B33+G33-(D33*180/PI()) | =I32 | | =K32 | |
| 34 | | =B33+C33 | =C33 | =D33 | =ATAN(Z34/R34)-ATAN(O34/N34) | =F33 | =E34*180/PI() | =B34+G34-(D34*180/PI()) | =I33 | | =K33 | |
| 35 | | =B34+C34 | =C34 | =D34 | =ATAN(Z35/R35)-ATAN(O35/N35) | =F34 | =E35*180/PI() | =B35+G35-(D35*180/PI()) | =I34 | | =K34 | |
| 36 | | =B35+C35 | =C35 | =D35 | =ATAN(Z36/R36)-ATAN(O36/N36) | =F35 | =E36*180/PI() | =B36+G36-(D36*180/PI()) | =I35 | | =K35 | |
| 37 | | =B36+C36 | =C36 | =D36 | =ATAN(Z37/R37)-ATAN(O37/N37) | =F36 | =E37*180/PI() | =B37+G37-(D37*180/PI()) | =I36 | | =K36 | |
| 38 | | =B37+C37 | =C37 | =D37 | =ATAN(Z38/R38)-ATAN(O38/N38) | =F37 | =E38*180/PI() | =B38+G38-(D38*180/PI()) | =I37 | | =K37 | |
| 39 | | =B38+C38 | =C38 | =D38 | =ATAN(Z39/R39)-ATAN(O39/N39) | =F38 | =E39*180/PI() | =B39+G39-(D39*180/PI()) | =I38 | | =K38 | |
| 40 | | =B39+C39 | =C39 | =D39 | =ATAN(Z40/R40)-ATAN(O40/N40) | =F39 | =E40*180/PI() | =B40+G40-(D40*180/PI()) | =I39 | | =K39 | |

Figure 14 b - Equations for a Sliding Pivot Spiral Pulley

| | M | N | O | P | Q | R | S |
|---|---|---|---|---|---|---|---|
| 1 | | b | h | x | p + x | z | r1 |
| 2 | | | Offset | | | | Tangent Radius  1st estimate |
| 3 | | inch | inch | inch | inch | inch | inch |
| 4 | | 12 | 0.3 | | | | 3 |
| 5 | | | | | | | |
| 6 | =M4 | =N4 | =O4 | =L6-M6*COS(F6) | =N6+P6 | =SQRT(N4*N4+O4*O4-S4*S4) | =S4 |
| 7 | =M6 | =SQRT(Z7+Z7+R7*R7-O7*O7) | =O6 | | =O6 | =SQRT(N6*N6+O6*O6-S6*S6) | =(K7*COS(E6))/(7*(O7+(M7*COS(F7))-SQRT(S6*S6+R7*R7-O7*O7)) |
| 8 | =M7 | =SQRT(Z8*Z8+R8*R8-O8*O8) | =O7 | | =Q7 | =R7-(Z7*(C7*PI()/180)-(E6-E7)) | =(K8*COS(E7))/(8*(Q8+(M8*COS(F8))-SQRT(S7*S7+R8*R8-O8*O8)) |
| 9 | =M8 | =SQRT(Z9*Z9+R9*R9-O9*O9) | =O8 | | =Q8 | =R8-(Z8*(C8*PI()/180)-(E7-E8)) | =(K9*COS(E8))/(9*(Q9+(M9*COS(F9))-SQRT(S8*S8+R9*R9-O9*O9)) |
| 10 | =M9 | =SQRT(Z10*Z10+R10*R10-O10*O10) | =O9 | | =Q9 | =R9-(Z9*(C9*PI()/180)-(E8-E9)) | =(K10*COS(E9))/(10*(Q10+(M10*COS(F10))-SQRT(S9*S9+R10*R10-O10*O10)) |
| 11 | =M10 | =SQRT(Z11*Z11+R11*R11-O11*O11) | =O10 | | =Q10 | =R10-(Z10*(C10*PI()/180)-(E9-E10)) | =(K11*COS(E10))/(11*(Q11+(M11*COS(F11))-SQRT(S10*S10+R11*R11-O11*O11)) |
| 12 | =M11 | =SQRT(Z12*Z12+R12*R12-O12*O12) | =O11 | | =Q11 | =R11-(Z11*(C11*PI()/180)-(E10-E11)) | =(K12*COS(E11))/(12*(Q12+(M12*COS(F12))-SQRT(S11*S11+R12*R12-O12*O12)) |
| 13 | =M12 | =SQRT(Z13*Z13+R13*R13-O13*O13) | =O12 | | =Q12 | =R12-(Z12*(C12*PI()/180)-(E11-E12)) | =(K13*COS(E12))/(13*(Q13+(M13*COS(F13))-SQRT(S12*S12+R13*R13-O13*O13)) |
| 14 | =M13 | =SQRT(Z14*Z14+R14*R14-O14*O14) | =O13 | | =Q13 | =R13-(Z13*(C13*PI()/180)-(E12-E13)) | =(K14*COS(E13))/(14*(Q14+(M14*COS(F14))-SQRT(S13*S13+R14*R14-O14*O14)) |
| 15 | =M14 | =SQRT(Z15*Z15+R15*R15-O15*O15) | =O14 | | =Q14 | =R14-(Z14*(C14*PI()/180)-(E13-E14)) | =(K15*COS(E14))/(15*(Q15+(M15*COS(F15))-SQRT(S14*S14+R15*R15-O15*O15)) |
| 16 | =M15 | =SQRT(Z16*Z16+R16*R16-O16*O16) | =O15 | | =Q15 | =R15-(Z15*(C15*PI()/180)-(E14-E15)) | =(K16*COS(E15))/(16*(Q16+(M16*COS(F16))-SQRT(S15*S15+R16*R16-O16*O16)) |
| 17 | =M16 | =SQRT(Z17*Z17+R17*R17-O17*O17) | =O16 | | =Q16 | =R16-(Z16*(C16*PI()/180)-(E15-E16)) | =(K17*COS(E16))/(17*(Q17+(M17*COS(F17))-SQRT(S16*S16+R17*R17-O17*O17)) |
| 18 | =M17 | =SQRT(Z18*Z18+R18*R18-O18*O18) | =O17 | | =Q17 | =R17-(Z17*(C17*PI()/180)-(E16-E17)) | =(K18*COS(E17))/(18*(Q18+(M18*COS(F18))-SQRT(S17*S17+R18*R18-O18*O18)) |
| 19 | =M18 | =SQRT(Z19*Z19+R19*R19-O19*O19) | =O18 | | =Q18 | =R18-(Z18*(C18*PI()/180)-(E17-E18)) | =(K19*COS(E18))/(19*(Q19+(M19*COS(F19))-SQRT(S18*S18+R19*R19-O19*O19)) |
| 20 | =M19 | =SQRT(Z20*Z20+R20*R20-O20*O20) | =O19 | | =Q19 | =R19-(Z19*(C19*PI()/180)-(E18-E19)) | =(K20*COS(E19))/(20*(Q20+(M20*COS(F20))-SQRT(S19*S19+R20*R20-O20*O20)) |
| 21 | =M20 | =SQRT(Z21*Z21+R21*R21-O21*O21) | =O20 | | =Q20 | =R20-(Z20*(C20*PI()/180)-(E19-E20)) | =(K21*COS(E20))/(21*(Q21+(M21*COS(F21))-SQRT(S20*S20+R21*R21-O21*O21)) |
| 22 | =M21 | =SQRT(Z22*Z22+R22*R22-O22*O22) | =O21 | | =Q21 | =R21-(Z21*(C21*PI()/180)-(E20-E21)) | =(K22*COS(E21))/(22*(Q22+(M22*COS(F22))-SQRT(S21*S21+R22*R22-O22*O22)) |
| 23 | =M22 | =SQRT(Z23*Z23+R23*R23-O23*O23) | =O22 | | =Q22 | =R22-(Z22*(C22*PI()/180)-(E21-E22)) | =(K23*COS(E22))/(23*(Q23+(M23*COS(F23))-SQRT(S22*S22+R23*R23-O23*O23)) |
| 24 | =M23 | =SQRT(Z24*Z24+R24*R24-O24*O24) | =O23 | | =Q23 | =R23-(Z23*(C23*PI()/180)-(E22-E23)) | =(K24*COS(E23))/(24*(Q24+(M24*COS(F24))-SQRT(S23*S23+R24*R24-O24*O24)) |
| 25 | =M24 | =SQRT(Z25*Z25+R25*R25-O25*O25) | =O24 | | =Q24 | =R24-(Z24*(C24*PI()/180)-(E23-E24)) | =(K25*COS(E24))/(25*(Q25+(M25*COS(F25))-SQRT(S24*S24+R25*R25-O25*O25)) |
| 26 | =M25 | =SQRT(Z26*Z26+R26*R26-O26*O26) | =O25 | | =Q25 | =R25-(Z25*(C25*PI()/180)-(E24-E25)) | =(K26*COS(E25))/(26*(Q26+(M26*COS(F26))-SQRT(S25*S25+R26*R26-O26*O26)) |
| 27 | =M26 | =SQRT(Z27*Z27+R27*R27-O27*O27) | =O26 | | =Q26 | =R26-(Z26*(C26*PI()/180)-(E25-E26)) | =(K27*COS(E26))/(27*(Q27+(M27*COS(F27))-SQRT(S26*S26+R27*R27-O27*O27)) |
| 28 | =M27 | =SQRT(Z28*Z28+R28*R28-O28*O28) | =O27 | | =Q27 | =R27-(Z27*(C27*PI()/180)-(E26-E27)) | =(K28*COS(E27))/(28*(Q28+(M28*COS(F28))-SQRT(S27*S27+R28*R28-O28*O28)) |
| 29 | =M28 | =SQRT(Z29*Z29+R29*R29-O29*O29) | =O28 | | =Q28 | =R28-(Z28*(C28*PI()/180)-(E27-E28)) | =(K29*COS(E28))/(29*(Q29+(M29*COS(F29))-SQRT(S28*S28+R29*R29-O29*O29)) |
| 30 | =M29 | =SQRT(Z30*Z30+R30*R30-O30*O30) | =O29 | | =Q29 | =R29-(Z29*(C29*PI()/180)-(E28-E29)) | =(K30*COS(E29))/(30*(Q30+(M30*COS(F30))-SQRT(S29*S29+R30*R30-O30*O30)) |
| 31 | =M30 | =SQRT(Z31*Z31+R31*R31-O31*O31) | =O30 | | =Q30 | =R30-(Z30*(C30*PI()/180)-(E29-E30)) | =(K31*COS(E30))/(31*(Q31+(M31*COS(F31))-SQRT(S30*S30+R31*R31-O31*O31)) |
| 32 | =M31 | =SQRT(Z32*Z32+R32*R32-O32*O32) | =O31 | | =Q31 | =R31-(Z31*(C31*PI()/180)-(E30-E31)) | =(K32*COS(E31))/(32*(Q32+(M32*COS(F32))-SQRT(S31*S31+R32*R32-O32*O32)) |
| 33 | =M32 | =SQRT(Z33*Z33+R33*R33-O33*O33) | =O32 | | =Q32 | =R32-(Z32*(C32*PI()/180)-(E31-E32)) | =(K33*COS(E32))/(33*(Q33+(M33*COS(F33))-SQRT(S32*S32+R33*R33-O33*O33)) |
| 34 | =M33 | =SQRT(Z34*Z34+R34*R34-O34*O34) | =O33 | | =Q33 | =R33-(Z33*(C33*PI()/180)-(E32-E33)) | =(K34*COS(E33))/(34*(Q34+(M34*COS(F34))-SQRT(S33*S33+R34*R34-O34*O34)) |
| 35 | =M34 | =SQRT(Z35*Z35+R35*R35-O35*O35) | =O34 | | =Q34 | =R34-(Z34*(C34*PI()/180)-(E33-E34)) | =(K35*COS(E34))/(35*(Q35+(M35*COS(F35))-SQRT(S34*S34+R35*R35-O35*O35)) |
| 36 | =M35 | =SQRT(Z36*Z36+R36*R36-O36*O36) | =O35 | | =Q35 | =R35-(Z35*(C35*PI()/180)-(E34-E35)) | =(K36*COS(E35))/(36*(Q36+(M36*COS(F36))-SQRT(S35*S35+R36*R36-O36*O36)) |
| 37 | =M36 | =SQRT(Z37*Z37+R37*R37-O37*O37) | =O36 | | =Q36 | =R36-(Z36*(C36*PI()/180)-(E35-E36)) | =(K37*COS(E36))/(37*(Q37+(M37*COS(F37))-SQRT(S36*S36+R37*R37-O37*O37)) |
| 38 | =M37 | =SQRT(Z38*Z38+R38*R38-O38*O38) | =O37 | | =Q37 | =R37-(Z37*(C37*PI()/180)-(E36-E37)) | =(K38*COS(E37))/(38*(Q38+(M38*COS(F38))-SQRT(S37*S37+R38*R38-O38*O38)) |
| 39 | =M38 | =SQRT(Z39*Z39+R39*R39-O39*O39) | =O38 | | =Q38 | =R38-(Z38*(C38*PI()/180)-(E37-E38)) | =(K39*COS(E38))/(39*(Q39+(M39*COS(F39))-SQRT(S38*S38+R39*R39-O39*O39)) |
| 40 | =M39 | =SQRT(Z40*Z40+R40*R40-O40*O40) | =O39 | | =Q39 | =R39-(Z39*(C39*PI()/180)-(E38-E39)) | =(K40*COS(E39))/(40*(Q40+(M40*COS(F40))-SQRT(S39*S39+R40*R40-O40*O40)) |

Figure 14 c - Equations for a Sliding Pivot Spiral Pulley

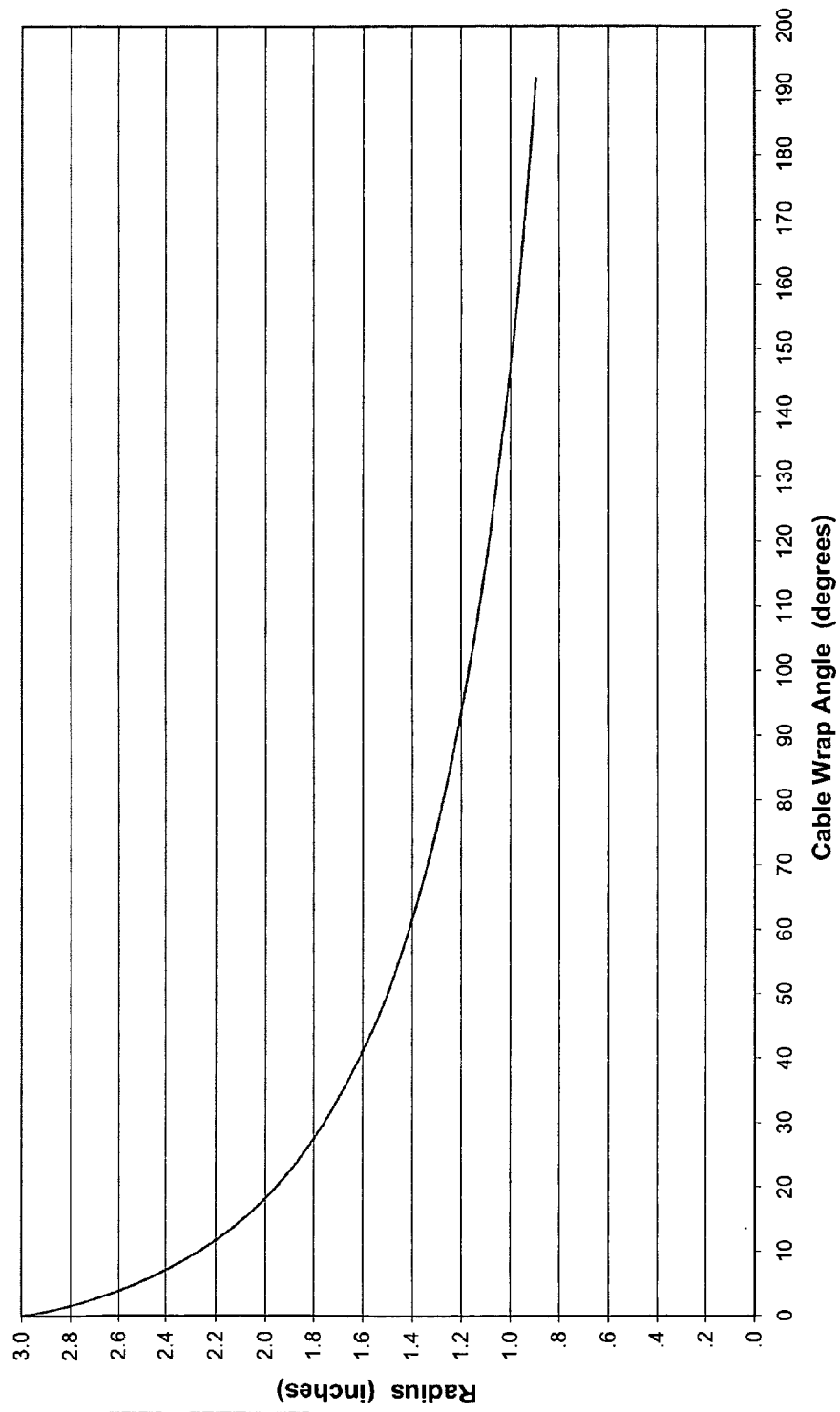

Sliding Pivot Spiral Pulley
With Constant Torque

Spiral Pulleys with
Constant and Parabolic
Torque Profiles

Free Body Diagram of Spiral Pulley #2 With a Fixed Pivot

Figure 20 a – Equations for a Fixed Pivot Spiral Pulley

| | A | B | C | D | E | F | G | H | I | J |
|---|---|---|---|---|---|---|---|---|---|---|
| 1 | | Lambda | Delta Lambda | Omega | K2 | f0 | Tau | m | s | r0 |
| 2 | | Pulley Angle | Stop Angle | Cable Wrap Angle | Spring Constant | Initial Tension | Pulley Torque | | Spring Extension | |
| 3 | | degrees | degrees | degrees | lbf/in | lbf. | in-lbf | inch | inch | inch |
| 4 | Initial Conditions | 0 | 0.1 | | 14.4 | 30 | | 16 | =0 | 3 |
| 5 | Calculated Initial Conditions | | | | | | Equation Below is for a Parabolic Torque Profile | | | |
| 6 | | =B4 | =C4 | =B6+(ASIN(K6/H6)-ASIN(J6/H6))*180/PI() | =E4 | =F4 | =180-(0.009*(B6-100)*(B6-100)) | =H4 | =I5 | =J4 |
| 7 | | =B6+C6 | =C6 | =B7+(ASIN(K7/H7)-ASIN(J7/H7))*180/PI() | =E6 | =F6 | =180-(0.009*(B7-100)*(B7-100)) | =H6 | =K6*(C6*PI()/180)+I6 | =J6 |
| 8 | | =B7+C7 | =C7 | =B8+(ASIN(K8/H8)-ASIN(J8/H8))*180/PI() | =E7 | =F7 | =180-(0.009*(B8-100)*(B8-100)) | =H7 | =K7*(C7*PI()/180)+I7 | =J7 |
| 9 | | =B8+C8 | =C8 | =B9+(ASIN(K9/H9)-ASIN(J9/H9))*180/PI() | =E8 | =F8 | =180-(0.009*(B9-100)*(B9-100)) | =H8 | =K8*(C8*PI()/180)+I8 | =J8 |
| 10 | | =B9+C9 | =C9 | =B10+(ASIN(K10/H10)-ASIN(J10/H10))*180/PI() | =E9 | =F9 | =180-(0.009*(B10-100)*(B10-100)) | =H9 | =K9*(C9*PI()/180)+I9 | =J9 |
| 11 | | =B10+C10 | =C10 | =B11+(ASIN(K11/H11)-ASIN(J11/H11))*180/PI() | =E10 | =F10 | =180-(0.009*(B11-100)*(B11-100)) | =H10 | =K10*(C10*PI()/180)+I10 | =J10 |
| 12 | | =B11+C11 | =C11 | =B12+(ASIN(K12/H12)-ASIN(J12/H12))*180/PI() | =E11 | =F11 | =180-(0.009*(B12-100)*(B12-100)) | =H11 | =K11*(C11*PI()/180)+I11 | =J11 |
| 13 | | =B12+C12 | =C12 | =B13+(ASIN(K13/H13)-ASIN(J13/H13))*180/PI() | =E12 | =F12 | =180-(0.009*(B13-100)*(B13-100)) | =H12 | =K12*(C12*PI()/180)+I12 | =J12 |
| 14 | | =B13+C13 | =C13 | =B14+(ASIN(K14/H14)-ASIN(J14/H14))*180/PI() | =E13 | =F13 | =180-(0.009*(B14-100)*(B14-100)) | =H13 | =K13*(C13*PI()/180)+I13 | =J13 |
| 15 | | =B14+C14 | =C14 | =B15+(ASIN(K15/H15)-ASIN(J15/H15))*180/PI() | =E14 | =F14 | =180-(0.009*(B15-100)*(B15-100)) | =H14 | =K14*(C14*PI()/180)+I14 | =J14 |
| 16 | | =B15+C15 | =C15 | =B16+(ASIN(K16/H16)-ASIN(J16/H16))*180/PI() | =E15 | =F15 | =180-(0.009*(B16-100)*(B16-100)) | =H15 | =K15*(C15*PI()/180)+I15 | =J15 |
| 17 | | =B16+C16 | =C16 | =B17+(ASIN(K17/H17)-ASIN(J17/H17))*180/PI() | =E16 | =F16 | =180-(0.009*(B17-100)*(B17-100)) | =H16 | =K16*(C16*PI()/180)+I16 | =J16 |
| 18 | | =B17+C17 | =C17 | =B18+(ASIN(K18/H18)-ASIN(J18/H18))*180/PI() | =E17 | =F17 | =180-(0.009*(B18-100)*(B18-100)) | =H17 | =K17*(C17*PI()/180)+I17 | =J17 |
| 19 | | =B18+C18 | =C18 | =B19+(ASIN(K19/H19)-ASIN(J19/H19))*180/PI() | =E18 | =F18 | =180-(0.009*(B19-100)*(B19-100)) | =H18 | =K18*(C18*PI()/180)+I18 | =J18 |
| 20 | | =B19+C19 | =C19 | =B20+(ASIN(K20/H20)-ASIN(J20/H20))*180/PI() | =E19 | =F19 | =180-(0.009*(B20-100)*(B20-100)) | =H19 | =K19*(C19*PI()/180)+I19 | =J19 |
| 21 | | =B20+C20 | =C20 | =B21+(ASIN(K21/H21)-ASIN(J21/H21))*180/PI() | =E20 | =F20 | =180-(0.009*(B21-100)*(B21-100)) | =H20 | =K20*(C20*PI()/180)+I20 | =J20 |
| 22 | | =B21+C21 | =C21 | =B22+(ASIN(K22/H22)-ASIN(J22/H22))*180/PI() | =E21 | =F21 | =180-(0.009*(B22-100)*(B22-100)) | =H21 | =K21*(C21*PI()/180)+I21 | =J21 |
| 23 | | =B22+C22 | =C22 | =B23+(ASIN(K23/H23)-ASIN(J23/H23))*180/PI() | =E22 | =F22 | =180-(0.009*(B23-100)*(B23-100)) | =H22 | =K22*(C22*PI()/180)+I22 | =J22 |
| 24 | | =B23+C23 | =C23 | =B24+(ASIN(K24/H24)-ASIN(J24/H24))*180/PI() | =E23 | =F23 | =180-(0.009*(B24-100)*(B24-100)) | =H23 | =K23*(C23*PI()/180)+I23 | =J23 |
| 25 | | =B24+C24 | =C24 | =B25+(ASIN(K25/H25)-ASIN(J25/H25))*180/PI() | =E24 | =F24 | =180-(0.009*(B25-100)*(B25-100)) | =H24 | =K24*(C24*PI()/180)+I24 | =J24 |
| 26 | | =B25+C25 | =C25 | =B26+(ASIN(K26/H26)-ASIN(J26/H26))*180/PI() | =E25 | =F25 | =180-(0.009*(B26-100)*(B26-100)) | =H25 | =K25*(C25*PI()/180)+I25 | =J25 |
| 27 | | =B26+C26 | =C26 | =B27+(ASIN(K27/H27)-ASIN(J27/H27))*180/PI() | =E26 | =F26 | =180-(0.009*(B27-100)*(B27-100)) | =H26 | =K26*(C26*PI()/180)+I26 | =J26 |
| 28 | | =B27+C27 | =C27 | =B28+(ASIN(K28/H28)-ASIN(J28/H28))*180/PI() | =E27 | =F27 | =180-(0.009*(B28-100)*(B28-100)) | =H27 | =K27*(C27*PI()/180)+I27 | =J27 |
| 29 | | =B28+C28 | =C28 | =B29+(ASIN(K29/H29)-ASIN(J29/H29))*180/PI() | =E28 | =F28 | =180-(0.009*(B29-100)*(B29-100)) | =H28 | =K28*(C28*PI()/180)+I28 | =J28 |
| 30 | | =B29+C29 | =C29 | =B30+(ASIN(K30/H30)-ASIN(J30/H30))*180/PI() | =E29 | =F29 | =180-(0.009*(B30-100)*(B30-100)) | =H29 | =K29*(C29*PI()/180)+I29 | =J29 |
| 31 | | =B30+C30 | =C30 | =B31+(ASIN(K31/H31)-ASIN(J31/H31))*180/PI() | =E30 | =F30 | =180-(0.009*(B31-100)*(B31-100)) | =H30 | =K30*(C30*PI()/180)+I30 | =J30 |
| 32 | | =B31+C31 | =C31 | =B32+(ASIN(K32/H32)-ASIN(J32/H32))*180/PI() | =E31 | =F31 | =180-(0.009*(B32-100)*(B32-100)) | =H31 | =K31*(C31*PI()/180)+I31 | =J31 |
| 33 | | =B32+C32 | =C32 | =B33+(ASIN(K33/H33)-ASIN(J33/H33))*180/PI() | =E32 | =F32 | =180-(0.009*(B33-100)*(B33-100)) | =H32 | =K32*(C32*PI()/180)+I32 | =J32 |
| 34 | | =B33+C33 | =C33 | =B34+(ASIN(K34/H34)-ASIN(J34/H34))*180/PI() | =E33 | =F33 | =180-(0.009*(B34-100)*(B34-100)) | =H33 | =K33*(C33*PI()/180)+I33 | =J33 |
| 35 | | =B34+C34 | =C34 | =B35+(ASIN(K35/H35)-ASIN(J35/H35))*180/PI() | =E34 | =F34 | =180-(0.009*(B35-100)*(B35-100)) | =H34 | =K34*(C34*PI()/180)+I34 | =J34 |
| 36 | | =B35+C35 | =C35 | =B36+(ASIN(K36/H36)-ASIN(J36/H36))*180/PI() | =E35 | =F35 | =180-(0.009*(B36-100)*(B36-100)) | =H35 | =K35*(C35*PI()/180)+I35 | =J35 |
| 37 | | =B36+C36 | =C36 | =B37+(ASIN(K37/H37)-ASIN(J37/H37))*180/PI() | =E36 | =F36 | =180-(0.009*(B37-100)*(B37-100)) | =H36 | =K36*(C36*PI()/180)+I36 | =J36 |
| 38 | | =B37+C37 | =C37 | =B38+(ASIN(K38/H38)-ASIN(J38/H38))*180/PI() | =E37 | =F37 | =180-(0.009*(B38-100)*(B38-100)) | =H37 | =K37*(C37*PI()/180)+I37 | =J37 |
| 39 | | =B38+C38 | =C38 | =B39+(ASIN(K39/H39)-ASIN(J39/H39))*180/PI() | =E38 | =F38 | =180-(0.009*(B39-100)*(B39-100)) | =H38 | =K38*(C38*PI()/180)+I38 | =J38 |
| 40 | | =B39+C39 | =C39 | =B40+(ASIN(K40/H40)-ASIN(J40/H40))*180/PI() | =E39 | =F39 | =180-(0.009*(B40-100)*(B40-100)) | =H39 | =K39*(C39*PI()/180)+I39 | =J39 |
| 41 | | =B40+C40 | =C40 | =B41+(ASIN(K41/H41)-ASIN(J41/H41))*180/PI() | =E40 | =F40 | =180-(0.009*(B41-100)*(B41-100)) | =H40 | =K40*(C40*PI()/180)+I40 | =J40 |
| 42 | | =B41+C41 | =C41 | =B42+(ASIN(K42/H42)-ASIN(J42/H42))*180/PI() | =E41 | =F41 | =180-(0.009*(B42-100)*(B42-100)) | =H41 | =K41*(C41*PI()/180)+I41 | =J41 |
| 43 | | =B42+C42 | =C42 | =B43+(ASIN(K43/H43)-ASIN(J43/H43))*180/PI() | =E42 | =F42 | =180-(0.009*(B43-100)*(B43-100)) | =H42 | =K42*(C42*PI()/180)+I42 | =J42 |
| 44 | | =B43+C43 | =C43 | =B44+(ASIN(K44/H44)-ASIN(J44/H44))*180/PI() | =E43 | =F43 | =180-(0.009*(B44-100)*(B44-100)) | =H43 | =K43*(C43*PI()/180)+I43 | =J43 |

Figure 20 b - Equations for a Fixed Pivot Spiral Pulley

| | K | L | M | N | O | P | Q |
|---|---|---|---|---|---|---|---|
| 1 | r | | | Phi 0 | Phi n | Phi 0 | Phi n |
| 2 | Tangent Radius | | | | | | |
| 3 | inch | | | radians | radians | degrees | degrees |
| 4 | | | | =ASIN(J4/H4) | | | |
| 5 | | | | | | | |
| 6 | =J6 | | | =N5 | =ASIN(K6/H6) | =N6*180/PI() | =O6*180/PI() |
| 7 | =G7/(E7*I7+F7) | | | =N6 | =ASIN(K7/H7) | =N7*180/PI() | =O7*180/PI() |
| 8 | =G8/(E8*I8+F8) | | | =N7 | =ASIN(K8/H8) | =N8*180/PI() | =O8*180/PI() |
| 9 | =G9/(E9*I9+F9) | | | =N8 | =ASIN(K9/H9) | =N9*180/PI() | =O9*180/PI() |
| 10 | =G10/(E10*I10+F10) | | | =N9 | =ASIN(K10/H10) | =N10*180/PI() | =O10*180/PI() |
| 11 | =G11/(E11*I11+F11) | | | =N10 | =ASIN(K11/H11) | =N11*180/PI() | =O11*180/PI() |
| 12 | =G12/(E12*I12+F12) | | | =N11 | =ASIN(K12/H12) | =N12*180/PI() | =O12*180/PI() |
| 13 | =G13/(E13*I13+F13) | | | =N12 | =ASIN(K13/H13) | =N13*180/PI() | =O13*180/PI() |
| 14 | =G14/(E14*I14+F14) | | | =N13 | =ASIN(K14/H14) | =N14*180/PI() | =O14*180/PI() |
| 15 | =G15/(E15*I15+F15) | | | =N14 | =ASIN(K15/H15) | =N15*180/PI() | =O15*180/PI() |
| 16 | =G16/(E16*I16+F16) | | | =N15 | =ASIN(K16/H16) | =N16*180/PI() | =O16*180/PI() |
| 17 | =G17/(E17*I17+F17) | | | =N16 | =ASIN(K17/H17) | =N17*180/PI() | =O17*180/PI() |
| 18 | =G18/(E18*I18+F18) | | | =N17 | =ASIN(K18/H18) | =N18*180/PI() | =O18*180/PI() |
| 19 | =G19/(E19*I19+F19) | | | =N18 | =ASIN(K19/H19) | =N19*180/PI() | =O19*180/PI() |
| 20 | =G20/(E20*I20+F20) | | | =N19 | =ASIN(K20/H20) | =N20*180/PI() | =O20*180/PI() |
| 21 | =G21/(E21*I21+F21) | | | =N20 | =ASIN(K21/H21) | =N21*180/PI() | =O21*180/PI() |
| 22 | =G22/(E22*I22+F22) | | | =N21 | =ASIN(K22/H22) | =N22*180/PI() | =O22*180/PI() |
| 23 | =G23/(E23*I23+F23) | | | =N22 | =ASIN(K23/H23) | =N23*180/PI() | =O23*180/PI() |
| 24 | =G24/(E24*I24+F24) | | | =N23 | =ASIN(K24/H24) | =N24*180/PI() | =O24*180/PI() |
| 25 | =G25/(E25*I25+F25) | | | =N24 | =ASIN(K25/H25) | =N25*180/PI() | =O25*180/PI() |
| 26 | =G26/(E26*I26+F26) | | | =N25 | =ASIN(K26/H26) | =N26*180/PI() | =O26*180/PI() |
| 27 | =G27/(E27*I27+F27) | | | =N26 | =ASIN(K27/H27) | =N27*180/PI() | =O27*180/PI() |
| 28 | =G28/(E28*I28+F28) | | | =N27 | =ASIN(K28/H28) | =N28*180/PI() | =O28*180/PI() |
| 29 | =G29/(E29*I29+F29) | | | =N28 | =ASIN(K29/H29) | =N29*180/PI() | =O29*180/PI() |
| 30 | =G30/(E30*I30+F30) | | | =N29 | =ASIN(K30/H30) | =N30*180/PI() | =O30*180/PI() |
| 31 | =G31/(E31*I31+F31) | | | =N30 | =ASIN(K31/H31) | =N31*180/PI() | =O31*180/PI() |
| 32 | =G32/(E32*I32+F32) | | | =N31 | =ASIN(K32/H32) | =N32*180/PI() | =O32*180/PI() |
| 33 | =G33/(E33*I33+F33) | | | =N32 | =ASIN(K33/H33) | =N33*180/PI() | =O33*180/PI() |
| 34 | =G34/(E34*I34+F34) | | | =N33 | =ASIN(K34/H34) | =N34*180/PI() | =O34*180/PI() |
| 35 | =G35/(E35*I35+F35) | | | =N34 | =ASIN(K35/H35) | =N35*180/PI() | =O35*180/PI() |
| 36 | =G36/(E36*I36+F36) | | | =N35 | =ASIN(K36/H36) | =N36*180/PI() | =O36*180/PI() |
| 37 | =G37/(E37*I37+F37) | | | =N36 | =ASIN(K37/H37) | =N37*180/PI() | =O37*180/PI() |
| 38 | =G38/(E38*I38+F38) | | | =N37 | =ASIN(K38/H38) | =N38*180/PI() | =O38*180/PI() |
| 39 | =G39/(E39*I39+F39) | | | =N38 | =ASIN(K39/H39) | =N39*180/PI() | =O39*180/PI() |
| 40 | =G40/(E40*I40+F40) | | | =N39 | =ASIN(K40/H40) | =N40*180/PI() | =O40*180/PI() |
| 41 | =G41/(E41*I41+F41) | | | =N40 | =ASIN(K41/H41) | =N41*180/PI() | =O41*180/PI() |
| 42 | =G42/(E42*I42+F42) | | | =N41 | =ASIN(K42/H42) | =N42*180/PI() | =O42*180/PI() |
| 43 | =G43/(E43*I43+F43) | | | =N42 | =ASIN(K43/H43) | =N43*180/PI() | =O43*180/PI() |
| 44 | =G44/(E44*I44+F44) | | | =N43 | =ASIN(K44/H44) | =N44*180/PI() | =O44*180/PI() |

Tangent Radius vs. Cable Wrap Angle
For a Fixed Pivot, Parabolic Torque, Spiral Pulley
The Pulley Rotates 200 degrees

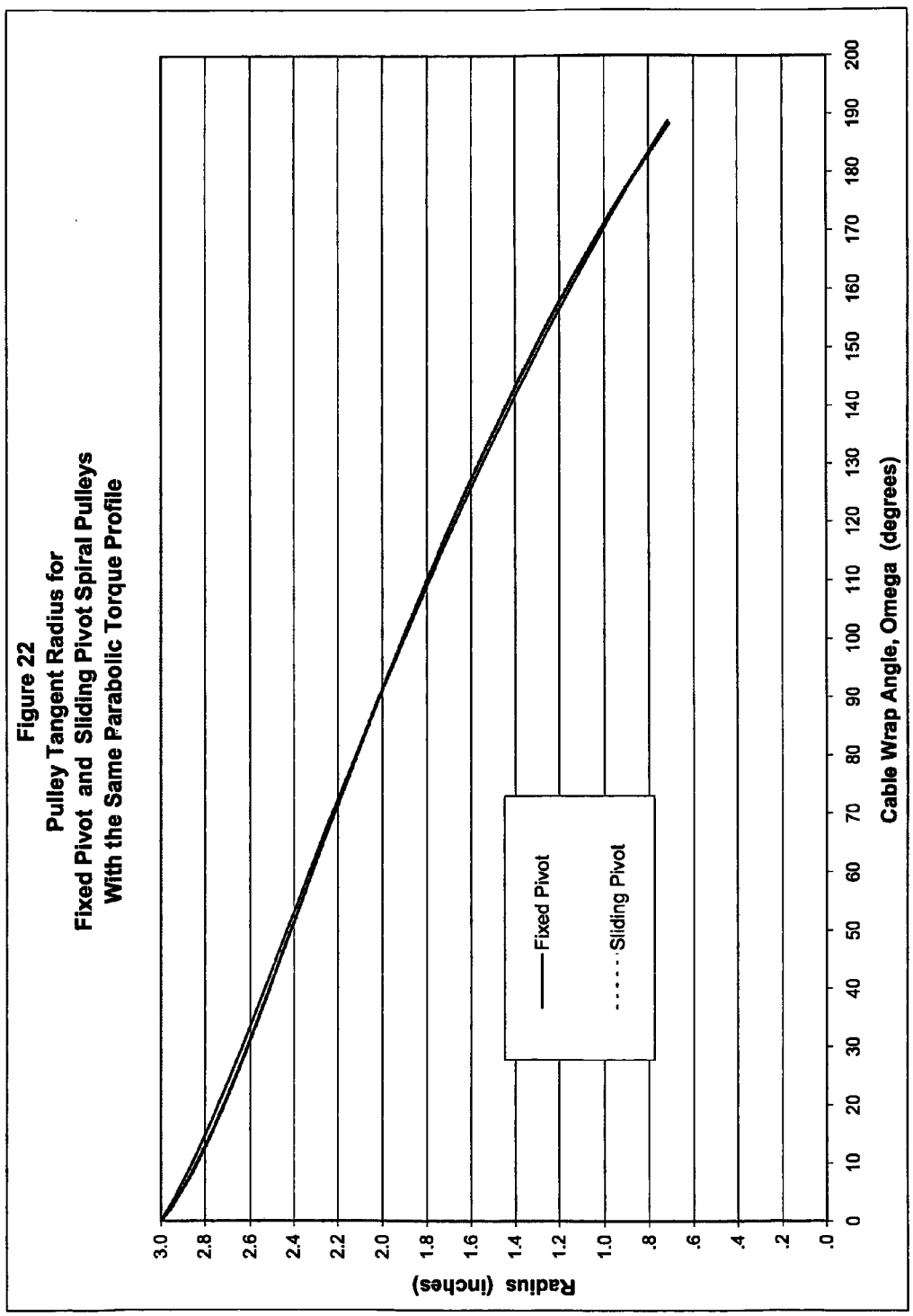

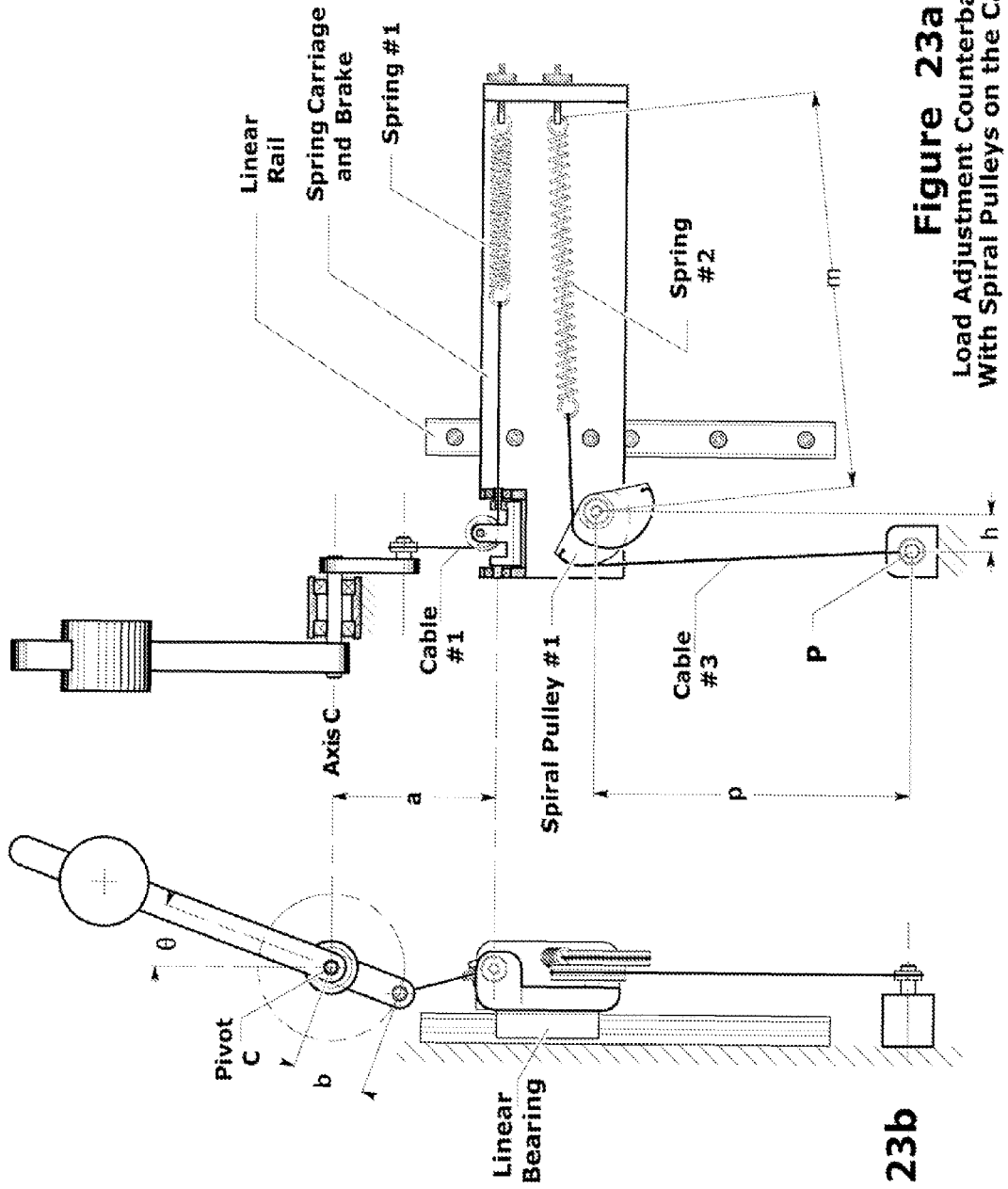

Manual Link-Angle Compensation

Link-Angle Compensation Counterbalance Mechanism

Rotary Link-Angle Compensation
Counterbalance Mechanism

Simplified Link-Angle Compensation
Counterbalance Mechanism

External Cam and Roller

Internal Cam and Roller

Dual Opposed Counterbalance Mechanism

Multiple Opposed Counterbalance Mechanisms

Dual Phase Shifted Counterbalance Mechanism

Translational Counterbalance Force Diagram

Translational Counterbalance Force Diagram

Translational Counterbalance Force Diagram

Adjustable
Constant Force or Constant
Torque Mechanism

Adjustable Translational Counterbalance

Adjustable Translational Counterbalance

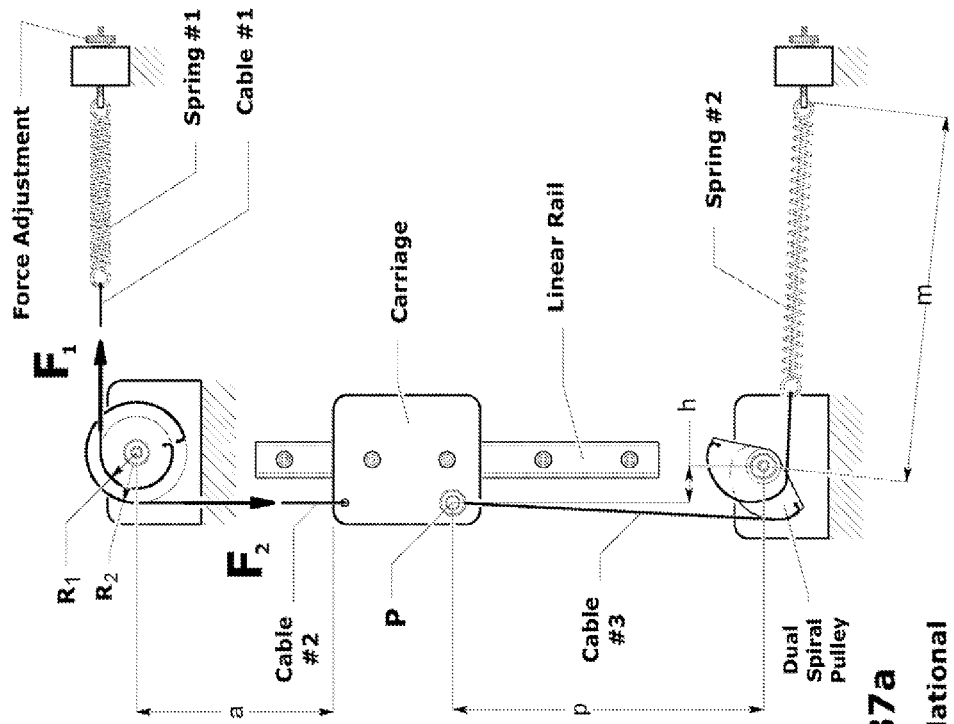
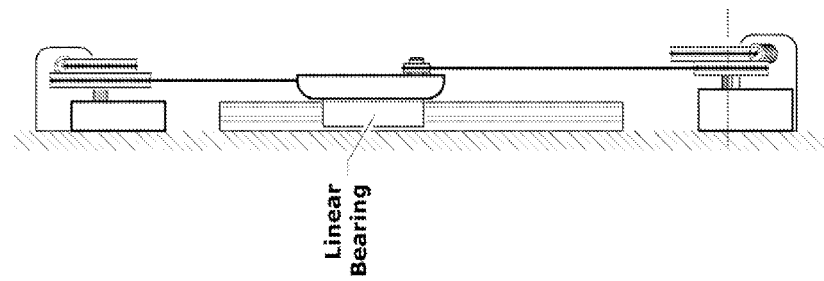
Figure 37a Adjustable Translational Counterbalance
Figure 37b

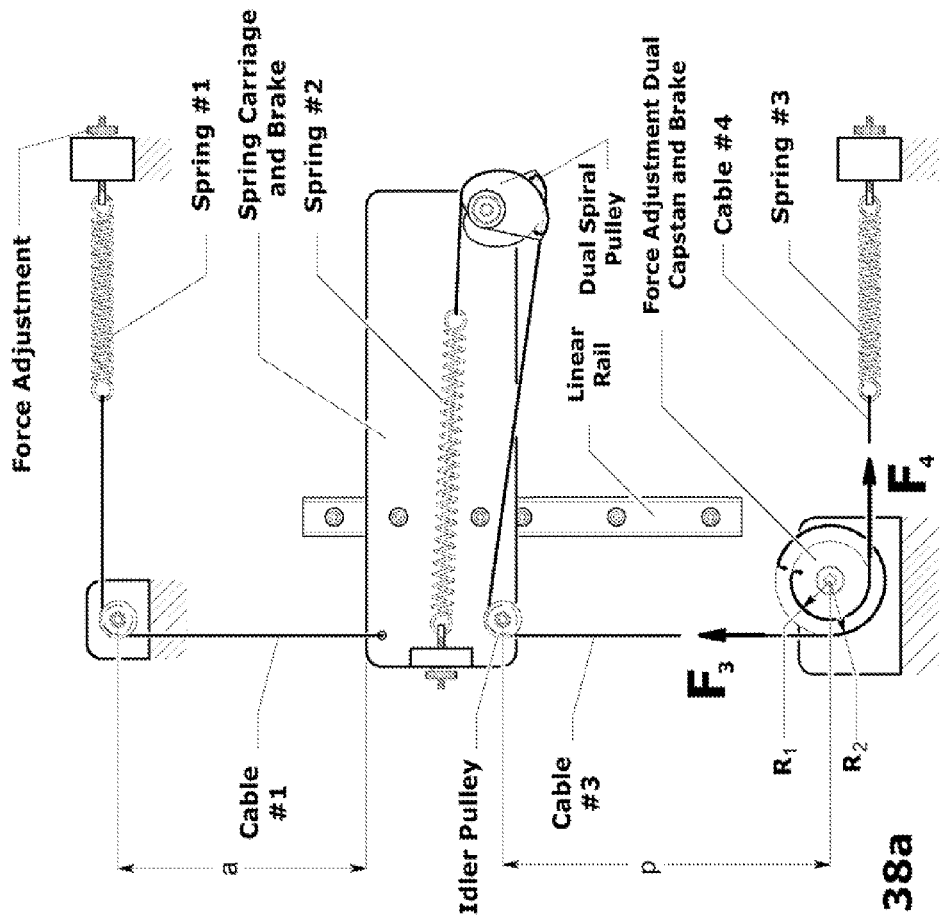
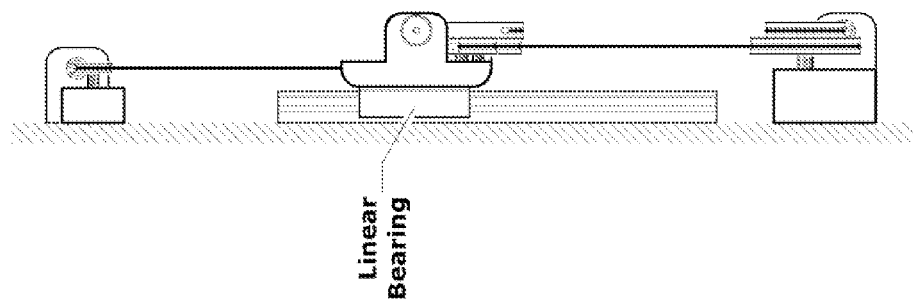
Figure 38a
Translational Counterbalance
With Adjustment Counterbalance
Figure 38b

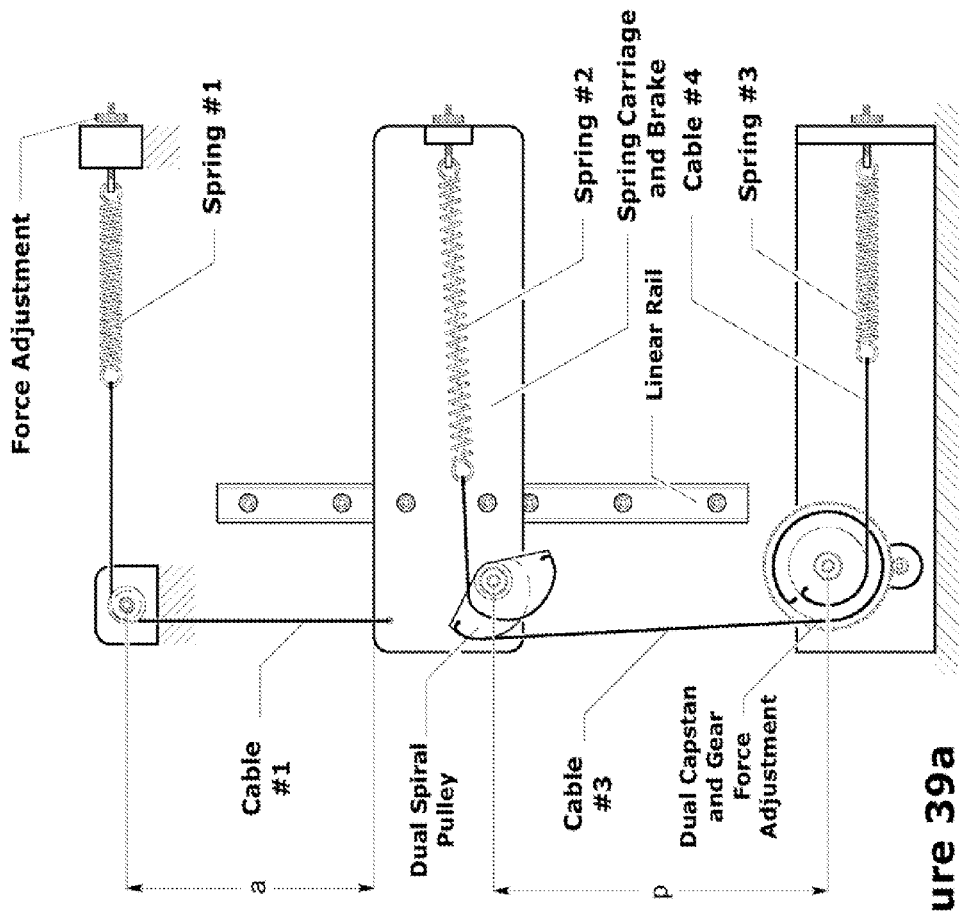
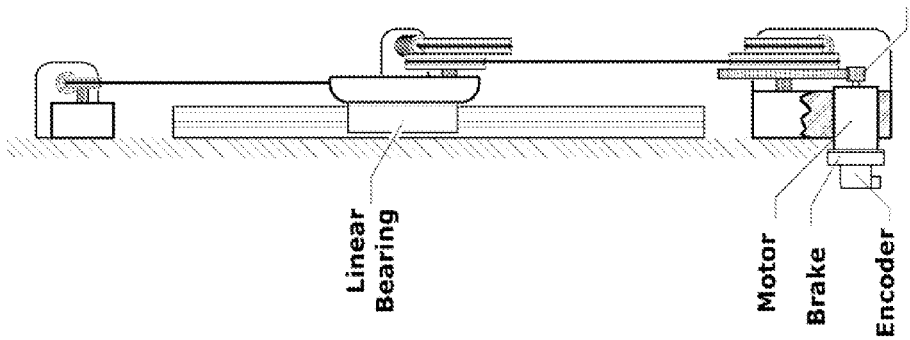
Figure 39a Translational Counterbalance With Adjustment Counterbalance
Figure 39b

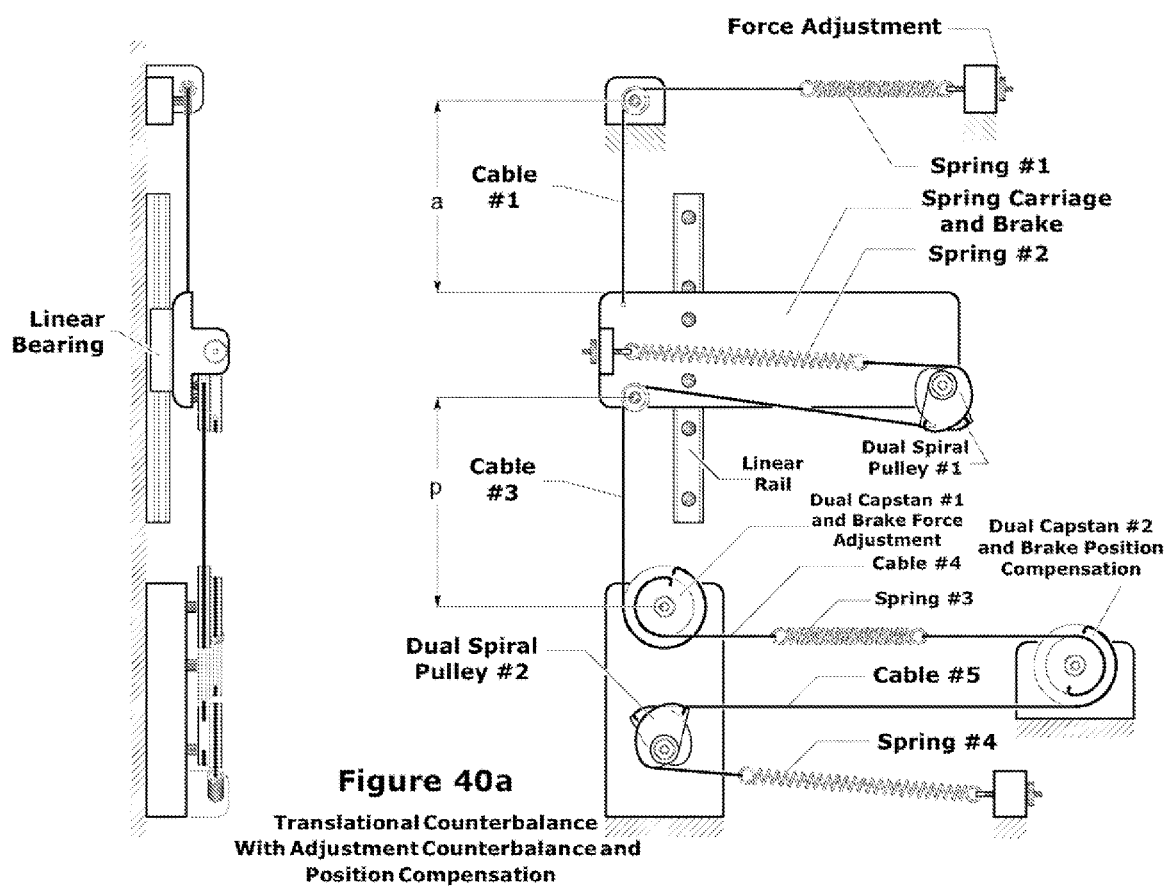

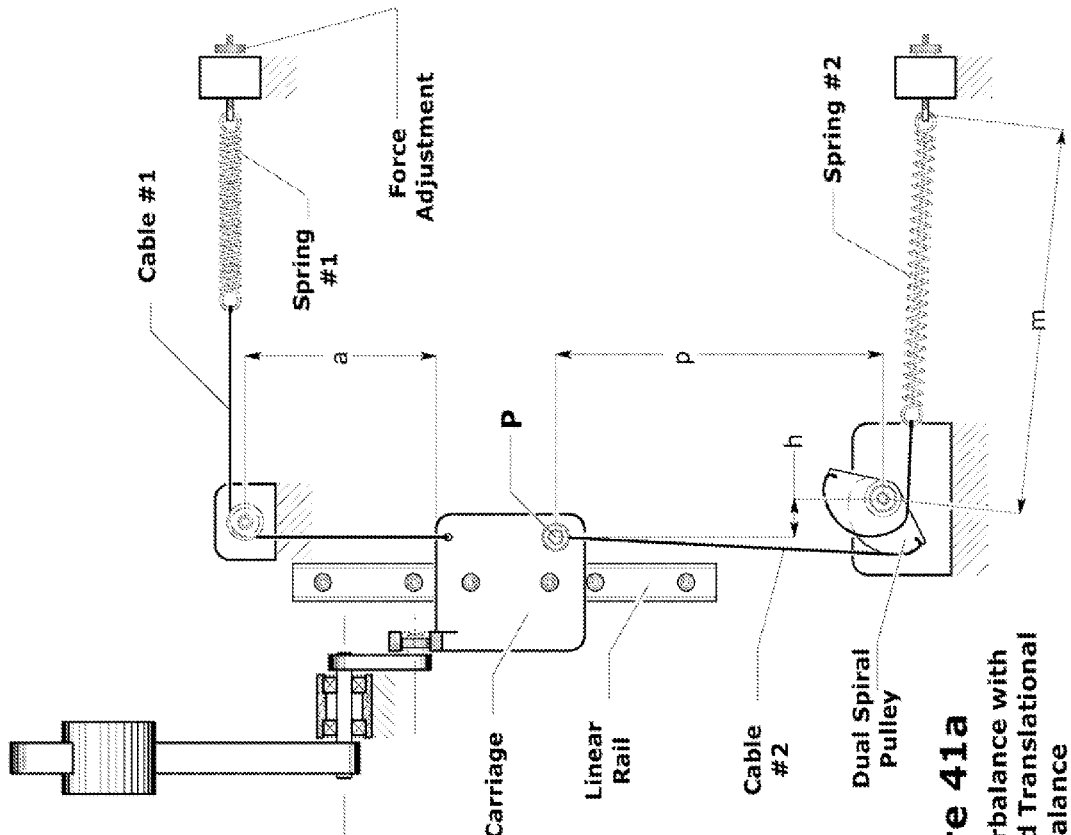
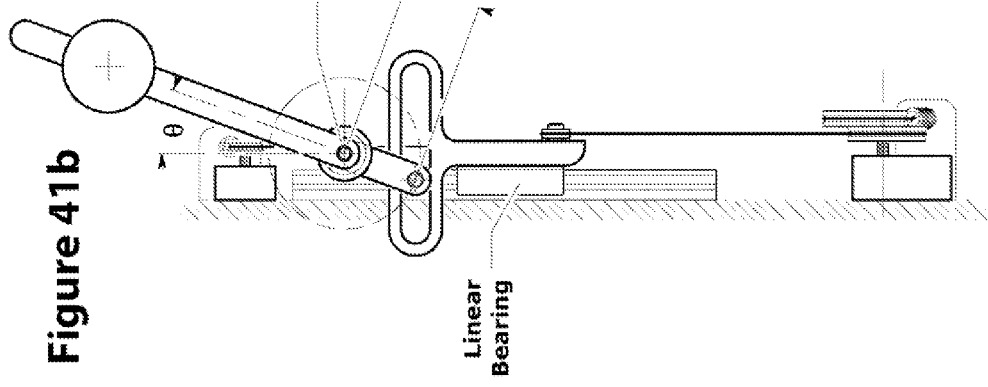
Figure 41a
Rotary Counterbalance with Scotch Yoke and Translational Counterbalance
Figure 41b

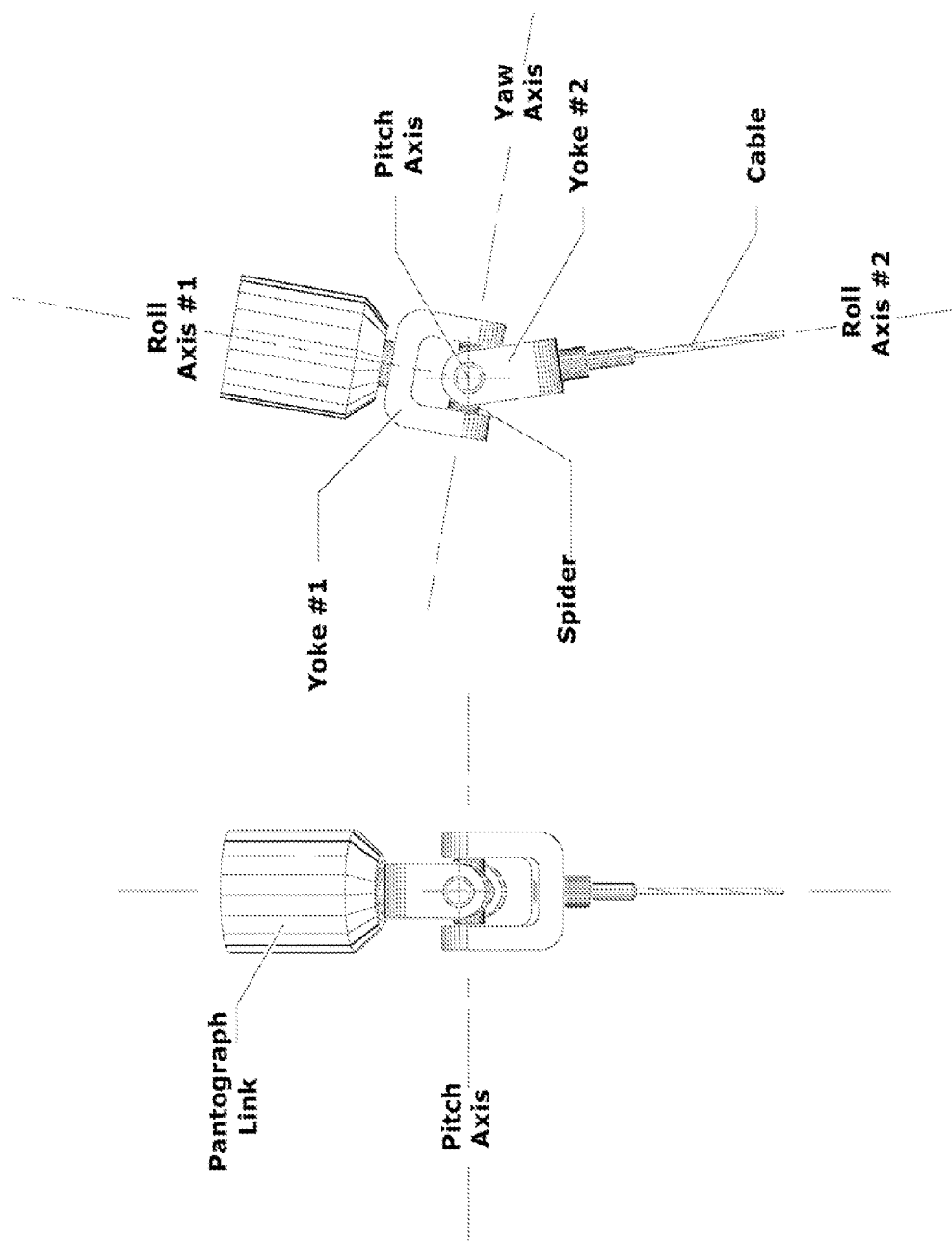

Phase Shifted Counterbalance Mechanism

Two Degree of Freedom
Elbow Pantograph

Three Degree of Freedom Elbow Pantograph

Three Degree of Freedom Elbow Pantograph

Three Degree of Freedom
Elbow Pantograph

Remote Rotary Counterbalance with Scotch Yoke

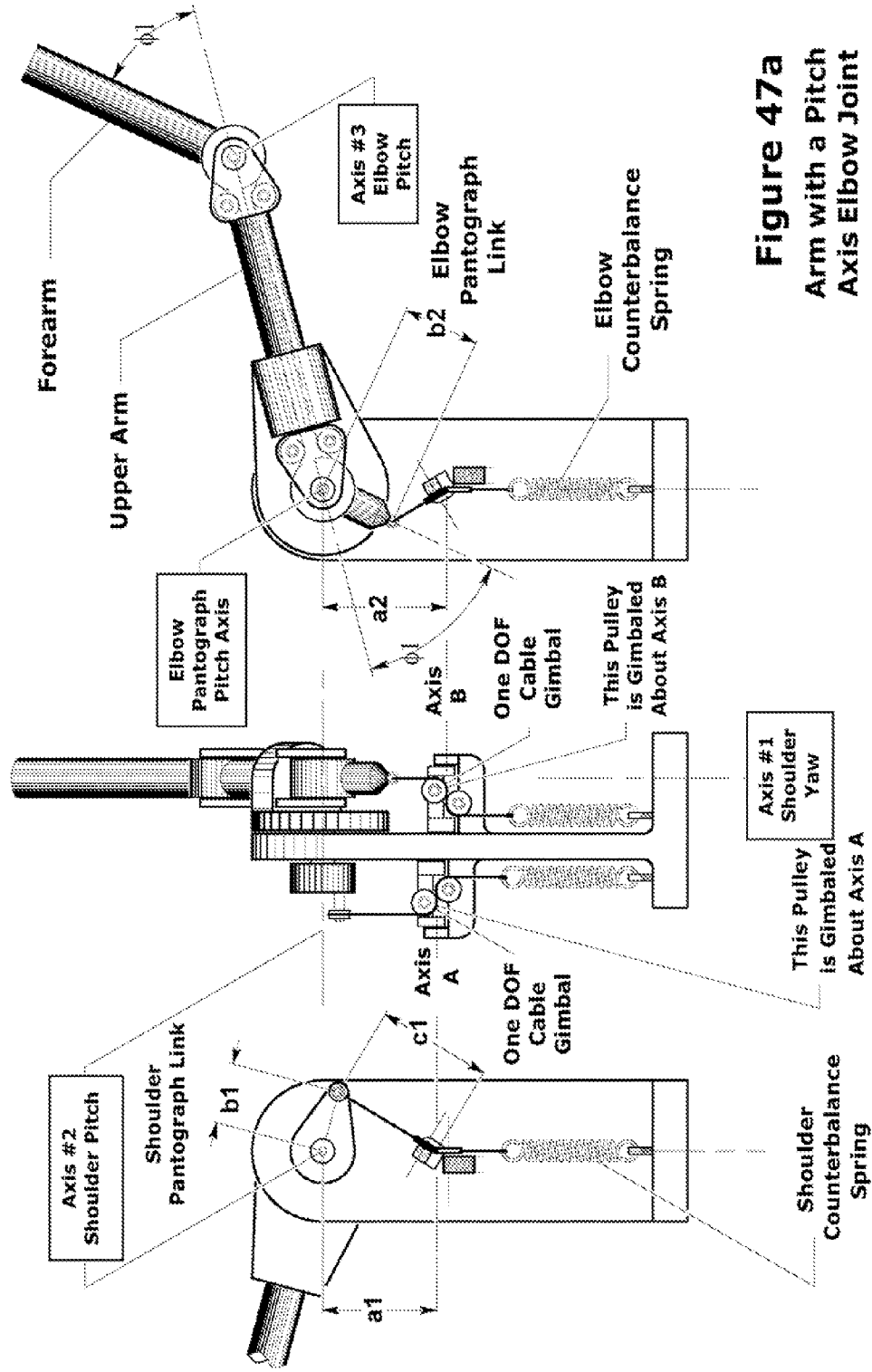

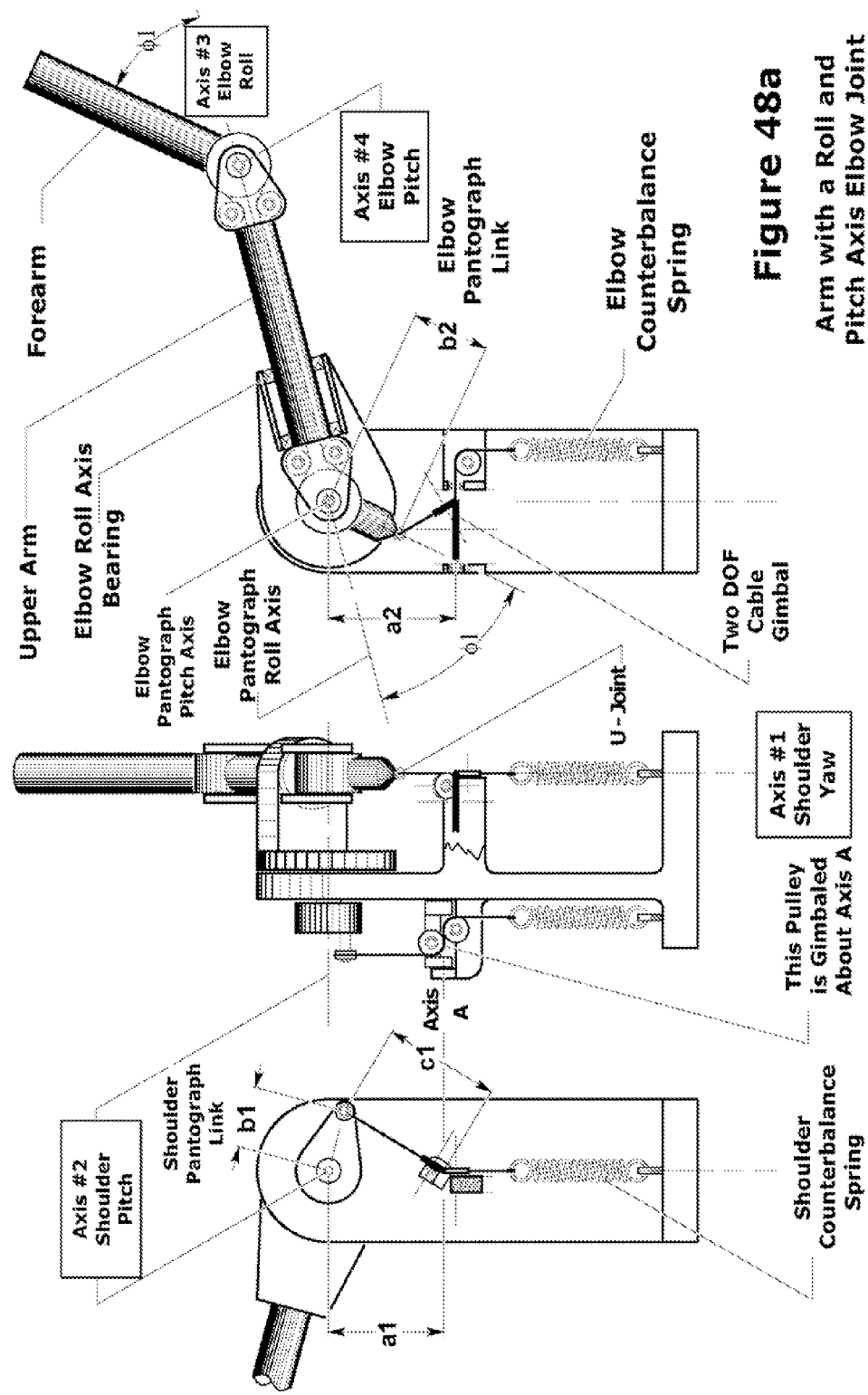

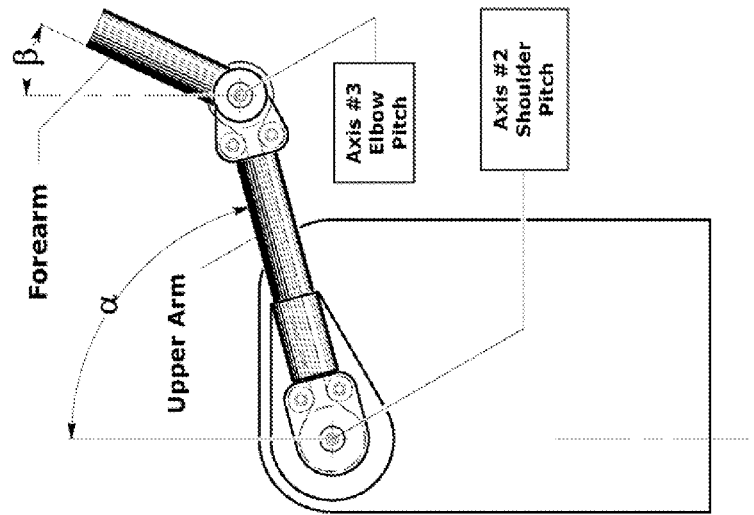
Figure 49a
Arm with a Large ROM Elbow and Shoulder
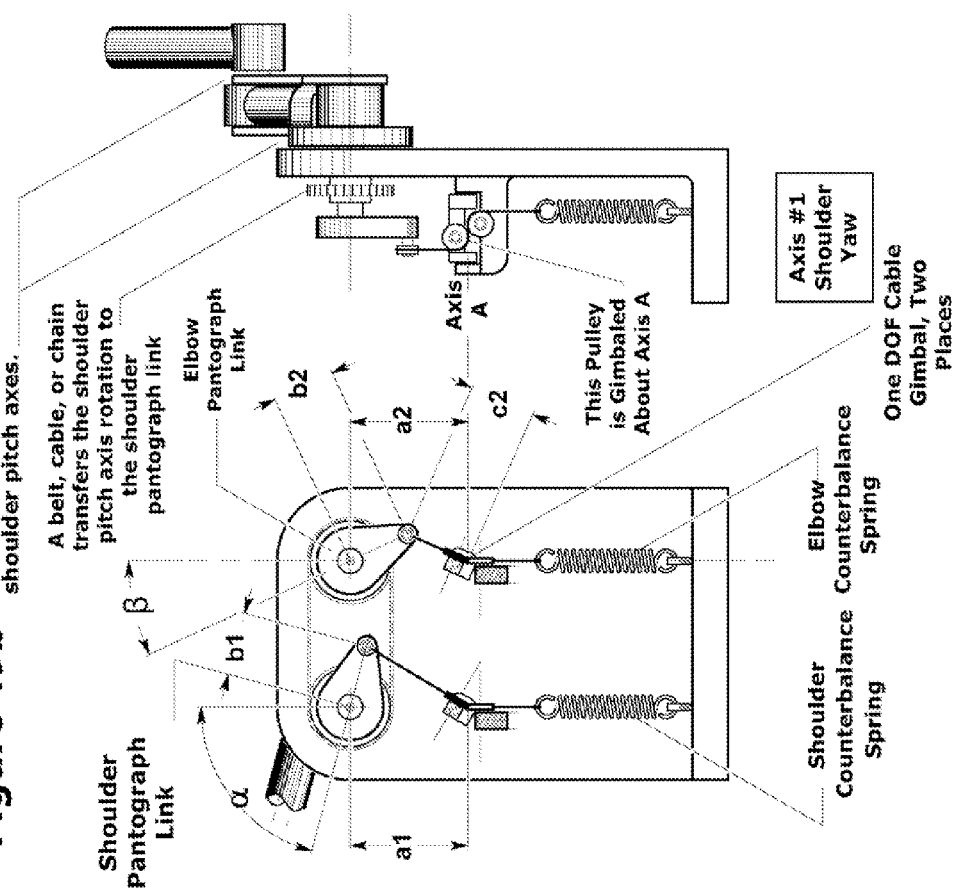
Figure 49b
Figure 49c

Arm with a Pitch and Yaw Axis Elbow Joint

Arm with a Three DOF Elbow Joint

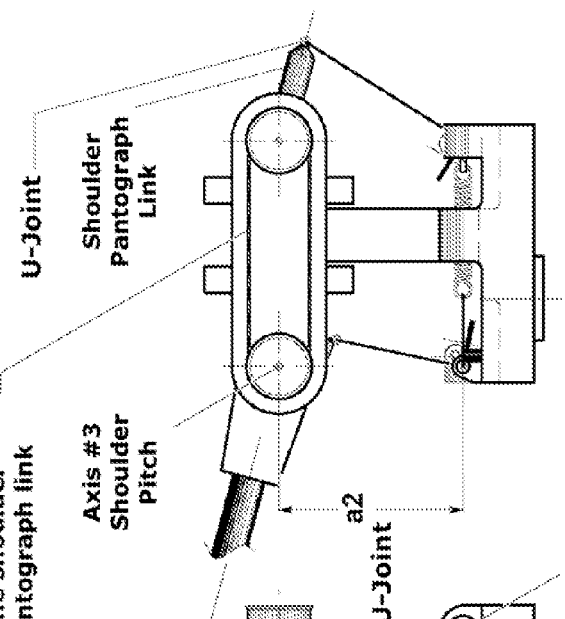
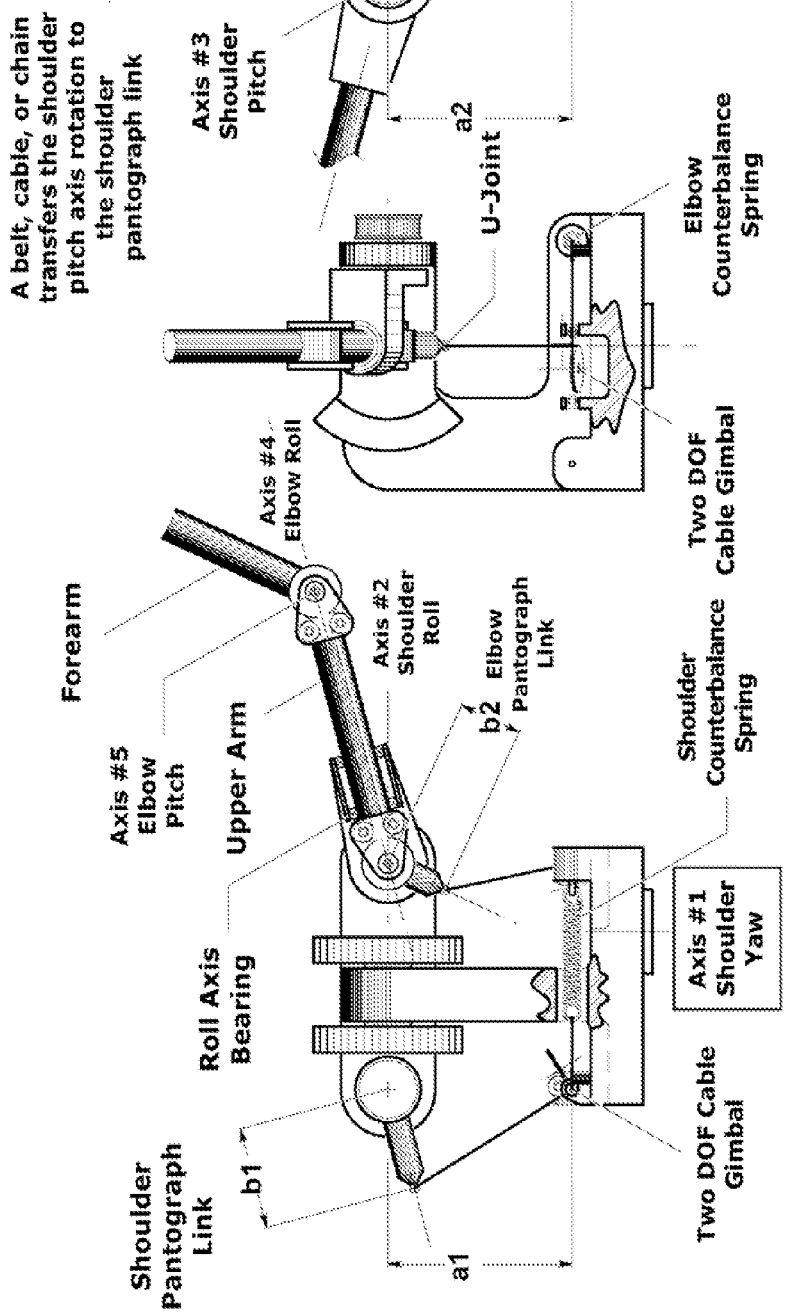
Figure 52a
Arm with a Three DOF Shoulder Joint
and a Two DOF Elbow Joint
Figure 52b
Figure 52c

Arm with a Four DOF Shoulder Joint and a Two DOF Elbow Joint

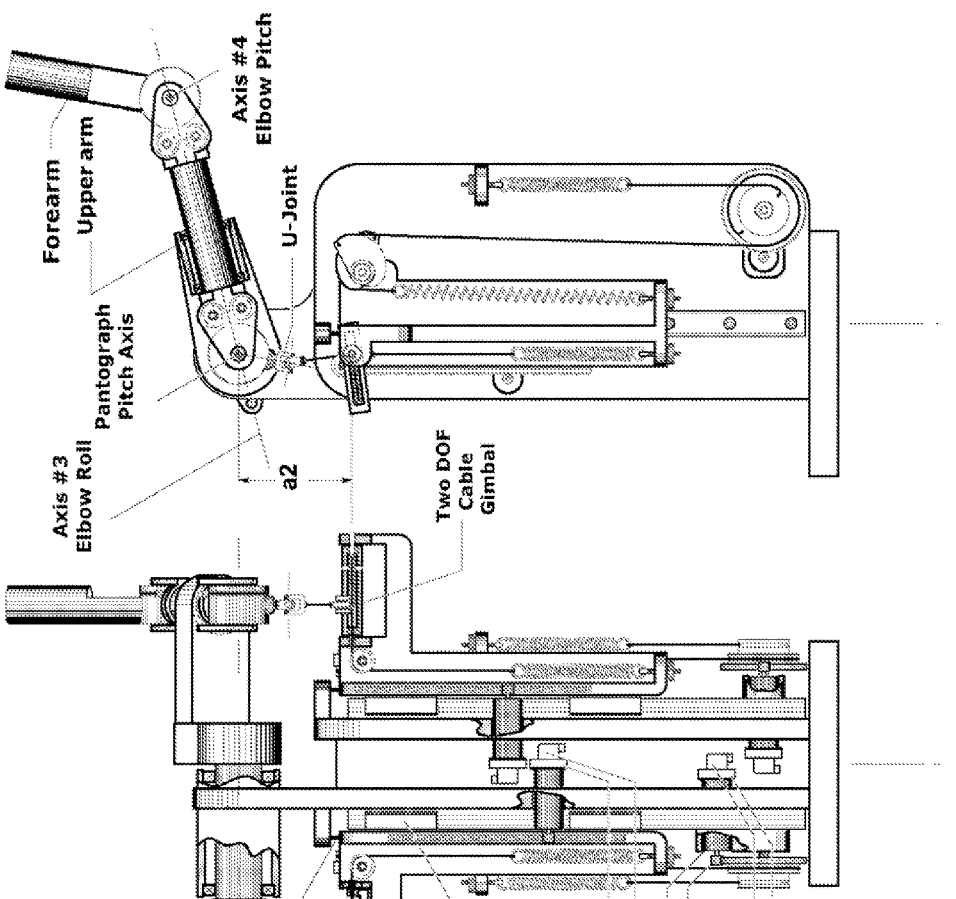
Figure 54a / Figure 54b / Figure 54c
Arm with a Two DOF Shoulder Joint and a Two DOF Elbow Joint Adjustable Stiffness Rotary Counterbalance

MECHANICAL ARM INCLUDING A COUNTER-BALANCE

CLAIM OF PRIORITY

This application is a continuation of U.S. patent application Ser. No. 10/443,459, entitled "Counter Balance System and Method with One or More Mechanical Arms," filed May 22, 2003, now U.S. Pat. No. 7,428,855 which claims priority to U.S. Provisional Application No. 60/382,497, filed May 22, 2002 and U.S. Provisional Application No. 60/382,654, filed May 23, 2002, both of which are incorporated herein in their entireties.

FIELD OF THE INVENTION

The present invention is directed to mechanical arm systems including one or more mechanical arms.

BACKGROUND OF THE INVENTION

There are a number of robotics systems including one or multiple arms which are linked together in order to perform tasks such as lifting and moving objects and tools from one location to another in order to perform these tasks. As the arms and objects and tools have weight, other substantial motors must be used in order to move packages from one location to another. With such motors, such systems may not be as user friendly as desirable. In other words, such systems may require substantial energy in order to operate and will not have as delicate a touch as required for various situations.

SUMMARY OF THE INVENTION

The invention is directed to overcome the disadvantages of prior art. The invention includes a number of features which are outlined below.

An Adjustable Counterbalance with Counterbalanced Adjustment (Rotary Joints)

A system is presented for counterbalancing the gravitational moment on a link when the link is supported at a point. A first spring mechanism balances the link about all axes that pass through the support point. The link can be balanced throughout a large range of motion. When load is added to or removed from the link, the first spring mechanism can be adjusted to bring the link back into balance. The force that is required to adjust the first spring mechanism is counterbalanced by a second mechanism with one or more additional springs. Little external energy is needed to adjust the counterbalance for a new load. Little external energy is needed to hold the load or to rotate the link and load to a new position. Unlike counterweight based balance systems, the spring system adds little to the inertia and weight to the link. The system can be adjusted to deliver a moment that does not balance the link. The resulting net moment on the link can be used to exert a moment or force on an external body.

A Counterbalance System for Serial Link Arms

Several systems are presented for counterbalancing mechanical arms that have two or more links in series. The joints between the links may have any number of rotational degrees-of-freedom as long as all of the axes of rotation pass through a common point. For each distal link that has any vertical motion of its center-of-gravity, a series of one or more pantograph mechanisms are coupled to the link. The motion of the distal link is reproduced by the pantograph mechanisms at a proximal link where a vertical orientation is maintained. A counterbalance mechanism is attached to the proximal end of the chain of pantograph mechanisms. The proximal location of the counterbalance minimizes the rotational inertia of the arm. The counterbalance torque couples only to the balanced link. Spring or counterweight balance mechanisms can be used. A pantograph mechanism can also be used to move the counterbalance to a location where space is available.

An Adjustable Counterbalance with Counterbalanced Adjustment (Translational Joints)

A system is presented for counterbalancing the gravitational force on a link when the link is constrained by a prismatic joint to translate along a linear path. An extension spring with a stiffness K is connected to the link. A second spring mechanism with a stiffness of negative K is also connected to the link. As the link translates, the net spring force on the link is constant. The net spring force can be changed by adjusting the pretension on either spring. The force that's required to adjust the pretension is counterbalanced by a third mechanism with one or more additional springs. When load is added to or removed from the link, or when the slope of the prismatic joint is changed, the system can be adjusted to rebalance the link. Little external energy is needed to adjust the counterbalance for a new load. Little external energy is needed to hold the load or to move the link and load to a new position. Unlike counterweight based balance systems, the spring system adds little to the inertia and weight to the link. The system can be adjusted to deliver a force that does not balance the link. The resulting net force on the link can be used to exert a force on an external body. The system can be converted to counterbalance rotational motion by connecting the link to a Scotch Yoke mechanism.

Multiple Counterbalance Mechanisms Coupled to One Axis of Rotation

Two or more counterbalance mechanisms can be coupled to one axis of rotation. The net sinusoidal torque phase and magnitude can be changed by adjusting the magnitude or phase of the individual mechanisms. With multiple counterbalance mechanisms, a wider dynamic range of loads can be balanced. With the ability to adjust the phase of the sinusoidal torque, the system can be used to exert a reaction force in an arbitrary direction on another body. Embodiments of the invention further include:

1. An adjustable load energy conserving counterbalance mechanism and method as shown in the attached figures.
2. A multiple series link balance mechanisms and methods as shown in the attached figures.
3. An adjustable counterbalance with a counterbalance adjustment with rotary joints as shown in the figures.
4. A counterbalance system for series link arms as shown in the figures.
5. An adjustable counterbalance and counterbalance adjustment with translational joints as shown in the figures.
6. Multiple counterbalance mechanisms and methods coupled to one axis of rotation shown in the figures.

BRIEF DESCRIPTION OF THE DRAWINGS

FIGS. 4a and 4b are illustrations of the cable gimbal counterbalance;

FIGS. 5a and 5b are illustrations of the spiral spring mechanism;

FIGS. 6a, 6b, and 6c are illustrations of the two degree of freedom cable gimbal mechanism;

FIGS. 8a, 8b, and 8c are illustrations of the two degree of freedom cable gimbal mechanism;

FIGS. 14a, 14b, and 14c are spreadsheets of equations for a sliding pivot spiral pulley;

FIG. 15 is a graphical illustration of a pulley tangent radius for sliding pivot, constant torque, spiral pulley;

FIGS. 20a and 20b are spreadsheets of questions for a fixed pivot spiral pulley;

FIG. 22 is a graphical illustration of a comparison of fixed pivot and sliding pivot pulley radii;

FIGS. 23a and 23b are illustrations of a load adjustment counterbalance with the spiral pulleys on the carriage;

FIGS. 28a and 28b are illustrations of a load compensation counterbalance;

FIGS. 35a and 35b, 36a and 36b, and 37a and 37b are illustrations of the adjustable translational counterbalance;

FIGS. 38a and 38b, and 39a and 39b are illustrations of the translational counterbalance with an adjustment counterbalance;

FIGS. 40a and 40b are illustrations of a translational counterbalance with an adjustment counterbalance and position compensation;

FIGS. 41a and 41b are illustrations of a rotary counterbalance with a scotch yoke;

FIGS. 42a and 42b are illustrations of a universal joint;

FIGS. 47a, 47b, and 47c are illustrations of a pitch axis elbow joint;

FIGS. 48a, 48b, and 48c are illustrations of an arm with a roll and pitch axis elbow joint;

FIGS. 49a, 49b, and 49c are illustrations of an arm with a large ROM elbow and shoulder;

FIGS. 52a, 52b, and 52c are illustrations of an arm with a three DOF shoulder joint;

FIGS. 54a, 54b, and 54c are illustrations of an arm with a two DOF shoulder and two DOF elbow.

DETAILED DESCRIPTION OF THE PREFERRED EMBODIMENTS

Outline of Theory of Operation

1. General Case, Rotational Gravity Counterbalance
2. Zero-Length Spring and Cable Gimbal Mechanism
3. Adjustment of the Gravity Counterbalance
   Analysis of the force needed to adjust the gravity counterbalance
4. Counterbalancing of the Adjustment Mechanism
   The required force profile
   Derivation of the geometry for a sliding-pivot spiral pulley
   Derivation of the geometry for a fixed-pivot spiral pulley
5. Link-Angle Compensation and Counterbalance Mechanism
   Other versions of the link-angle compensation and counterbalance mechanism
6. Load Compensation and Counterbalance Mechanism
7. System Operation
   Fixed Gravity Counterbalance
   Adjustable Gravity Counterbalance
   Gravity Counterbalance with Counterbalanced Adjustment
   Gravity Counterbalance with Counterbalanced Adjustment and Link-Angle Compensation
   Gravity Counterbalance with Counterbalanced Adjustment and Link-Angle Compensation with Counterbalance
   Gravity Counterbalance with Counterbalanced Adjustment, Link-Angle Compensation with Counterbalance, and Load Compensation
   Gravity Counterbalance with Counterbalanced Adjustment, Link-Angle Compensation with Counterbalance, and Load Compensation with Counterbalance 8. Multiple Counterbalance Mechanisms on the same Axis of Rotation
   Dual Opposed Counterbalance
   Multiple Mechanisms for adjustable phase and magnitude
   Dual Phase Shifted Counterbalance Mechanism
9. Translational Counterbalance Mechanisms
10. A Rotary Counterbalance made from a Scotch Yoke and Translational Counterbalance Mechanism
11. Extending the Counterbalance to Multiple Degrees of Freedom
12. Extending the Counterbalance to Multiple Link Arms
    Pantograph Mechanisms
    Reasons for using a Pantograph Mechanism
    Examples of Pantograph Mechanisms
    Axial Offset Pantograph
    Phase Shifting Pantograph
    One or Two Degree of Freedom Pantograph
    Three Degree of Freedom Pantograph
    Other Parallel Axis Pantograph Mechanisms
    Pantograph Mechanisms in Series
13. Examples of Counterbalanced Two Link Arms
    Mounting constraints for the pantograph axis A System that Uses Weight to Store Energy The Effect of System Efficiency on Energy Consumption Theory of Operation 1. General Case, Rotational Gravity Counterbalance The two-link arm has two gravity counterbalance mechanisms, one for each link. One of the mechanisms provides torque to counterbalance the gravity moment at the shoulder joint. The other mechanism provides torque to counterbalance the gravity moment at the elbow joint. Let's first develop the equations for counterbalancing one link at a time.

Figure 1:
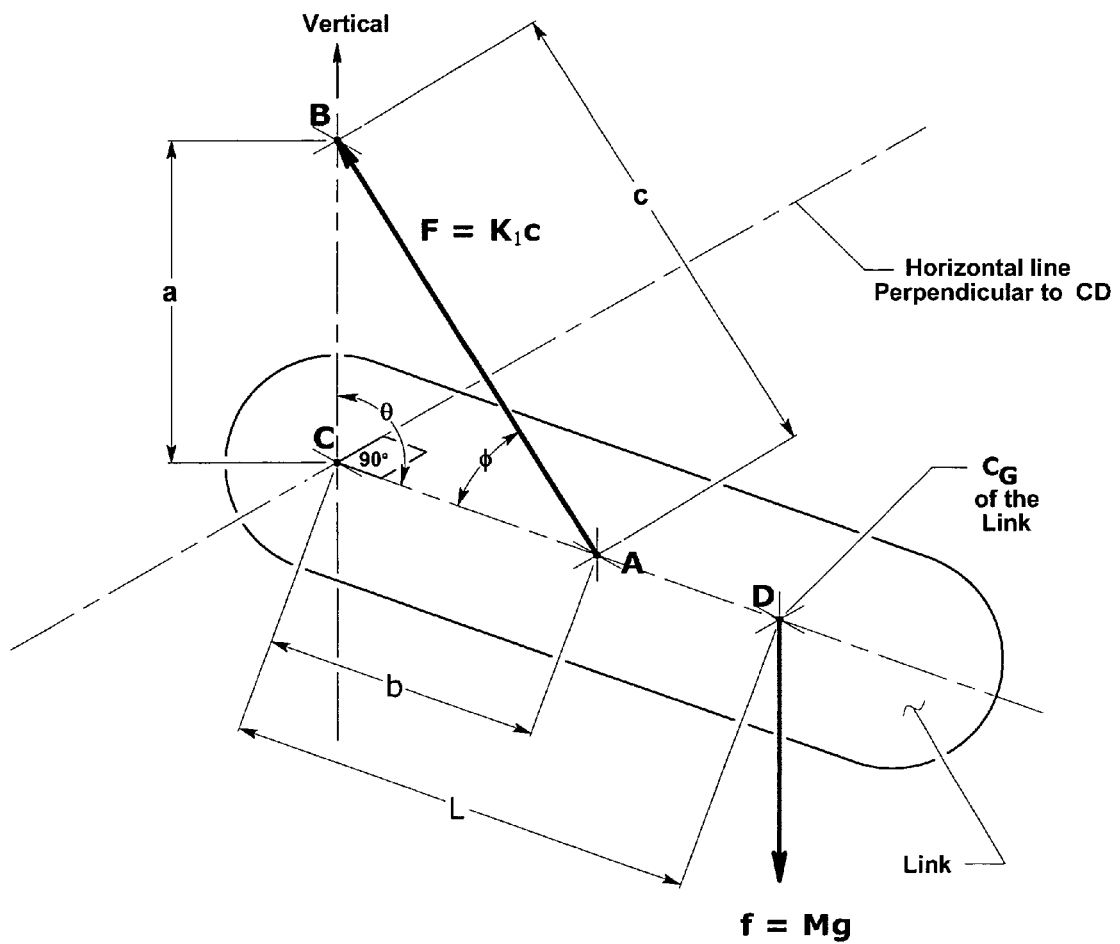
FIG. 1 is an illustration of a gravity counterbalance free body.

An unconstrained rigid body has a total of 6 degrees of freedom or DOF. Three of the DOF are translational, and three are rotational. FIG. 1 shows a free body diagram of a rigid body or link. The link has a mass M, with its center of gravity located at a point D. The link is supported in all three translational DOF at a point C, located a distance L from point D. A point B is located on the vertical line that passes through point C. The angle between CB and CD is $\theta$.

The weight of the link will act at the center of gravity of the link with a downward force f=Mg. There is a horizontal line passing through point C, that is perpendicular to both line CD and line CB. The moment or torque $T_1$ about the horizontal line, exerted by gravity force f is:

$$T_1 = MgL \sin\theta \qquad \text{eq. 1}$$

Point A is located on the line determined by points C and D. The distance between points A and B is c. The distance between points A and C is b. The distance between points B and C is a. The angle between AB and AC is $\phi$.

To counterbalance the gravity torque $T_1$, a spring or other mechanism delivers a tension force F between points A and B. Force F is proportional to a constant $K_1$ and distance c. F can be expressed by the following equation:

$$F = K_1 c. \qquad \text{eq. 2}$$

The torque $T_2$ exerted on the link about the horizontal line by force F is $$T_2 = -Fb \sin\phi \qquad \text{eq. 3}$$

From the law of sines for plane triangles, $$\frac{a}{\sin\phi} = \frac{c}{\sin\theta} \qquad \text{eq. 4}$$

Solving for $\sin\phi$ in equation 4, and substituting into equation 3 yields $$T_2 = -\frac{Fba\sin\theta}{c}$$

Substituting $K_1 c$ for F in equation 4 yields $$T_2 = -abK_1 \sin\theta \qquad \text{eq. 5}$$

The link will be counterbalanced when the sum of the moments about the horizontal line is zero.

or $T_1 + T_2 = 0$

Substituting equation 1 and equation 5 for $T_1$ and $T_2$ yields:

$$MgL \sin\theta - abK_1 \sin\theta = 0 \text{ Or} \qquad \text{eq. 6}$$

$$MgL = abK_1$$

In other words, with a spring or other mechanism that satisfies equation 2 above, the link can be counterbalanced. It is important to note that the above derivation does not place any limit on the rotational degrees of freedom of the link. The only constraint is that the translational degrees of freedom are fixed at point C. The horizontal line or axis about which the moments were calculated is a theoretical construct. A physical pivot joint with the horizontal line as its axis of rotation is not needed. In fact, even if all three rotational DOF of the link were fixed at point C, the moments exerted on the link by these constraints would be zero.

With equation 6 satisfied, the link will be counterbalanced about any and all axes that pass through point C. The link will be balanced in any orientation, over the entire range of motion or ROM of all three rotational degrees of freedom. Dimensions a, b, and spring constant $K_1$ can be positive or negative.

2. Zero-Length Spring and Cable Gimbal Mechanisms

From equation #2 above, the force that is required to counterbalance a link is proportional to the distance between points A and B. A spring that meets this requirement is sometimes called a "zero-length" spring. The term "zero-length" does not mean that the spring has a dimension of zero, but that the force extrapolates to zero as the distance between the spring pivots goes to zero.

Figure 2:
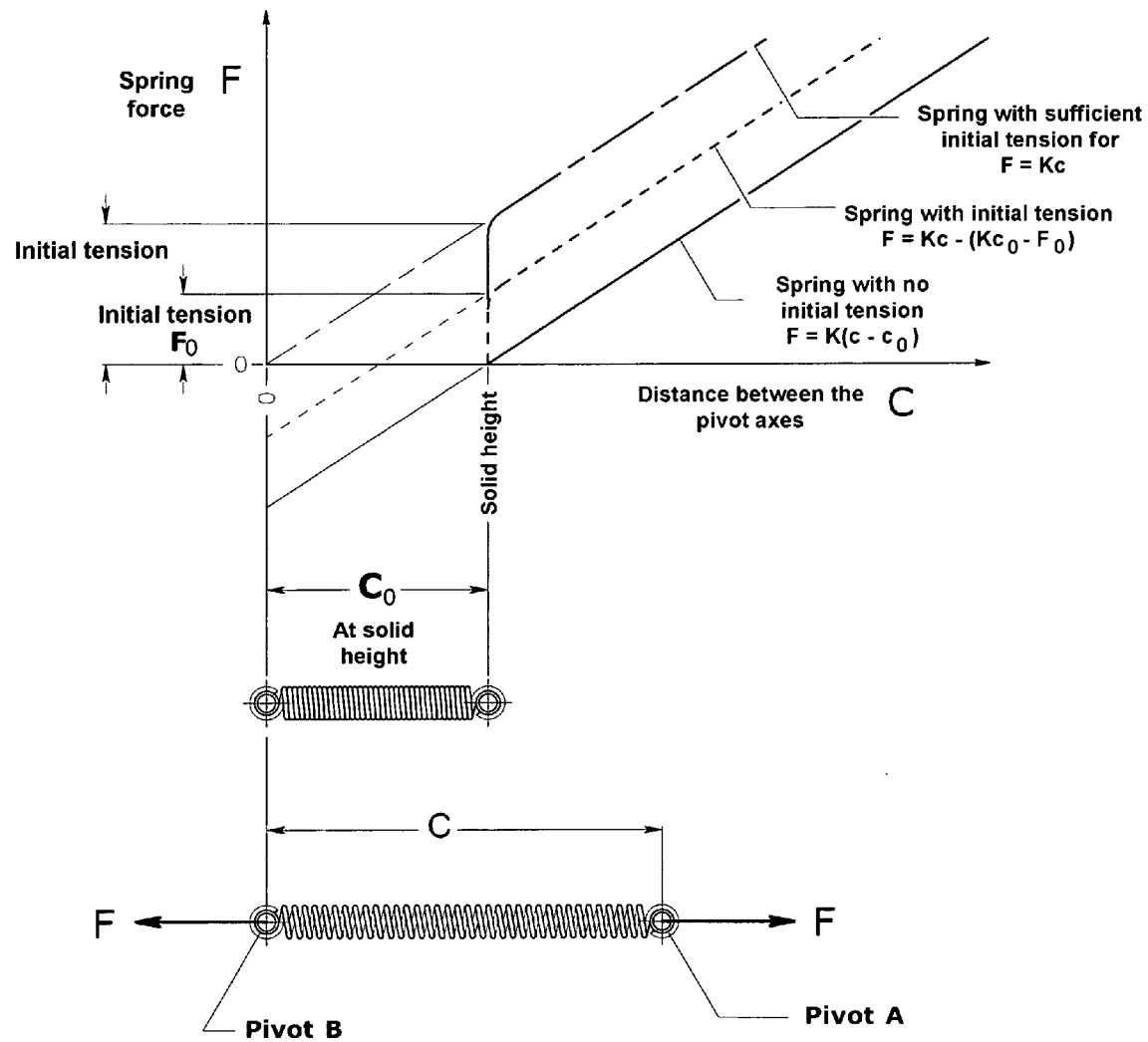
FIG. 2 is a graphical illustration of the helical spring force deflection curves.

FIG. 2 shows force-deflection curves for conventional helical extension springs. A large initial tension is needed for a spring to meet the zero-length criteria. An analysis of the torsional stress produced by the initial tension shows that zero-length springs fall outside of the range that is recommended by the Spring Manufacturers Institute.

A real spring will have tolerances associated with its force-deflection curve. Extension springs are usually specified by their spring constant or stiffness, the initial tension, and the distance between end hooks. If a spring is specified to have a force of zero at "zero-length", there will be a tolerance associated with the actual force at zero length.

Figure 3:
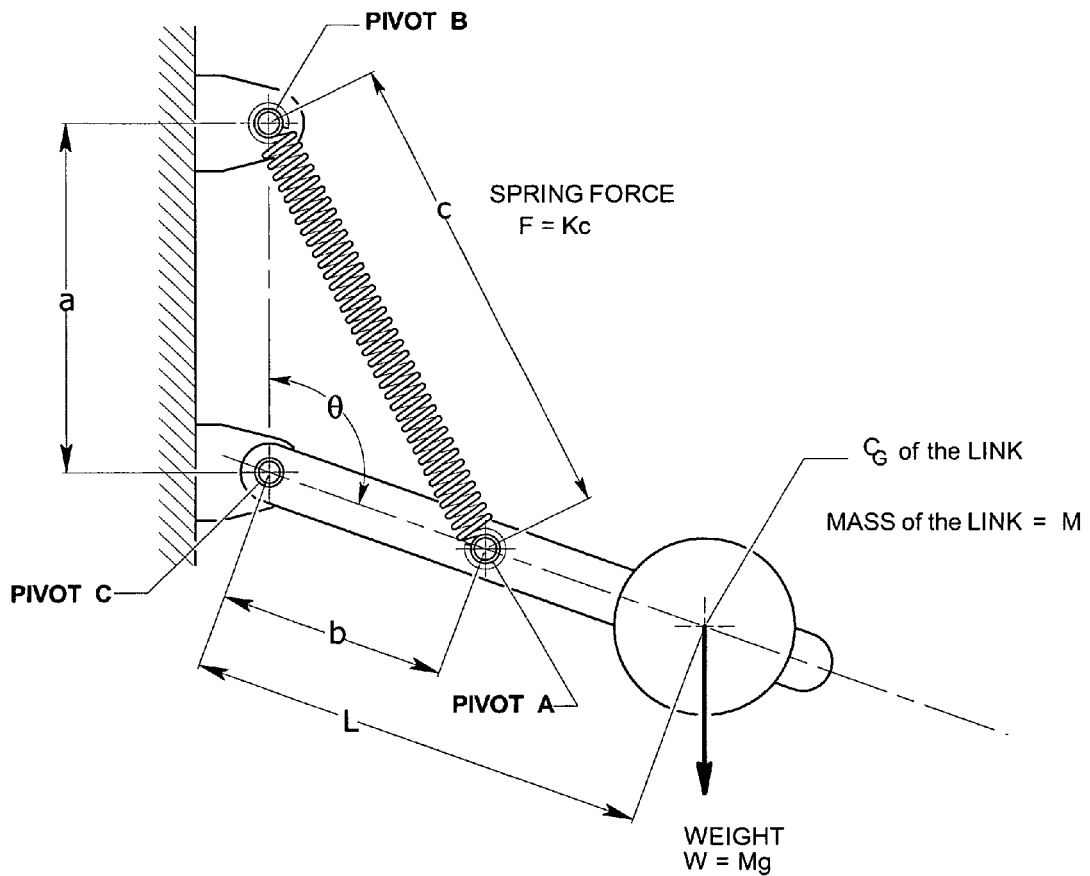
FIG. 3 is an illustration of the rotary link gravity counterbalance mechanism.
Figure 7C:
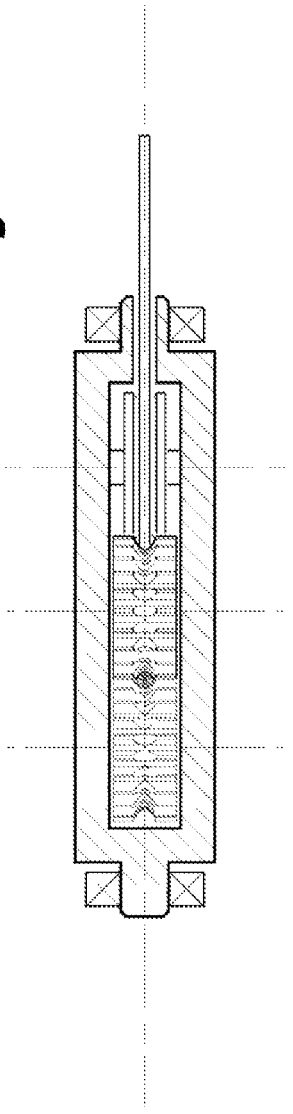
FIGS. 7a, 7b, and 7c are illustrations of the two degree of freedom cable gimbal with meshing pulleys.
Figure 7A:
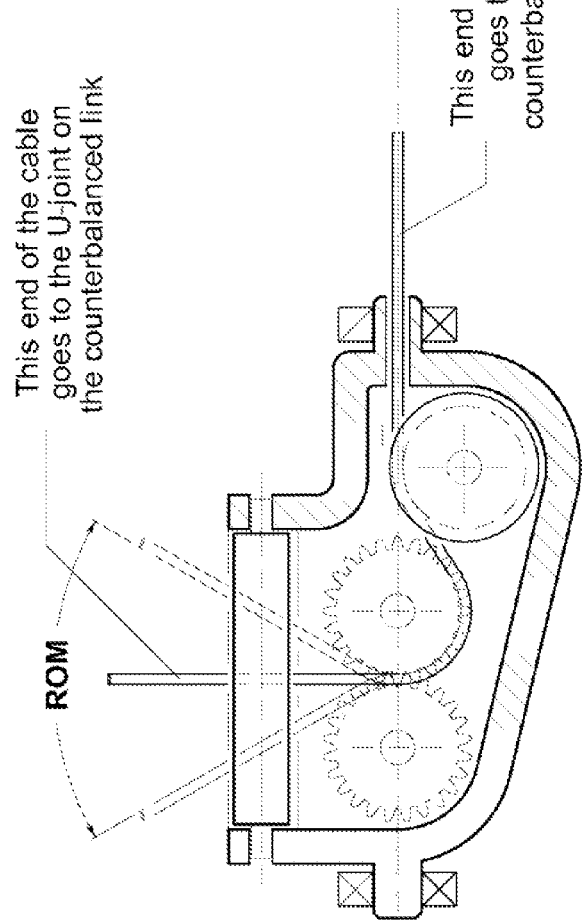
Figure 7B:
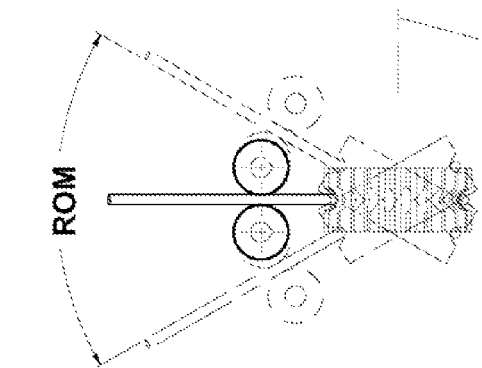

FIG. 3 illustrates another problem with using a conventional extension spring to counterbalance a link. In FIG. 3, an extension spring is mounted on two pivots. The axis of one pivot passes through point A, and the axis of the other pivot passes through point B. When the link angle θ=0°, distance c becomes: c=a−b. If the minimum length between spring pivots is greater than (a−b), then the spring will "bottom out" before the link can reach θ=0°. The angular range of motion of the link will be restricted by the spring.

Increasing dimension a, or decreasing dimension b, will make room for the spring. This will enable the link to rotate throughout a full 360°. This has a drawback however. As (a−b) gets larger, the energy stored in the spring gets larger too. As a result, for a given load, a larger spring is needed. The energy stored in a zero-length spring is equal to:

$$E = \tfrac{1}{2} K_1 c^2$$

When the link angle θ=0°, and c=a−b, the energy stored in the spring will be:

$$E_{min} = \tfrac{1}{2} K_1 (a-b)^2$$

When the link rotates to θ=180°, the spring must store the gravitational potential energy of the link. This is equal to:

$$E_{grav} = 2MgL$$

The total energy stored in the spring at q=180°, is equal to:

$$E_{total} = \tfrac{1}{2} K_1 (a-b)^2 + 2MgL$$

This shows that as (a−b) gets larger, a larger spring is needed to counterbalance the same maximum load.

FIGS. 4a and 4b show a link that is counterbalanced by a spring. The spring is remotely located from points A and B. The force from the spring is transmitted to the link by a flexible cable. This can be called a "cable gimbal mechanism". At one end, the cable is attached to the spring. The cable extends from the spring, along an axis that passes through point B. This axis is parallel to the axis of rotation of the link. The cable then wraps 90° around an idler pulley. The far end of the cable is attached to a pivot bearing that is attached to the link. The pivot bearing rotates about an axis that passes through point A. The pivot axis is also parallel to the axis of rotation of the link. The idler pulley is mounted in a yoke. The yoke is mounted on bearings in a frame or carriage that holds the spring. The yoke bearings rotate about the previously defined axis passing through point B. The cable passes through a hollow shaft in the pulley yoke.

The cable delivers a force that acts between the axis passing through point A and the axis passing through point B. The force on the link is the same as if the spring were located between the two axes. This "cable gimbal mechanism" allows dimension a to be very small without the spring restricting the rotation of the link. The cable gimbal mechanism can be adjusted to balance a link over a wide range of loads.

FIGS. 4a and 4b show how the fixed end of the spring can be attached to the frame. The spring is hooked onto a threaded spring anchor, U.S. Pat. No. 4,032,129, available from Century Spring Corp. in Los Angeles, Calif. A nut is threaded onto the screw anchor to hold it to the frame. The screw anchor and nut can be used to adjust the spring tension. The tension can be adjusted so that the force is proportional to distance c. A special "zero-length" spring is not needed for the cable gimbal mechanism. The tolerances on the spring can be very loose without affecting the performance of the system.

Other types of springs can be used in place of the extension spring. FIGS. 5a and 5b show a spiral spring mechanism. The outer end of the spiral spring is attached to a frame. The inner end of the spring is attached to a shaft. The shaft is mounted to the frame on a pair of ball bearings. A constant diameter capstan is rigidly attached to the shaft. A cable gimbal mechanism is attached to the frame. One end of a flexible cable is attached to the capstan. The cable wraps around the capstan and then passes through the cable gimbal. When the cable is extended, the tension will increase linearly with deflection. A helical torsion spring or a torsion bar spring can be used in place of the spiral spring.

FIGS. 6, 7, 8, and 13 in U.S. Pat. No. 5,435,515 show several other spring assemblies that can be used in place of the helical extension spring.

The cable gimbal shown in FIGS. 4a and 4b has one degree of freedom. The yoke and idler pulley are free to rotate about axis B. FIGS. 6a-6c, 7a-7c, and 8a-8c, show cable gimbal mechanisms with two degrees of freedom. A two degree of freedom mechanism is often needed to counterbalance a link with more than one degree of freedom.

The cable gimbal shown in FIGS. 6a, 6b and 6c has two yokes. An idler pulley is mounted to each yoke. The smaller of the two yokes is mounted on a pair of bearings in the larger yoke. The bearings enable the yoke to pivot about axis #1. The larger yoke is mounted on another pair of bearings. These bearings enable the outer yoke to pivot about axis #2. Axis #1 and axis #2 intersect at a point. The counterbalance cable enters the gimbal along axis #2. The cable wraps part way around the idler pulley on the larger yoke. It then transfers over to the idler pulley on the smaller yoke. The cable wraps 90° around the second idler pulley. At that point, the cable leaves the cable gimbal assembly. The far end of the cable is attached to a u-joint that is attached to the counterbalanced link. The intersection of axis #1 and axis #2 corresponds to point B in FIG. 1. The intersection of the axes of rotation of the u-joint corresponds to point A in FIG. 1. The cable tension acts along a line that passes through points A and B.

FIG. 7 shows another two degree of freedom cable gimbal mechanism. The gimbal yoke is pivoted about a pair of bearings. The cable enters the yoke along the pivot axis. Three idler pulleys and two guide rollers are mounted to the yoke. Two of the idler pulleys may have gear teeth cut into their periphery. These two idler pulleys are mounted so that their axes of rotation intersect the yoke pivot axis. The geared pulleys have parallel axes. The axis of the third idler pulley is parallel to the axes of the first two. All three of the idler pulleys are bisected by the plane containing the yoke gimbal axis. The third idler pulley holds the cable to the pivot axis as the cable enters the yoke assembly. The cable wraps part of the way around one of the geared pulleys. The cable passes between the two geared pulleys. The cable passes between two guide rollers as it exits the gimbal assembly. The guide rollers hold the cable so that it stays in the plane that bisects the gimbal assembly. The far end of the cable is attached to a u-joint that is attached to the counterbalanced link. The cable tension acts in the plane that bisects the gimbal assembly. The position of point A moves slightly as the cable direction changes. Point A is located in the bisecting plane, at or near the midpoint between the two geared pulley axes.

This cable gimbal should also work with only one of the two geared pulleys. The position of point A will move more through. The cable gimbal should also work without the gear teeth.

The cable gimbal mechanism in FIGS. 8a, 8b and 8c is similar to the mechanism in FIGS. 6a, 6b and 6c. An additional idler pulley has been added to the outer gimbal. This enables the gimbal to operate over a large range of motion without mechanical interference. The cable enters the outer gimbal through a hollow shaft. In the outer gimbal, the cable wraps around two idler pulleys. From there, the cable wraps one quarter of a turn around the idler pulley on the inner gimbal. The cable passes through a plastic guide as it exits the inner gimbal.

The outer gimbal is mounted on a pair of bearings. At the hollow shaft end, a ball bearing is used to take the thrust and radial loads. A needle bearing is used at the other end. The inner gimbal is also supported by a ball bearing and a needle bearing.

3. Adjustment of the Gravity Counterbalance

Now lets look at how the counterbalance mechanism can be adjusted to balance a link if MgL of the link changes. MgL may change if the mass M changes, if the distance L to the center of gravity changes, or even if the local gravitational acceleration g changes. To maintain balance, equation 6 must be satisfied. Balance can be maintained by changing any combination of the parameters a, b, or $K_1$. As will be seen later, one particularly useful way of adjusting the gravity counterbalance mechanism is to adjust dimension a. The mechanism to adjust dimension a can be located on the adjacent link or on ground. This helps to reduce the mass, size, and inertia of the moving link.

Figure 9:
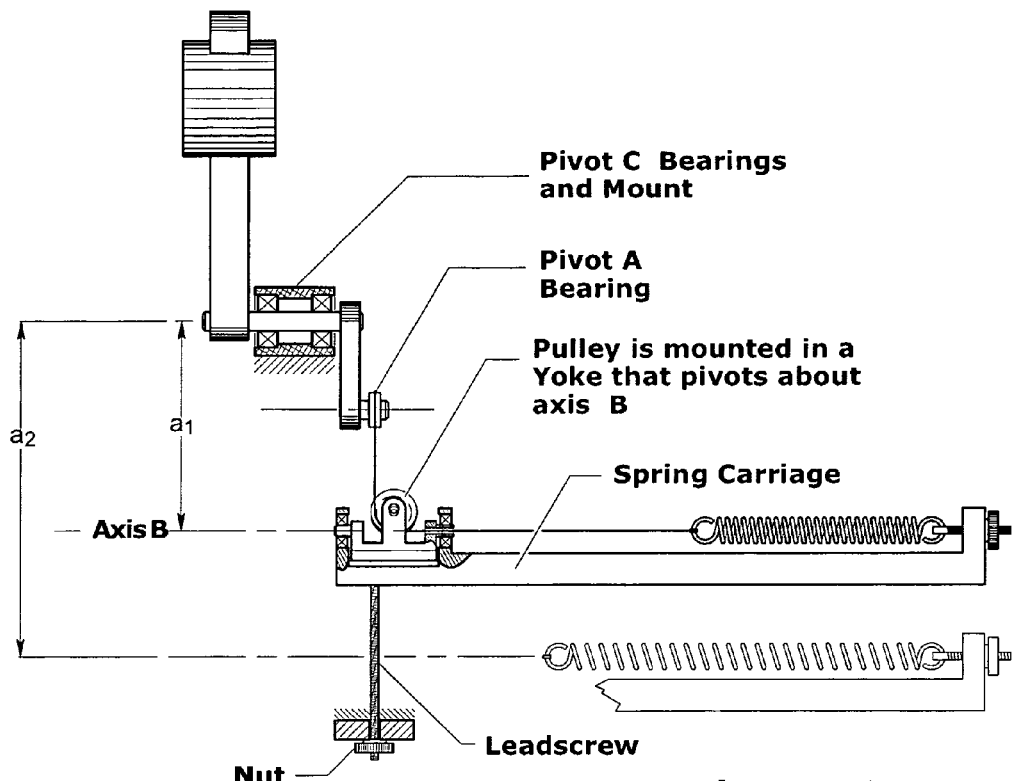
FIGS. 9a and 9b are illustrations of the manual and motorized adjustment mechanisms.
Figure 9:
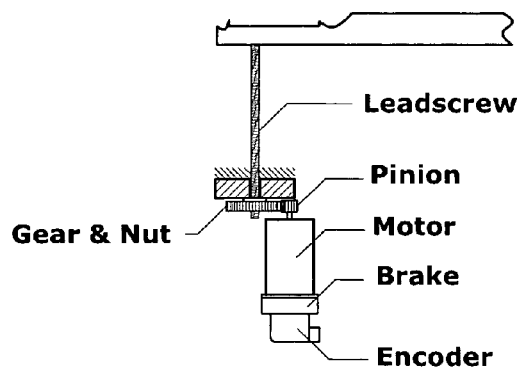

FIGS. 9a and 9b show different mechanisms for adjusting dimension a. In both figures, the spring carriage is guided by a linear bearing. The spring carriage is constrained by a bearing to move in a vertical direction. In FIG. 9a, a leadscrew is attached to the spring carriage. The leadscrew passes through a fixed member. A nut on the far end of the leadscrew can be turned to move the spring carriage up or down.

FIG. 9b shows how the nut can be replaced with a nut and gear. A motor and pinion, can then be used to power the adjustment of dimension a. An encoder and brake may be added along with a control system to automate the adjustment.

Figure 10:
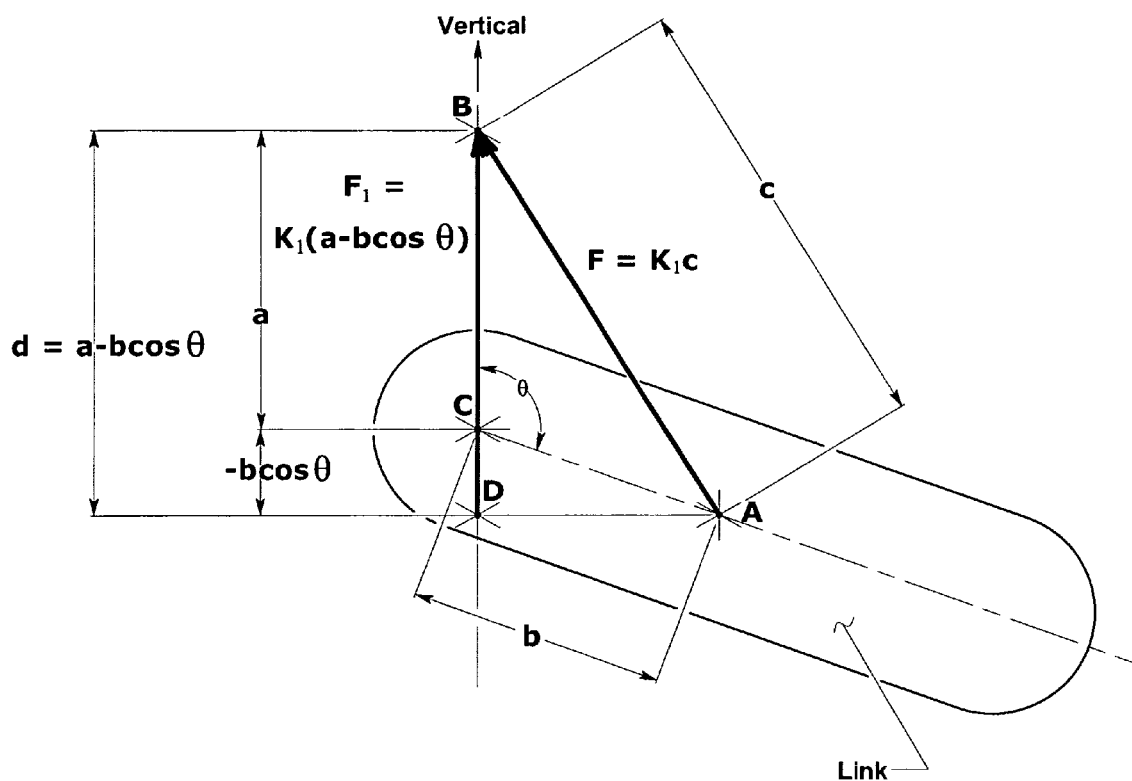
FIG. 10 is an illustration of a free body diagram of the counterbalance adjustment force.

Next, we will look at the force that's required to adjust dimension a. FIG. 10 shows a free body diagram of a counterbalanced link. As before, force $F=K_1 c$. In other words, force F is proportional to c, the distance between points A and B. If we define $F_1$ as the vertical component of force F, then $F_1$ will be proportional to the distance d, or $$F_1 = K_1 d$$

The distance between points C and D is $-b \cos \theta$. As a result, $$d = a - b \cos \theta$$

or, the adjusting force is: $F_1 = K_1(a - b \cos \theta)$      eq. 7

From equation 7, it can be seen that under most conditions, $F_1 \ne 0$ As a result, when dimension a is adjusted, energy is transferred into or out of the gravity counterbalance spring. The next section will show how force $F_1$ can be counterbalanced with the force from another spring mechanism.

4. Counterbalancing of the Adjustment Mechanism the Required Force Profile

A force is required to adjust each gravity counterbalance mechanism. The adjusting force can be counterbalanced with a second mechanism. This second mechanism is called the adjustment counterbalance mechanism.

Figure 11A:
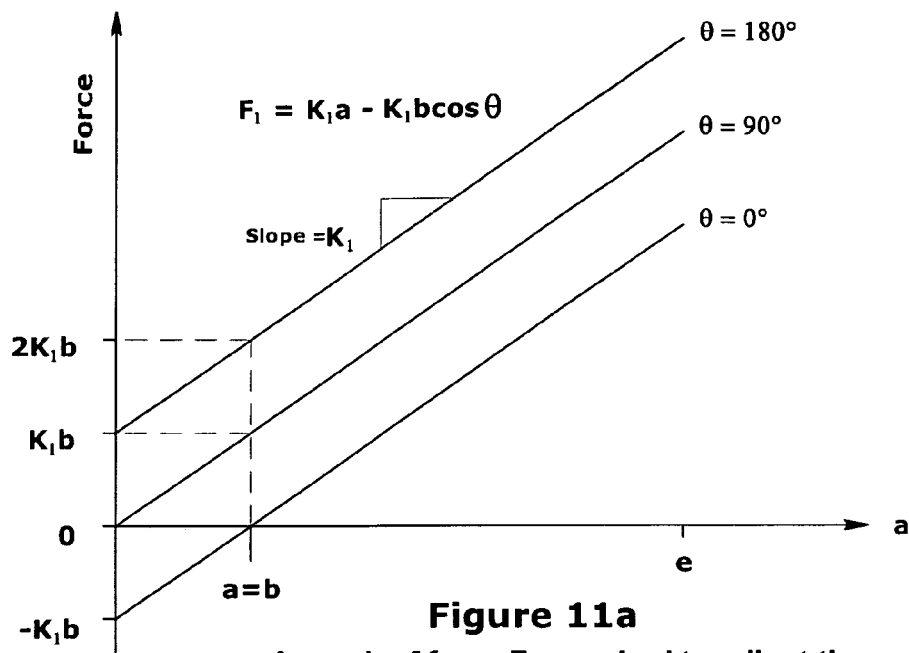
FIGS. 11a and 11b are graphical illustrations of the adjusting force curves.
Figure 11B:
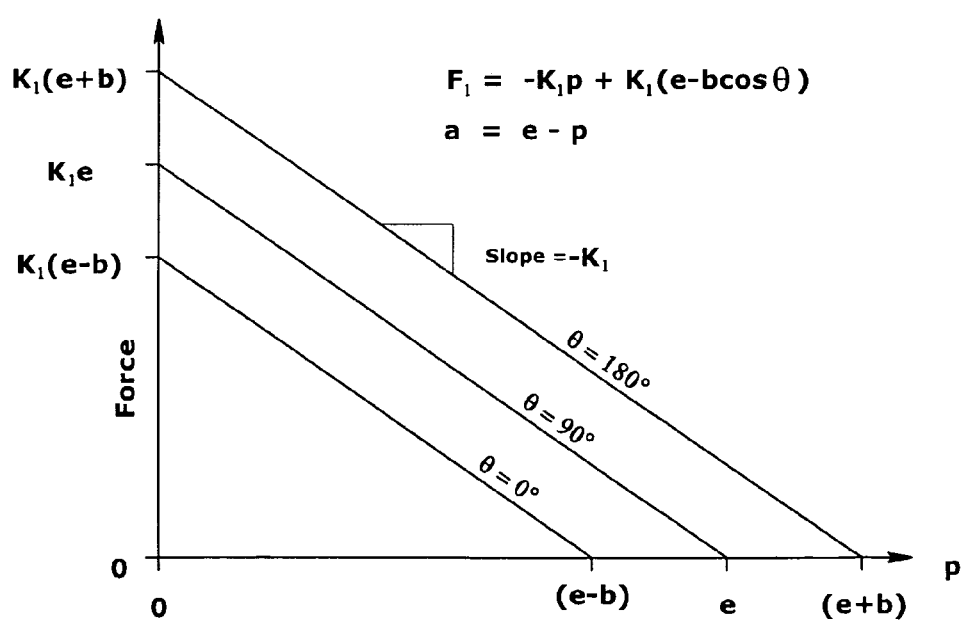

From equation 7, the force required to adjust a gravity counterbalance mechanism varies with the spring constant $K_1$ of the gravity counterbalance spring, dimension a, dimension b, and the link angle θ. Assuming that $K_1$, b, and θ, are constants, I will first show how a spring mechanism can be used to balance force $F_1$, as only dimension a changes. Later, I will show how the mechanism can be modified to balance the adjustment force when θ or b are changed. First, lets call the spring that counterbalances the gravity torque on a link, spring #1. As spring #1 extends, the adjustment counterbalance spring system contracts. From equation 7, FIG. 11a shows a graph of $F_1$. This is the force required to extend spring #1 as a function of dimension a. FIG. 11b shows a graph of the force required to extend the adjustment counterbalance spring mechanism as a function of dimension p. Dimension p is the extension of the counterbalance spring mechanism. The two figures represent the same force curve as viewed from different reference frames. Remember that when spring #1 extends, spring #2 contracts. The coordinate transformation from FIG. 11a to FIG. 11b is produced by substituting a=(e−p) into equation 7 to yield the following equation for the adjustment counterbalance spring system.

$$F'_1 = -K_1 p + K_1 (e - b \cos \theta)$$      eq. 8

The curves in FIG. 11b represent the force-deflection characteristics required from the adjustment counterbalance spring system. It has a negative spring constant $-K_1$. The force decreases as the spring extends. No common spring has this type of force-deflection curve. As a result, a special spring mechanism is needed for the adjustment counterbalance.

Figures 12A, 12B:
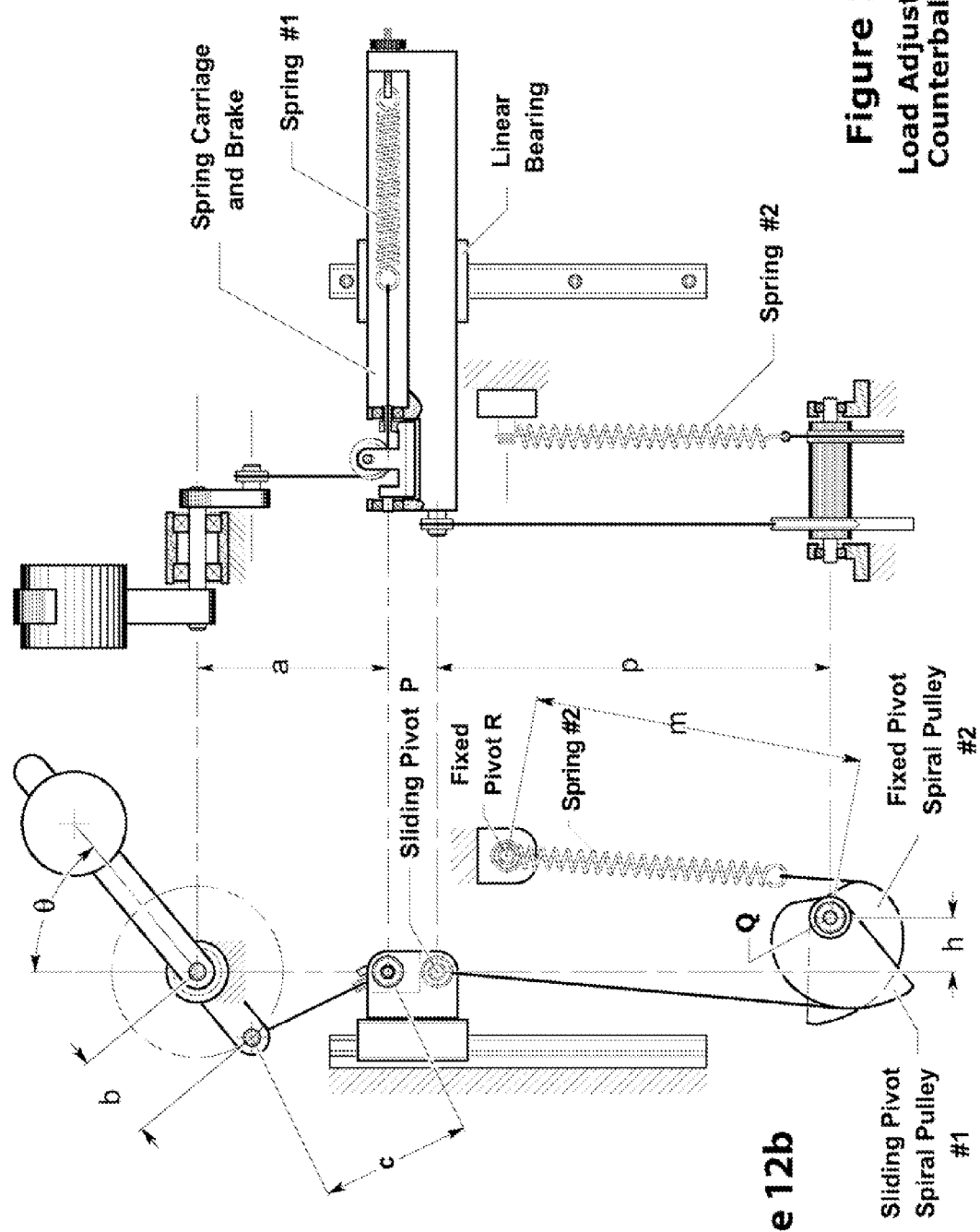
FIGS. 12a and 12b are illustrations of the load adjustment counterbalance.

FIGS. 12a and 12b show a front and side view of a spring mechanism that will produce the negative stiffness characteristics required to balance the adjustment force. The gravity counterbalance spring is shown as spring #1. As before, spring #1 is attached to a frame or carriage that is guided in a vertical direction. A pivot is attached to the carriage. One end of a flexible cable is attached to the pivot. The cable wraps around a spiral pulley. The far end of the cable is attached to the pulley.

A second spring, spring #2, is a helical extension spring with a stiffness of $K_2$. One end of spring #2 is attached to a fixed-pivot. A second flexible cable is attached to the other end of spring #2. The second cable wraps around a second spiral pulley. The end of the second cable is fixed to the second pulley.

The two spiral pulleys are coupled, either directly, through a drive shaft, or by other means. The pulleys are mounted on low friction bearings.

The force from spring #1, acting on the first spiral pulley, produces a torque in a clockwise direction. The force from spring #2, acting on the second spiral pulley, produces a torque in a counter-clockwise direction. If the magnitudes of the torques are equal, then the net torque is zero. With zero net torque, the force from spring #1 is counterbalanced.

The two spiral pulleys can be designed so that the net torque is zero over a range of pulley rotation. The force from spring #1 will be counterbalanced over this range of rotation. Note that the torque for each pulley does not need to be constant throughout the rotation of the pulleys. For balance, the torques need only be equal to each other throughout the range of rotation.

The two spiral pulleys and two cables make up a transmission. When viewed from the reference frame of the cable attached to spring #1, the reduction ratio varies continuously from a very high ratio to a very low ratio. The transmission converts the positive stiffness force from spring #2 into a negative stiffness force. It should be possible to substitute either spiral pulley with a cam and a roller follower. The spring can be connected to the roller follower. Pulleys and cables along with cams and roller followers both have very high mechanical efficiency.

Derivation of the Geometry for a Sliding-Pivot Spiral Pulley

The two spiral pulleys are not the same. Spiral pulley #1 is connected by cable to a pivot. The pivot slides along a linear path. Spiral pulley #2 is connected by cable directly to spring #2. The opposite end of spring #2 is attached to a fixed-pivot. Spiral pulley #1 can be referred to as a "sliding-pivot" pulley. Spiral pulley #2 can be referred to as a "fixed-pivot" pulley.

Figure 13:
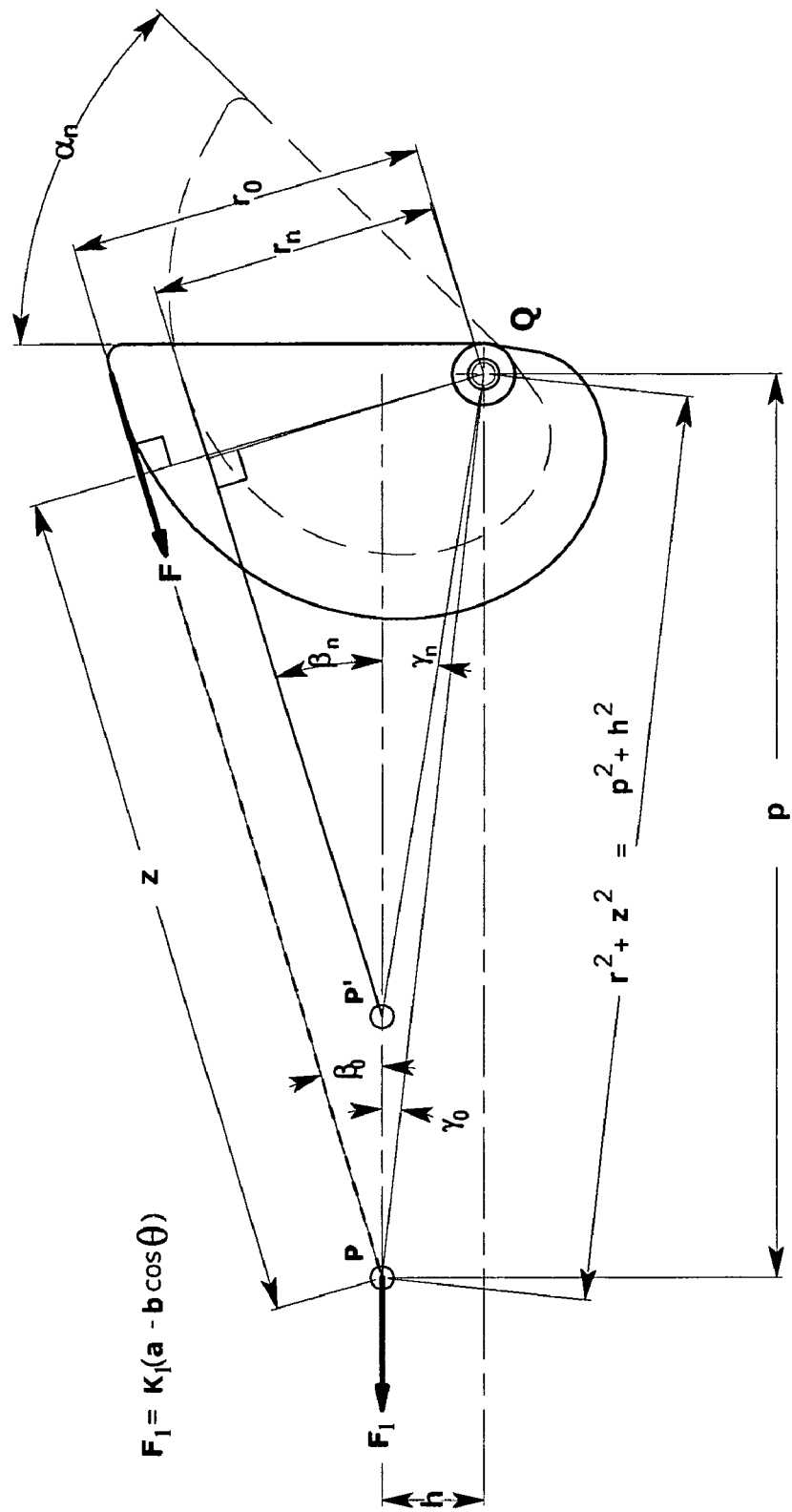
FIG. 13 is a free body diagram of a sliding pivot spiral pulley.

The shape of each pulley can be determined by the solution of a differential equation. Let's first look at pulley #1. FIG. 13 shows a free body diagram of a spiral pulley with a sliding-pivot. The axis of rotation of the cable pivot passes through point P. The axis of rotation of the pulley is parallel to the cable pivot axis. The pulley axis passes through point Q. Point P translates along a linear path that is a distance h from the pulley axis. The flexible cable extends from the pivot at point P to a tangent on the spiral pulley. The cable is in the plane that is normal to the axis of rotation of the pulley. Dimension r is the tangent radius or perpendicular distance from the pulley axis to the flexible cable. The distance along the flexible cable from point P to radius r is dimension z. Dimension p is the component of the distance between points P and Q in the direction of the translation of point P.

Angle a is the angle of rotation of the spiral pulley. Angle b is the angle between the flexible cable and the linear path of point P. Angle g is the angle between the linear path of point P and the line through points P and Q. From equation 7, the force from spring #1, acting in the direction of the sliding-pivot is:

$$F_1 = K_1(a - b\cos\theta)$$

If we define a distance x as: $x = (a - b\cos\theta)$     eq. 9 then: $F_1 = K_1 x$     eq. 10

If F is the tension in the flexible cable, the component of this tension in the direction of the translation of point P will be equal to $F\cos\beta$. The system will be in balance when:

$$F_1 = F\cos\beta.$$     eq. 11

Substituting equation 10 into equation 11 and solving for F:

$$F = \frac{K_1 x}{\cos\beta}$$

The torque $\tau$ on the pulley, produced by the force F will be:

$$\tau = Fr = \frac{K_1 x r}{\cos\beta}$$

Solving for r:

$$r = \frac{\tau\cos\beta}{K_1 x}$$     eq. 12 solving for a:

$$a = \frac{\tau\cos\beta}{K_1 r} + \beta\cos\theta$$     eq. 13

The line segment from point P to point Q is the hypotenuse of two triangles. Using the Pythagorean equation for both triangles:

$$r^2 + z^2 = p^2 + h^2$$

Solving for z: $z = (p^2 + h^2 - r^2)^{1/2}$     eq. 14

Solving for p: $p = (r^2 + z^2 - h^2)^{1/2}$     eq. 15

Now we need an equation for angle $\beta$.

$$g = \tan^{-1}(h/p)$$     eq. 16

$$(g + \beta) = \tan^{-1}(r/z)$$

Solving for $\beta$: $\beta = \tan^{-1}(r/z) - \tan^{-1}(h/p)$

When the pulley rotates by $d\alpha$ and angle $\beta$ changes by $d\beta$, then dimension z will change by dz.

$$dz = -r\, d\alpha - r\, d\beta$$     eq. 17

Equation 17 can be solved numerically with a computer by converting the differential equation into a finite difference equation. To do this, $dz$ becomes $\Delta z = z_n - z_{n-1}$ $d\alpha$ becomes $\Delta\alpha = \alpha_n - \alpha_{n-1}$ $d\beta$ becomes $\Delta\alpha = \beta_n - \beta_{n-1}$ $\alpha_n$ becomes $\overset{n}{\underset{0}{?}}\alpha$ Substituting into equation 17:

$$z_n - z_{n-1} = -r_{n-1}(\Delta\alpha + \beta_n - \beta_{n-1}) \text{ or}$$     eq. 18

$$z_n = z_{n-1} - r_{n-1}(\Delta\alpha + \beta_n - \beta_{n-1})$$

The term $\beta_n - \beta_{(n-1)}$, is needed for the numerical solution to the differential equation, but $\beta_n$ is not available when it is needed. For small steps in the numerical solution, As a result, $$\beta_n - \beta_{n-1} = \beta_{n-1} - \beta_{n-2}$$

As a result, $$z_n = z_{n-1} - r_{n-1}(\Delta\alpha + \beta_n - \beta_{n-2})$$     eq. 19

Assuming the following values for initial conditions or constants:

| | |
|---|---|
| $\alpha_0 =$ | 0° starting pulley angle |
| $\Delta\alpha =$ | Step angle for numerical solution |
| $\theta =$ | Constant link angle |
| $r_0 =$ | Starting pulley tangent radius |
| $b =$ | Constant distance from link axis of rotation to force application |
| $p_0 =$ | Starting distance from cable pivot to link axis |
| $h =$ | Constant offset distance from the linear slide to the link axis of rotation |
| $K_1 =$ | Spring constant |
| $\tau =$ | Either a constant or a desired torque profile as a function of $\alpha$. |

The following initial conditions can be calculated:

$z_0 = (p_0^2 + h^2 - r_0^2)^{1/2}$ from equation 14

$\beta_0 = \tan^{-1}(r_0/z_0) - \tan^{-1}(h/p_0)$ from equation 16 and $z_0$ above $$a_0 = \frac{t_0 \cos\beta_0}{K_1 r_0} + \beta\cos\theta$$

from equation 13 and $\beta_0$ above $p_0 = (r_0^2 + z_0^2 - h^2)^{1/2}$ from equation 15

From equation 9, $x = (a - b\cos\theta)$ thus: $(p+x) = p + (a - b\cos\theta)$

Looking at the definitions of dimension p and dimension a as seen in FIG. 12, both a and p are in the same direction. As a gets longer, p gets shorter by the same amount. If we assume for now that ($\beta\cos\theta$) is a constant, then (p+x) will be constant. We can now solve for (p+x).

$$\begin{aligned}(p+x) &= (p_0 + x_0)\\ &= p_0 + (a_0 - \beta\cos\theta)\\ &= p_0 + \frac{t_0\cos\beta_0}{K_1 r_0} + \beta\cos\theta - \beta\cos\theta\end{aligned}$$

Substituting for $p_0$ from above:

$$(p+x) = (r_0^2 + z_0^2 - h^2)^{1/2} + \frac{t_0\cos\beta_0}{K_1 r_0} \quad \text{eq. 20}$$

From equation 12

$$\begin{aligned}r &= \frac{\tau\cos\beta}{K_1 x}\\ &= \frac{\tau\cos\beta}{K_1(p + x - p)}\end{aligned}$$

Substituting equation 15 for $$p: = \frac{\tau\cos\beta}{K_1[(p+x) - (r^2 + z^2 - h^2)^{1/2}]}$$

Substituting equation 16 for $\beta$:

$$r = \frac{\tau\cos(\tan^{-1}(r/z) - \tan^{-1}(h/p))}{K_1[(p+x) - (r^2 + z^2 - h^2)^{1/2}]} \quad \text{eq. 21}$$

At step n of the finite difference equation:

$$r_n = \frac{\tau_n \cos(\tan^{-1}(r_n/z_n) - \tan^{-1}(h/p_n))}{K_1[(p+x) - (r_n^2 + z_n^2 - h^2)^{1/2}]} \quad \text{eq. 22}$$

For small step size $\Delta\alpha$, $\beta_n \approx \beta_{n-1}$. When angle $\beta$ is less than 20°, $\cos\beta_n \approx \cos\beta_{n-1}$ is a very good approximation. As a result:

$$r_n \cong \frac{t_n \cos(\tan^{-1}(r_{n-1}/z_{n-1}) - \tan^{-1}(h/p_{n-1}))}{K_1[(p+x) - (r_n^2 + z_n^2 - h^2)^{1/2}]} \quad \text{eq. 23}$$

Equation 23 has $r_n$ on both sides of the equation. If the other variables are known, $r_n$ can be solved for by numerical methods. Microsoft Excel has an equation solver that will solve the equation. Unfortunately, Excel Solver is used manually and it is very time consuming. Another way to automatically solve for $r_n$ is to use an estimate for $r_n$ in the denominator of equation 23. The result of the equation is then a better estimate for $r_n$. The new value for $r_n$ can then be used in the denominator of equation 23. This process can be repeated until the value for $r_n$ converges within desired limits. A good starting estimate for $r_n$ is $r_{n-1}$.

Substituting equation 15 into equation 16:

$$\beta_n = \tan^{-1}(r_n/z_n) - \tan^{-1}(h/(r_n^2 + z_n^2 - h^2)^{1/2}) \quad \text{eq. 24}$$

$$z_n \approx z_{n-1} - r_{n-1}(\Delta\alpha + \beta_{n-1} - \beta_{n-2}) \quad \text{eq. 19}$$

$$r_n \cong \frac{t_n \cos(\tan^{-1}(r_{n-1}/z_{n-1}) - \tan^{-1}(h/p_{n-1}))}{K_1[(p+x) - (r_n^2 + z_n^2 - h^2)^{1/2}]} \quad \text{eq. 23}$$

Equation 24 can be substituted into equation 19 to give $z_n$ as a function of $z_{n-1}$, $z_{n-2}$, $r_{n-2}$, $\Delta\alpha$, and h.

Figure 14:
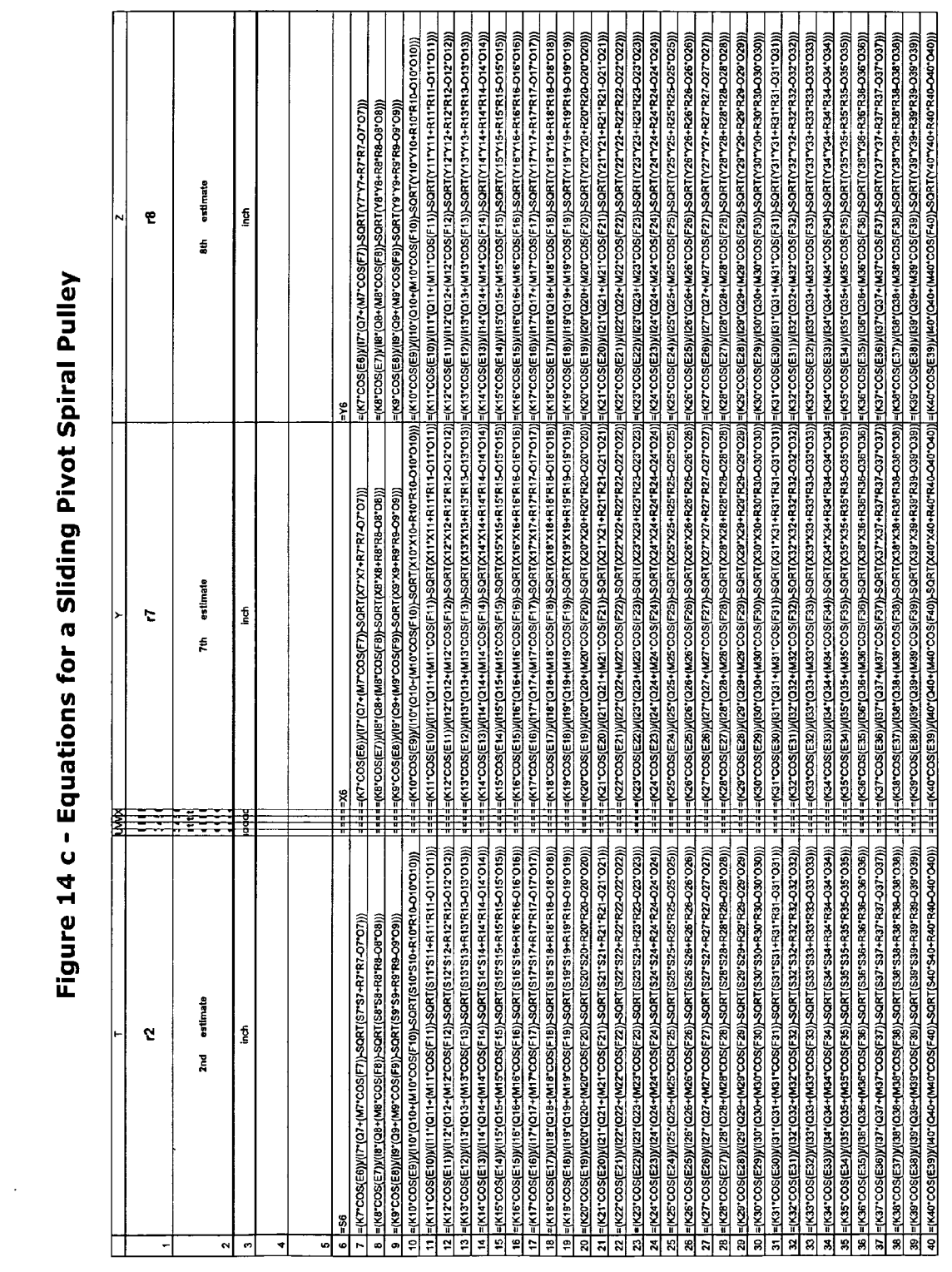

We finally have all of the equations that we need to solve the differential equation for the tangent radius r as a function of pulley angle a. FIGS. 14a, 14b, and 14c, show the above equations entered into a Microsoft Excel spreadsheet. Values for the step angle $\alpha\Delta$, link angle q, the starting pulley radius $r_0$, dimensions b, $p_0$, h, the spring constant $K_1$, and the torque t are required. The torque can be a constant or an equation. Successively smaller values of the step angle $\Delta\alpha$ should be tried until the solution converges within desired limits.

As seen in FIG. 13, when the pulley rotates by an angle $a_n$, angle $\beta$ changes from $\beta_0$ to $\beta_n$. As a result, the orientation of the cable relative to the pulley changes by the cable wrap angle $\omega$, where:

$$\omega = \alpha_n + \beta_n - \beta_0 \quad \text{eq. 25}$$

Let's look at an example, assuming the following:

Constants: $K_1 = 14.4$ lb/in
$\theta = p/2$ radians
$b = 3.0$ inches
$h = .30$ inches Initial Conditions: $\alpha_0 = 0°$
$p_0 = 12.0$ inches
$r_0 = 3.0$ inches
$\tau = 90$ in-lb. (constant torque)

FIG. 15 shows a graph of the resulting pulley tangent radius r for $\alpha = 0°$ to $\alpha = 200°$. Radius r is plotted as a function of the cable wrap angle $\omega$, and not the pulley angle $\alpha$. When the pulley rotates by $\alpha = 200°$, the cable wraps around the pulley by an angle of $\omega = 191.79°$.

Figure 16:
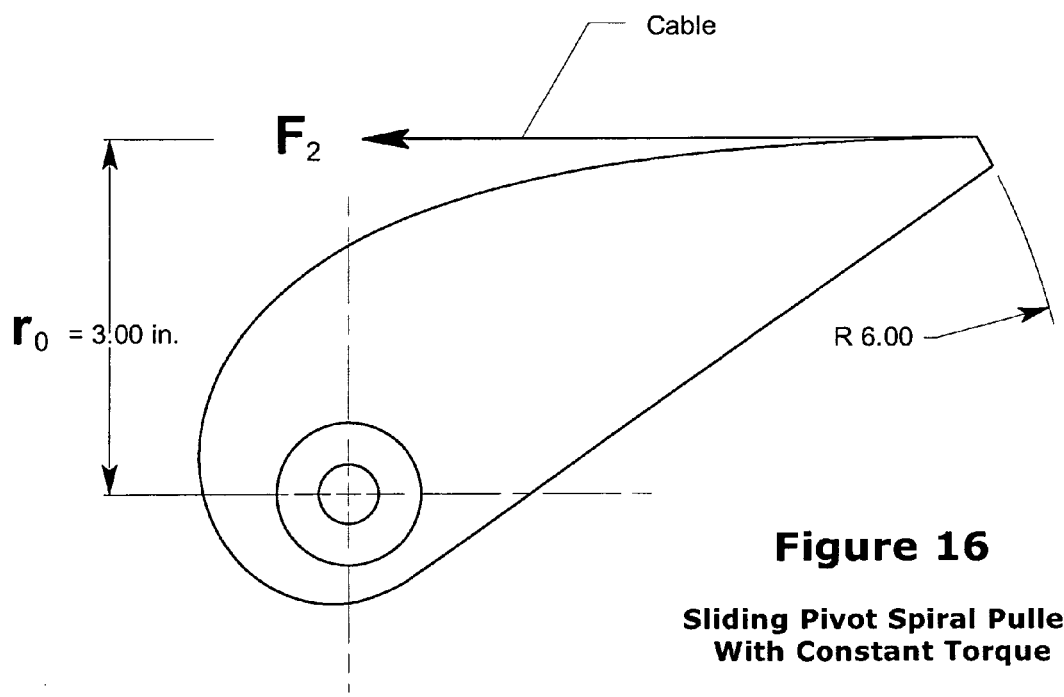
FIG. 16 is an illustration of a sliding pivot, constant torque, spiral pulley.

FIG. 16 is a drawing of the resulting sliding-pivot spiral pulley. It was created by drawing the calculated tangent line for every 5° step of the cable wrap angle $\omega$. Line segments were formed between intersections of tangent lines. A spline curve was drawn through the midpoints of the line segments. The spline curve represents the centerline or neutral axis of the cable as it bends around the spiral pulley.

Figure 17:
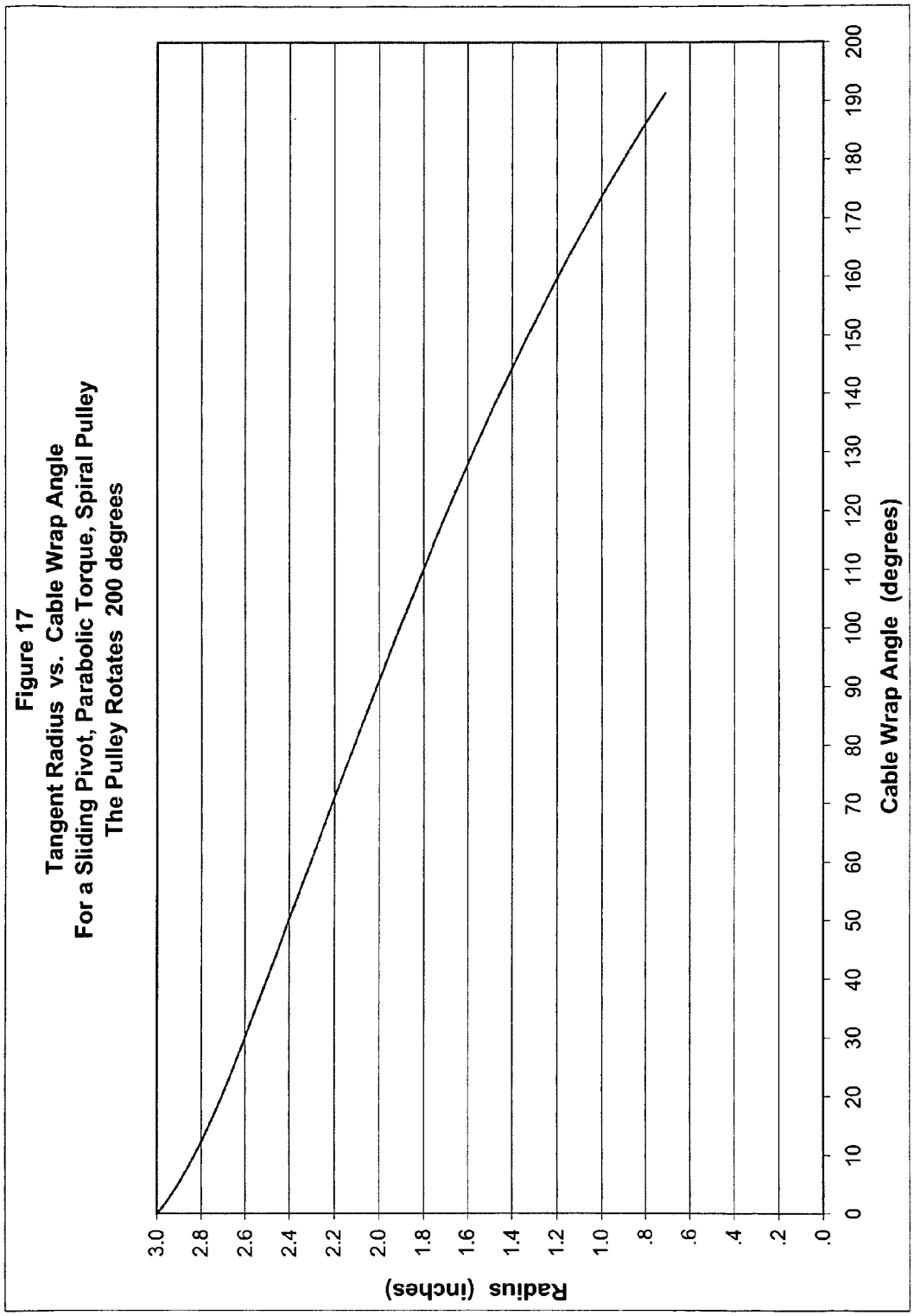
FIG. 17 is a graphical illustration of a pulley tangent radius for a sliding pivot, parabolic torque, spiral pulley.

As mentioned earlier, the pulley torque does not need to be a constant. FIG. 17 shows a graph of pulley tangent radius r for a pulley with a parabolic torque profile. All of the other parameters for this pulley are identical to the previous constant torque pulley. The torque profile is symmetric about $\alpha=100°$. The torque $\tau$ varies from 90 in-lb$_f$ at $\alpha=0°$, up to 180 in-lb$_f$ at $\alpha=100°$, and back down to 90 in-lb$_f$ at $\alpha=200°$.

Figure 18:
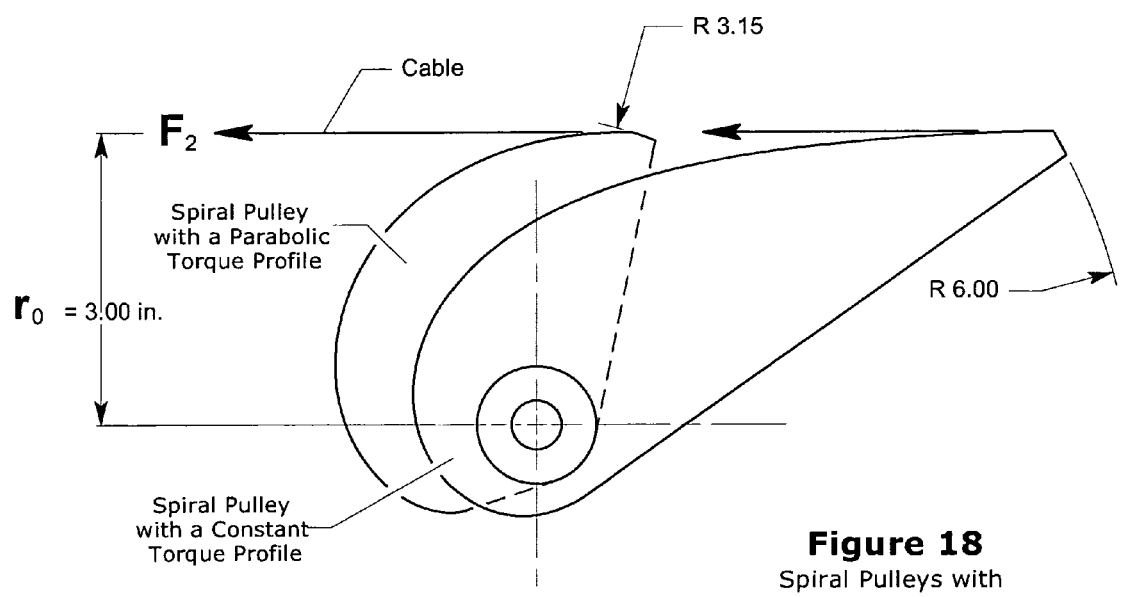
FIG. 18 is an illustration of a sliding pivot, constant and parabolic torque, spiral pulleys.

FIG. 18 shows the new pulley with the parabolic torque profile along with the previous constant torque pulley. It can be seen that the parabolic torque pulley is more compact than the constant torque pulley. Not only is the pulley smaller but also it transfers 66.6% more energy over the 200° rotation.

Derivation of the Geometry for a Fixed-Pivot Spiral Pulley

Figure 19:
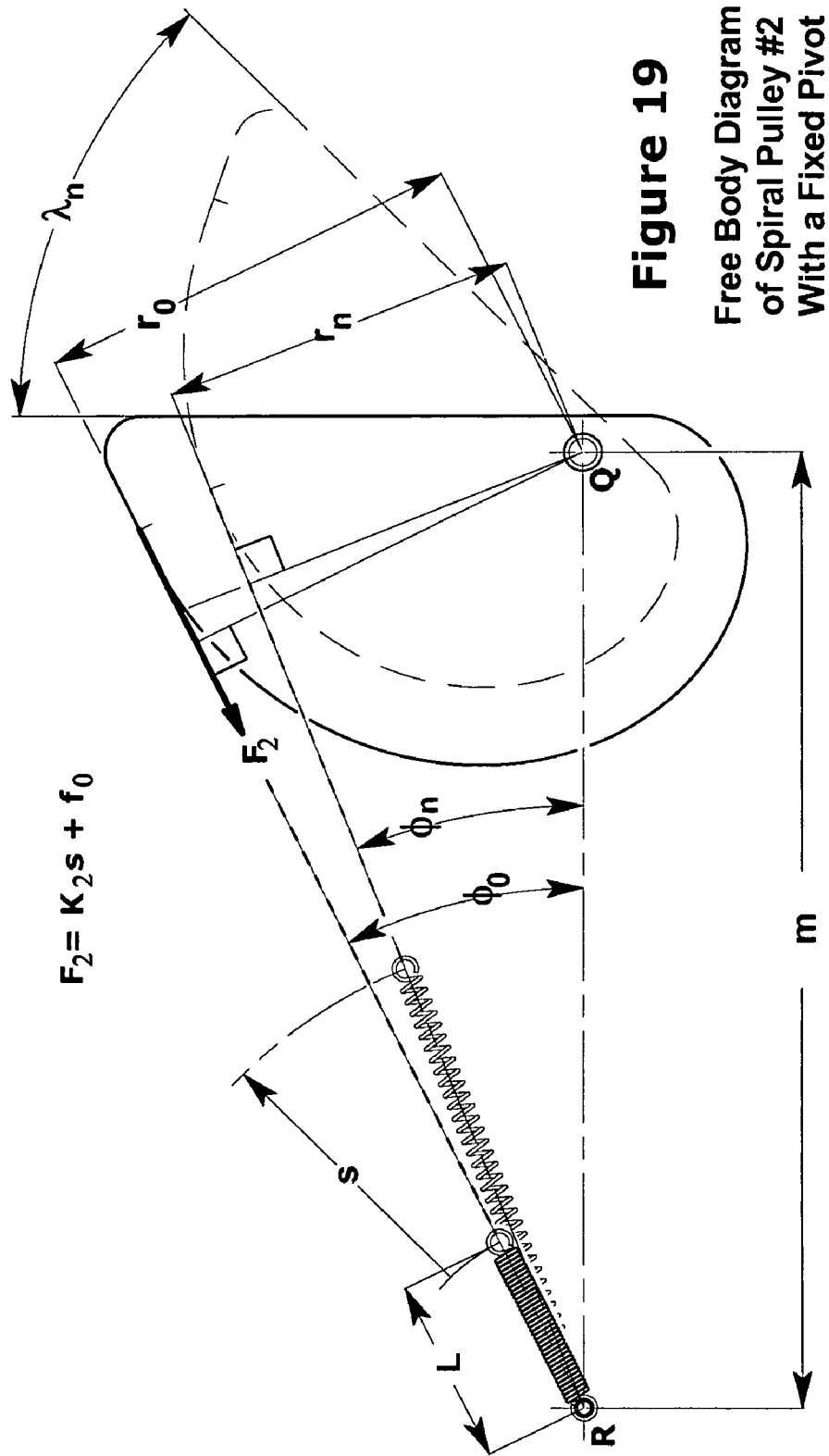
FIG. 19 is a free body diagram of a fixed pivot spiral pulley.

Now let's look at the derivation of the shape of pulley #2 shown in FIGS. 12a and 12b. FIG. 19 shows a free body diagram of a spiral pulley with a fixed-pivot. The axis of rotation of the spring pivot passes through point R. The axis of rotation of the pulley is parallel to the spring pivot axis. The pulley axis passes through point Q. Points P and Q are separated by a fixed distance k. The centerline of the spring and cable lay in the plane that contains points P and Q and that is perpendicular to the pulley axis of rotation. The flexible cable extends from the spring to a tangent on the spiral pulley. Dimension r is the tangent radius or perpendicular distance from the pulley axis to the flexible cable. Angle f is the angle between the flexible cable and the line through points Q and R.

The spring force is described by the following equation:

$$F_2 = K_2 s + f_0 \qquad \text{eq. 26}$$

Where $f_0$ is the initial tension in the spring and s is the extension of the spring.

Angle $\lambda$ is the angle of rotation of the pulley, starting from the orientation when the spring extension s=0 and $F_2=f_0$.

The torque $\tau$ on the pulley produced by $F_2$ is:

$$\tau = F_2 r \qquad \text{eq. 27}$$
$$= (K_2 s + f_0) r$$

Solving for r:

$$r = \frac{\tau}{(K_2 s + f_0)} \qquad \text{eq. 28}$$

When the pulley rotates by an angle $d\lambda$, the resulting spring extension will be:

$$ds = r d\lambda$$

This can be converted into a finite difference equation.

$$s_n - s_{n-1} = r_{n-1} \Delta\lambda \qquad \text{eq. 29}$$

$$s_n = r_{n-1} \Delta\lambda + s_{n-1}$$

Now converting equation 28 into a finite difference equation:

$$r_n = \frac{\tau_n}{(K_2 s_n + f_0)} \qquad \text{eq. 30}$$

As seen in FIG. 19, when the pulley rotates by an angle $\lambda_n$, angle f changes from $f_0$ to $f_n$. As a result, the orientation of the cable relative to the pulley changes by the cable wrap angle $\omega$, where:

$$\omega = \lambda_n + f_n - f_0$$

Looking at angle $\phi$: $\phi = \sin^{-1}(r/m)$

Thus: $\omega_n = \lambda_n + \sin^{-1}(r_n/m) - \sin^{-1}(r_0/m)$ eq. 31

FIGS. 20a and b show equations 29, 30, and 31 entered into an Excel spreadsheet.

Let's look at an example, assuming the following:

| Constants: | $K_2 =$ | 14.4 lbf./in |
| | $f_0 =$ | 30 lbf. |
| | m = | 12. inches |
| Initial Conditions: | $\lambda_0 =$ | 0° |
| | $r_0 =$ | 3.0 inches |
| | $s_0 =$ | 0.0 inches |
| Torque Profile (parabolic torque) | $\tau =$ | $180 - .009(\lambda - 100°)^2$ in-lb. |

Figure 21:
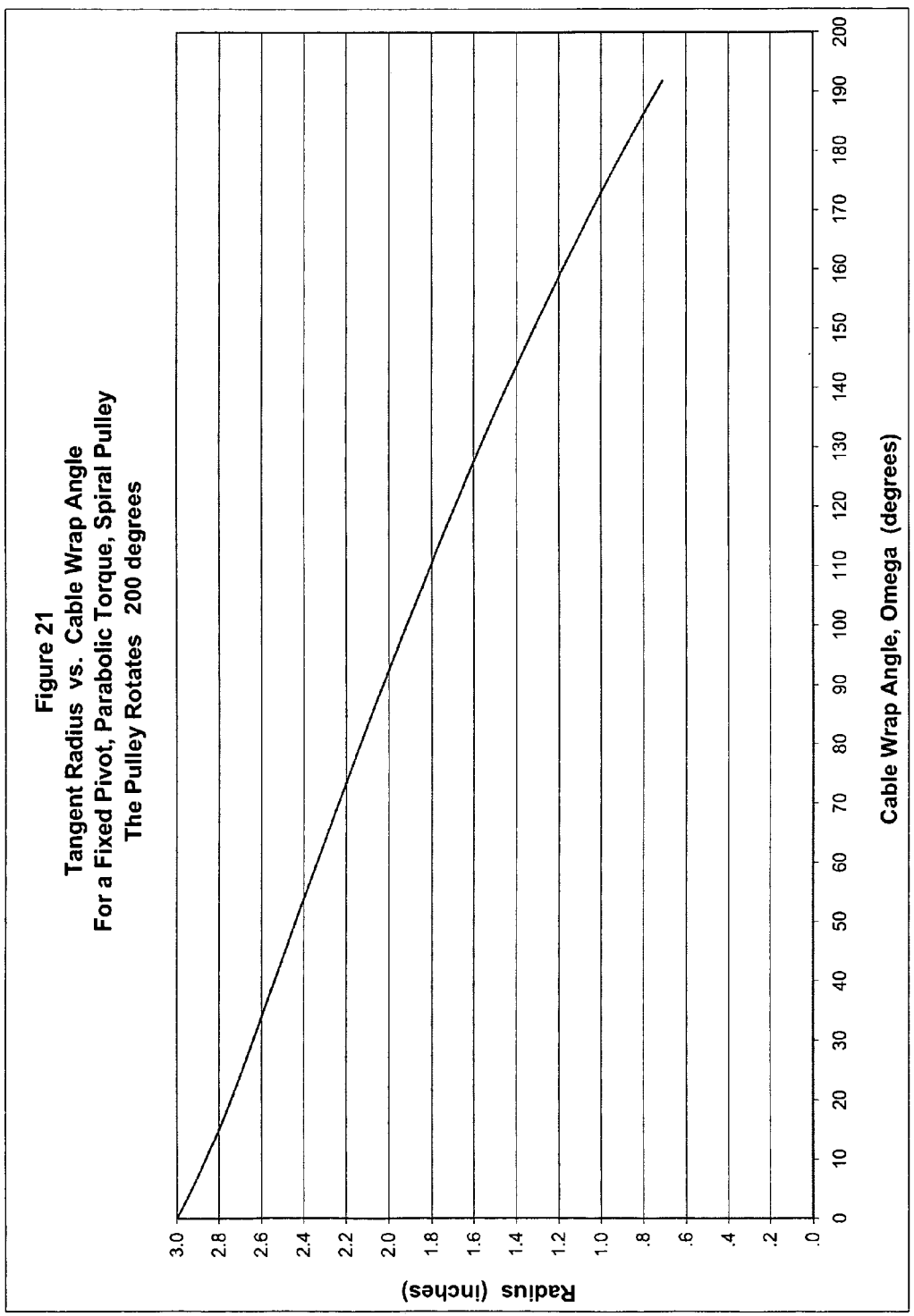
FIG. 21 is a graphical illustration of a pulley tangent radius for a fixed pivot, parabolic torque, spiral pulley.

FIG. 21 shows a graph of the resulting pulley tangent radius r for $\lambda = 0°$ to $\lambda = 200°$. This is a fixed-pivot spiral pulley with a parabolic torque profile. It has the same torque profile as the previous sliding-pivot pulley. These two pulleys can be attached to each other to counterbalance the adjustment of the gravity counterbalance shown in FIG. 12. The two pulleys should be phased relative to each other such that sliding-pivot pulley angle $\alpha = 100°$ when fixed-pivot pulley angle $\lambda = 100°$.

5. Link-Angle Compensation and Counterbalance Mechanism

The adjustment counterbalance mechanism shown in FIGS. 12a and 12b has a significant limitation. It balances the adjusting force at only one value of (b cos θ). Remember, from equation 7, the force required to adjust the gravity counterbalance at an angle θ is:

$$F_1 = K_1(a - b \cos\theta)$$

If we assume that the distance b is fixed, then the adjustment counterbalance shown in FIGS. 12a and 12b will work at only one absolute value of link angle ±θ. At another link angle $\theta = \theta_1$, the force required from the adjustment counterbalance is:

$$F_1 = K_1(a - b \cos\theta_1)$$

The error is $$F_{error} = K_1(a - b\cos\theta_1) - K_1(a - b\cos\theta) \qquad \text{eq. 32}$$

$$F_{error} = K_1 b(\cos\theta - \cos\theta_1)$$

For a given angle $\theta_1$, the error remains constant, independent of dimension a. The error force may be positive or negative. The gravity counterbalance can still be adjusted however.

FIGS. 23a and 23b show a modified version of the adjustment counterbalance shown in FIGS. 12a and 12b. In the modified version, the dual spiral pulley and spring #2 are located on the moving carriage with spring #1. The force on the carriage is the same for both versions. In FIGS. 12a and 12b, the pivot translates relative to the pulley. In FIGS. 23a and 23b, the pulley translates relative to the pivot. The relative motion is the same for both.

In equation 32, if we assume that $\theta_1 = \pi/2$ radians, then $F_{error} = K_1 b \cos \theta$ Looking back at equation 8, at $\theta = \theta_1 = \pi/2$, the force produced by the counterbalance mechanism will be:

$$F'_1 = -K_1 p + K_1(e - b \cos \theta) = -K_1 p + K_1 e$$

But we know that the error is $F_{error} = K_1 b \cos \theta$
$F'_1$ can be corrected by subtracting the known error.

$$\begin{aligned} F_{desired} &= F'_1 - F_{error} \\ &= -K_1 p + K_1 e - (K_1 b \cos \theta) \\ &= -K_1(p + b \cos \theta) + K_1 e \end{aligned} \quad \text{eq. 39}$$

From equation 33, it can be seen that if $\theta_2 \pi/2$, the adjustment counterbalance mechanism can be brought back into balance by increasing dimension p by the amount $b \cos \theta$.

Figures 24A, 24B:
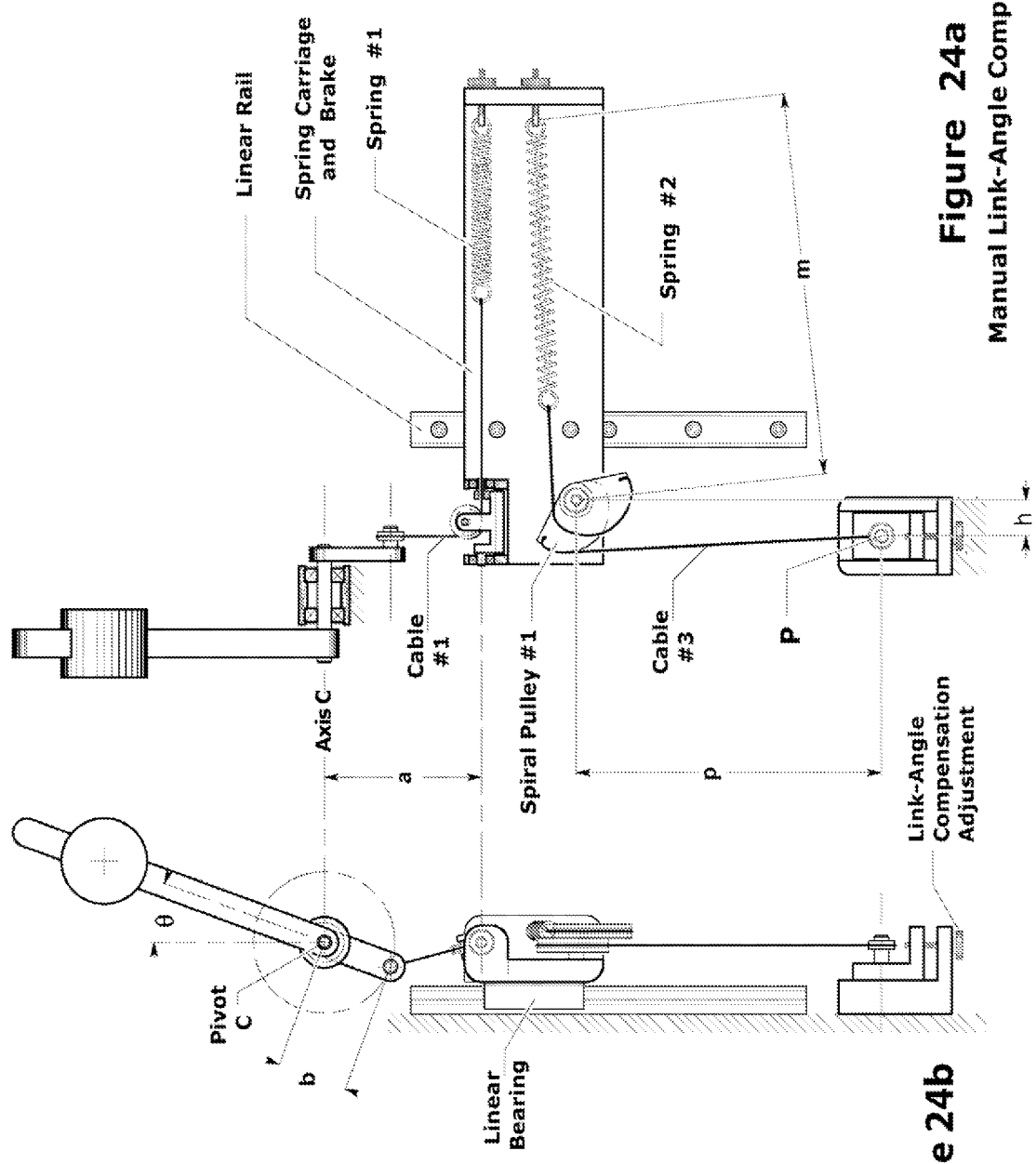
FIGS. 24a and 24b are illustrations of a manual link-angle compensation.

FIGS. 24a and 24b show a modified version of the adjustment counterbalance shown in FIGS. 23a and 23b. The pivot is mounted on a separate linear bearing. With the extra linear bearing, dimension p can be changed by the amount ($b \cos \theta$) to compensate for the force error in the adjustment counterbalance, $$F_{error} = K_1 b \cos \theta.$$

FIGS. 24a and 24b show a force $F_3$. This is the force that is required to balance the force on the sliding-pivot. Force $F_3$ has the same negative stiffness characteristics shown in FIG. 11b. As a result, a simple extension spring can be used to counterbalance the link angle compensation mechanism. The spring should have a positive spring constant $K_1$. It can be referred to as the link angle compensation counterbalance spring, or spring #3 for short.

The counterbalance force $F_3$ depends on dimension a. Spring #3 needs to be properly adjusted or pretensioned. When the gravity counterbalance is adjusted to the desired value of dimension a, force $F_3$ acting through the dual capstan, should balance the vertical component of the force in cable #3. The most common value to select for dimension a is the distance that corresponds to an empty link with zero payload. Choosing this value of a allows the system to adjust to a new load when it is not holding onto a load. By choosing another value of a, the system can easily adjust to a new load only while it is already holding onto one specific payload. The system can be adjusted when it is not balanced, but extra motor power and energy is needed.

Other Versions of the Link-Angle Compensation and Counterbalance Mechanism

Figures 25A, 25B:
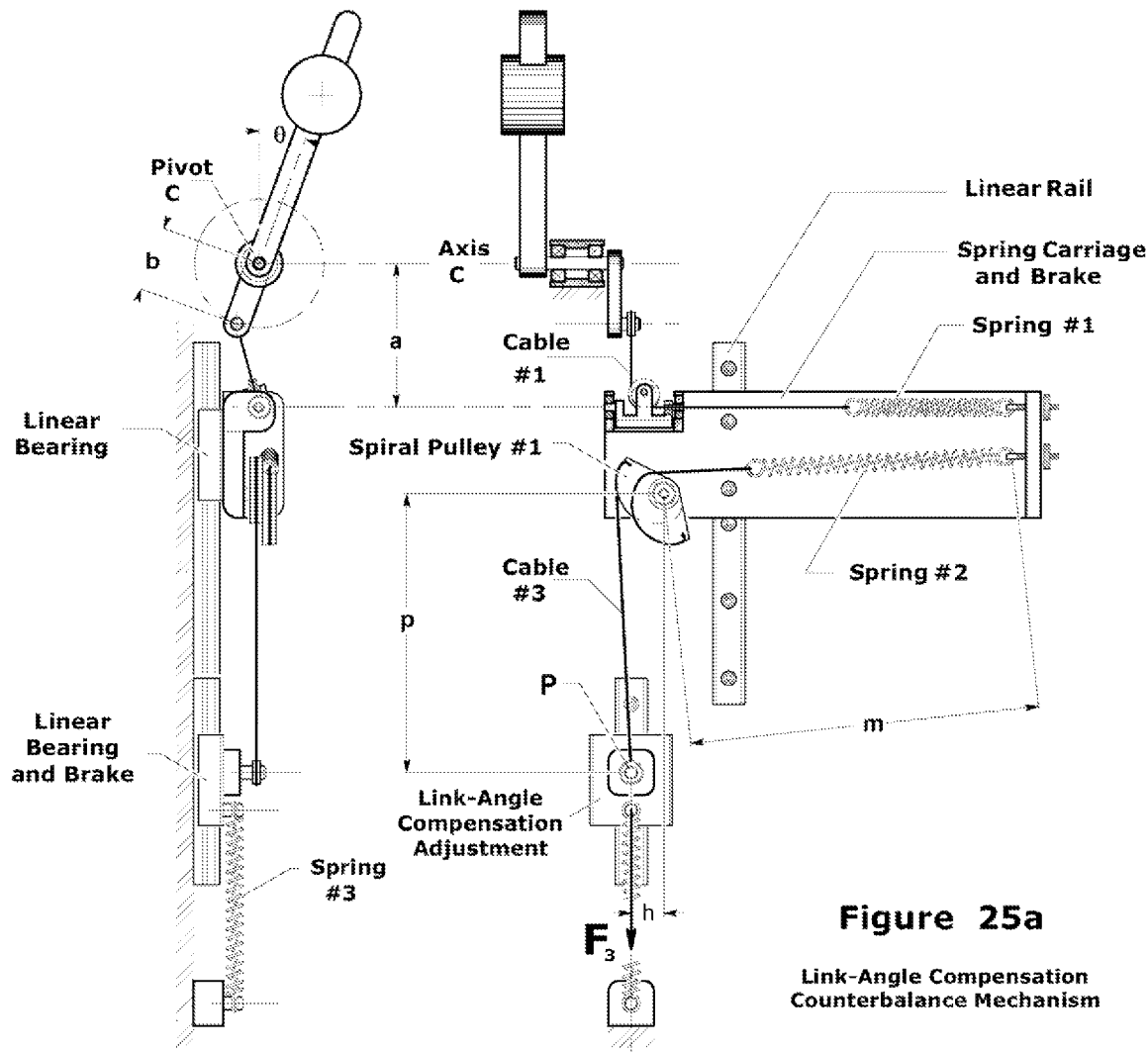
FIGS. 25a and 25b are illustrations of a link-angle compensation counterbalance.

FIGS. 25a and 25b show a modified version of the counterbalance mechanism of FIGS. 24a and 24b. An idler pulley has been attached to the spring carriage. Both spiral pulleys are now effectively fixed-pivot pulleys. The translating pivot has been replaced with a capstan. The capstan allows spring #3 to be folded into a more compact geometry. Another feature of the capstan is that it can have two different radii.

The two radii allow for a fine adjustment of the effective spring constant of spring #3. As before, force $F_3$ should have a spring constant of $K_1$. Spring #1 has the constant $K_1$. It is relatively difficult and expensive to precisely match spring constants of two or more different springs.

The effective spring constant for $F_3$ can be calculated as follows. The direct force from spring #3 acting on cable #4 is $F_4$. Force $F_4$ acts on the capstan at a radius $R_1$. Force $F_3$ acts on the capstan at a radius $R_2$. The sum of the moments on the dual capstan is equal to zero.

Solving for $F_3$:

$$0 = F_3 R_2 - F_4 R_1$$

Solving for $F_3$:

$$F_3 = F_4 R_1 / R_2 \quad \text{eq. 34}$$

If n is the deflection, and $f_4$ is the initial tension of spring #3, the direct force from spring #3 acting on cable #4 can be written:

$$F_4 = K_3 n + f_4$$

Substituting for $F_4$ in equation 34:

$$F_3 = (K_3 n + f_4) R_1 / R_2 \quad \text{eq. 35}$$

$$\frac{dF_3}{dn} = K_3(R_1/R_2)$$

or:

$$dF_3 = K_3(R_1/R_2) dn$$

The desired force $F_3$ can be written:

$$F_3 = K_1 p + f_3$$

If cable #4 is pulled a distance dn, the dual capstan will rotate by an angle $do/R_1$. If cable #3 moves a distance dp, the dual capstan will rotate by an angle $dp/R_2$.

Both capstans rotate at the same rate, thus:

$$dp/R_2 = dn/R_1.$$

or: $dn = (R_1/R_2) dp$

Substituting dn into equation 35:

$$dF_3 = K_3(R_1/R_2)^2 dp \quad \text{eq. 36}$$

or:

$$\frac{dF_3}{dp} = K_3(R_1/R_2)^2$$

but:

$$K_1 = \frac{dF_3}{dp}$$

thus:

$$K_3 = K_1(R_2/R_1)^2$$

The ratio $R_2/R_1$ for the dual capstan can be accurately adjusted to give the desired value of $K_1$ from a spring with a given constant $K_3$.

Figures 26A, 26B:
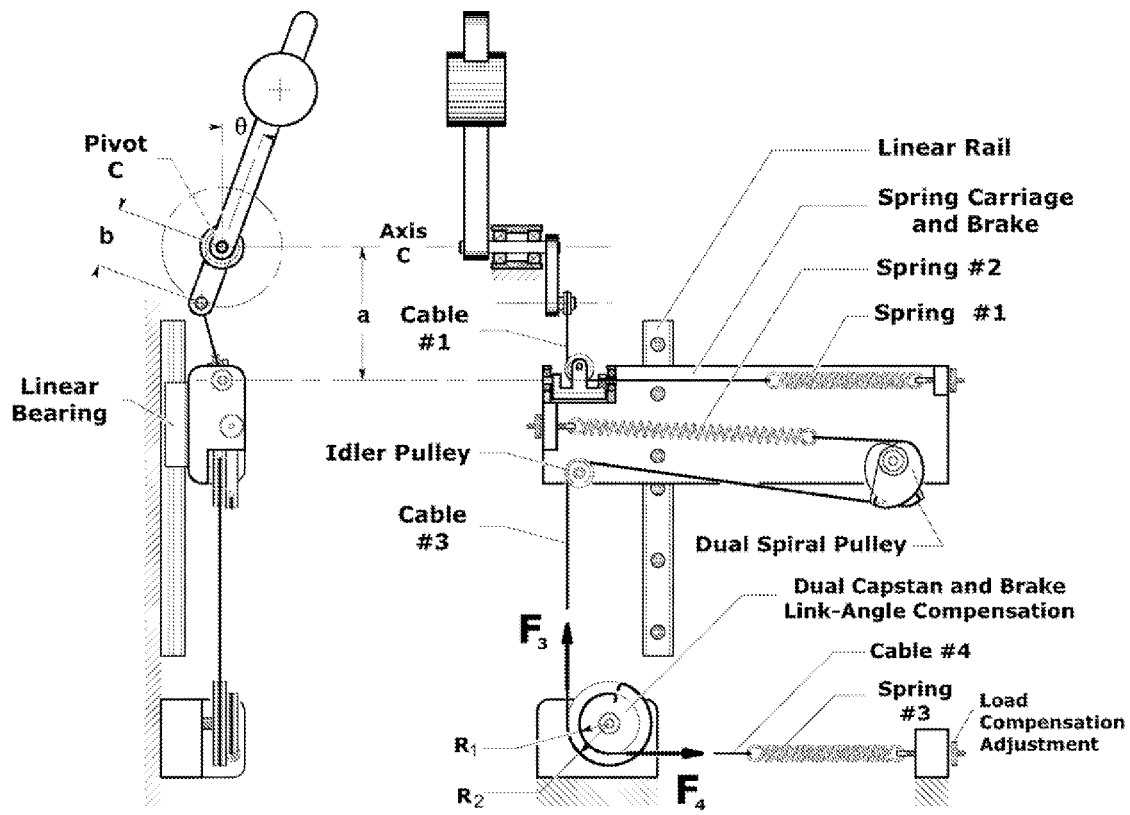
FIGS. 26a and 26b are illustrations of a rotary link-angle compensation counterbalance.

FIGS. 26a and 26b show a modified version of the counterbalance mechanism of FIGS. 25a and 25b. The idler pulley on the spring carriage has been eliminated. Cable #3 goes directly from the spiral pulley to the dual capstan. When the spring carriage translates up and down, spiral pulley #1 acts like a translating pivot pulley. When the spring carriage is fixed and the dual capstan rotates, spiral pulley #1 acts like a fixed-pivot pulley.

FIG. 22 is a graph showing the pulley tangent radius for a fixed and a sliding-pivot spiral pulley. Both pulleys produce the same torque profile with the same spring. The radius curves for both pulleys are very similar. A spiral pulley can be made using the average of the two radius curves. Such an "average" profile spiral pulley should work well for spiral pulley #1 in FIGS. 26a and 26b.

6. Load Compensation and Counterbalance Mechanism

Figures 27A, 27B:
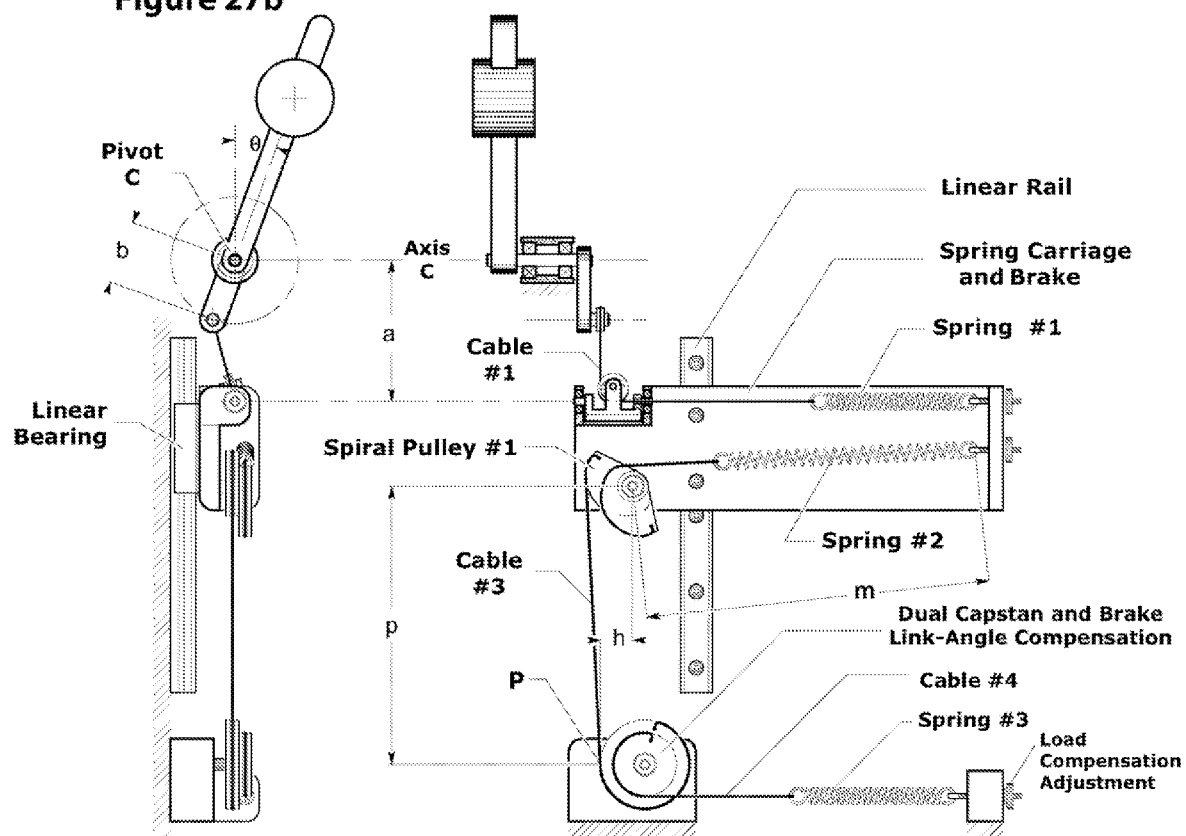
FIGS. 27a and 27b are illustrations of a simplified link-angle compensation counterbalance.

One more adjustment and counterbalance mechanism can be added to the system. FIGS. 27a and 27b show a system with a load compensation and counterbalance mechanism. A second dual capstan, along with a second set of spiral pulleys, and another spring has been added to the previous system. These components can be referred to as dual capstan #2, dual spiral pulley #2, and spring #4 respectively. Spring #4 can also be referred to as the load compensation counterbalance spring. Dual capstan #2 can also be referred to as the load compensation adjustment capstan.

From the previous section on link-angle compensation, we know that the pretension on spring #3 affects the gravity counterbalance load level at which dual capstan #1 is balanced. Rather than using a fixed preload for spring #3, the preload on spring #3 can be adjusted with dual capstan #2. This allows dual capstan #1 to be adjusted with no work at different gravity counterbalance load levels.

Spring #4, dual spiral pulley #2, and dual capstan #2 are added to counterbalance the adjustment of the preload on spring #3. As before, a spring with a negative stiffness is needed to counterbalance a spring with a positive stiffness. Spring #3 has a positive stiffness of $K_3$. Dual capstan #2, along with dual spiral pulley #2, and spring #4, provide the negative stiffness force.

The stiffness of force $F_5$ as shown in FIG. 27 can be defined as $K_5$. The relationship between the variables $K_3$, $K_5$, $R_3$, and $R_4$ can be derived in the same way that equation 36 was derived. This gives us the next equation.

$$K_3 = K_5(R_3/R_4)^2 \quad \text{eq. 37}$$

Substituting into equation 36 yields:

$$K_1 = \frac{K_5(R_1 R_3)^2}{(R_2 R_4)^2} \quad \text{eq. 38}$$

Both of the pulleys in dual spiral pulley #2 act as fixed pivot spiral pulleys. The Excel spreadsheets shown in FIGS. 20a and 20b can be used to derive the shape of the two pulleys. The process is iterative, starting with assumed values for several parameters. These are $K_4$, m, $r_0$, the initial force of spring #4 $f_4$, and the torque profile $\tau$.

7. System Operation

To understand how the counterbalance system operates, it may be useful to review the advantages and limitations of the various mechanisms. In order of increasing complexity, the counterbalance systems fall into the following seven categories:

1. Fixed Gravity counterbalance as shown in FIG. 3. The peak magnitude of the sinusoidal counterbalance torque is fixed. It is the simplest and the least expensive gravity counterbalance, but it is also the least flexible. A type #1 counterbalance would be most appropriate for balancing fixed loads such as lamps, computer monitors, or hatch covers.

2. Adjustable gravity counterbalance as shown in FIGS. 9a and 9b. An adjustment mechanism has been added to the type #1 mechanism above. The magnitude of the counterbalance torque is adjusted by moving the spring carriage up or down. The gravity counterbalance is adjustable, but energy is required or lost during adjustment. It is appropriate for loads that may change, but not often or by a large amount. The adjustability also enables a more accurate balance, resulting in lower operating force and smoother motion. An operating room microscope support arm might be a good application.

3. Gravity counterbalance with counterbalanced adjustment as shown in FIGS. 12a, 12b, 23a and 23b. A mechanism to counterbalance the adjustment of the gravity counterbalance has been added to the type #2 mechanism above. The gravity adjustment is balanced at only one link-angle ±θ'. At other angles, energy is required or lost during the adjustment. Less energy may be needed than with no adjustment counterbalance however. The forces on the spring carriage remain balanced only as long as the link-angle remains at ±θ'. When the link-angle changes from ±θ', a force or a locking mechanism or brake is needed to hold the adjusted position of the spring carriage. These are appropriate for loads that change often, are heavy, or where limited power is available. A good application might be for overhead storage of heavy items. The adjustment should be balanced in the down position. That way, load can be added or removed from storage when the storage is accessible. The counterbalance can then be readjusted with no effort and then returned to up or any other position. No work is needed to move the load. A fixed counterbalance would require work to raise or lower a load. Work is required for the adjustable counterbalance too. The work isn't done while lifting the load. The work is done during the adjustment.

4. Gravity Counterbalance with counterbalanced adjustment and link-angle compensation as shown in FIGS. 24a and 24b. A mechanism has been added to adjust dimension p independently from dimension a. This is called the link-angle compensation adjustment. The gravity counterbalance can now be adjusted at any link-angle θ with no addition or loss of energy. Unfortunately, energy is still required or lost during the angle compensation adjustment.

5. Gravity Counterbalance with counterbalanced adjustment and link-angle compensation with counterbalance as shown in FIGS. 25a and 25b. A mechanism to counterbalance the link-angle compensation adjustment has been added to the type #4 mechanism above. At one fixed position of the spring carriage, dimension a=a', the net force on the link-angle compensation adjustment will be zero. At position a', the link-angle compensation can be adjusted without any energy. Note that while the link-angle compensation is being adjusted, the net force on the spring carriage will remain balanced only if the link-angle θ changes simultaneously. If the link-angle and the link-angle compensation are not moved simultaneously, then a force is required, or the carriage brake should be set to hold the carriage in place. Unfortunately, the link-angle compensation is balanced at only one position of the spring carriage. This corresponds to only one gravity counterbalance load. When the spring carriage is moved to counterbalance a different load, the link-angle compensation adjustment becomes unbalanced. At this time, the compensation adjustment should be held or the brake should be set on the adjustment. Once the link-angle compensation brake is set, the gravity counterbalance adjustment will be balanced at only one link-angle again. The link must be returned to that angle before the gravity counterbalance can be adjusted without any energy. Sequence of operation is important. Angle compensation should be adjusted first so that the net force on the spring carriage is zero. Then the angle compensation adjustment should be locked. Then the spring carriage can then be adjusted to a new desired load (dimension a). Finally, the carriage should be locked so that it won't move due to the resulting force imbalance. The link-angle compensation adjustment must be locked before the load is adjusted. As a result, angle compensation only works at one load level. Angle $\theta''$ must be maintained while the load is adjusted. The load adjustment can then be locked, and the link-angle $\theta$ can be rotated to any $\theta$. The link must be returned to the specific $\theta''$ before the carriage can be unlocked and adjusted again. Only when the carriage is adjusted back to $W_1$ can the link-angle compensation be reengaged without loss.

6. Gravity counterbalance with counterbalanced adjustment, link-angle compensation with counterbalance, and load compensation, as shown in FIGS. 26a, 26b, 27a and 27b. A mechanism has been added to adjust the preload on spring #3. This is called the load compensation adjustment. The preload on spring #3 affects the position of the spring carriage or the load level at which the link-angle compensation adjustment is balanced. The load compensation adjustment allows the link-angle compensation adjustment to be made without any energy. Unfortunately, energy is still required or lost during the load compensation adjustment. At one position of the spring carriage, dimension a =a', the net force on the link-angle compensation adjustment will be zero. At position a', the link-angle compensation can be adjusted without any energy.

Figure 28B:
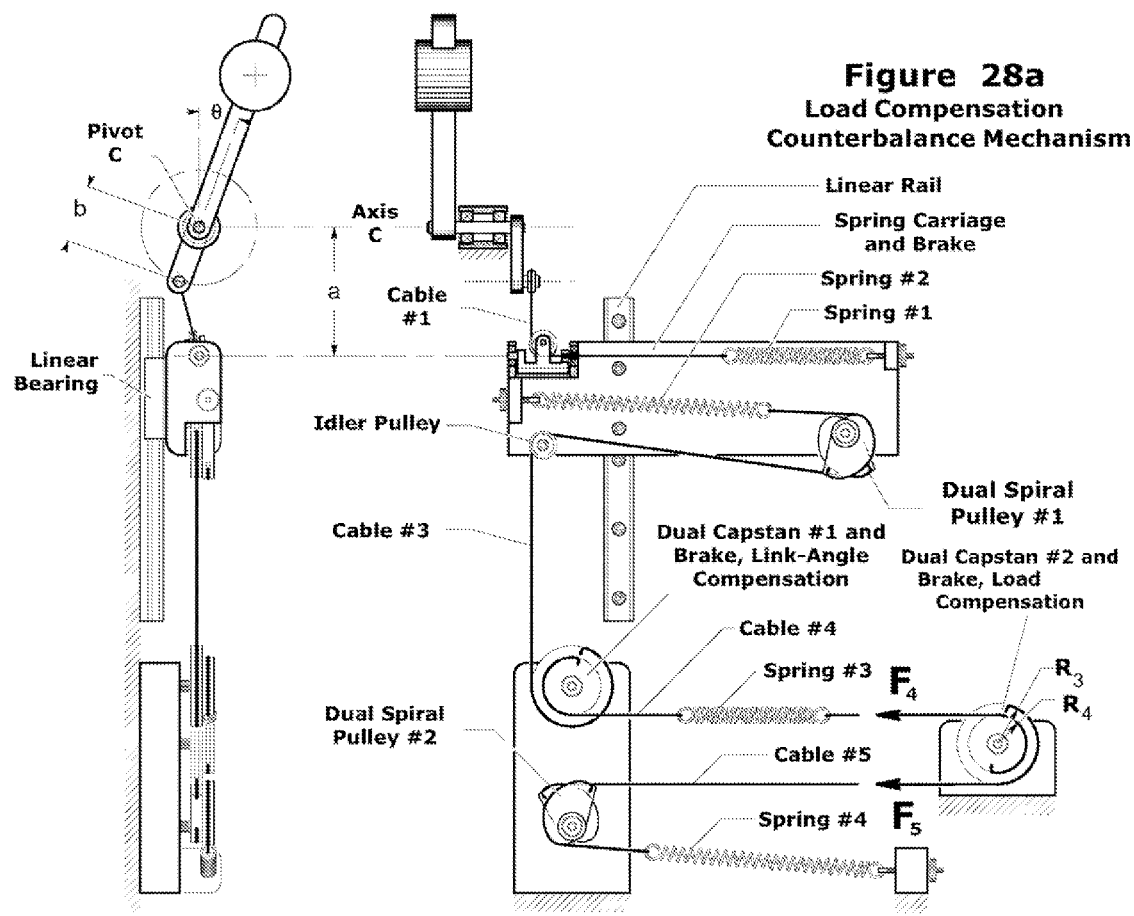

7. Gravity counterbalance with counterbalanced adjustment, link-angle compensation with counterbalance, and load compensation with counterbalance as shown in FIGS. 28a and 28b. A mechanism to counterbalance the load compensation adjustment has been added to the type #6 mechanism above. This system is the most flexible. The counterbalance can be adjusted at any angle and then readjusted at another angle to a different load level. This system is most useful for robotic applications in which a payload may be picked up or dropped off at different elevations.

8. Multiple Counterbalance Mechanisms on the Same Axis of Rotation

Dual Opposed Counterbalance

Figures 30A, 30B:
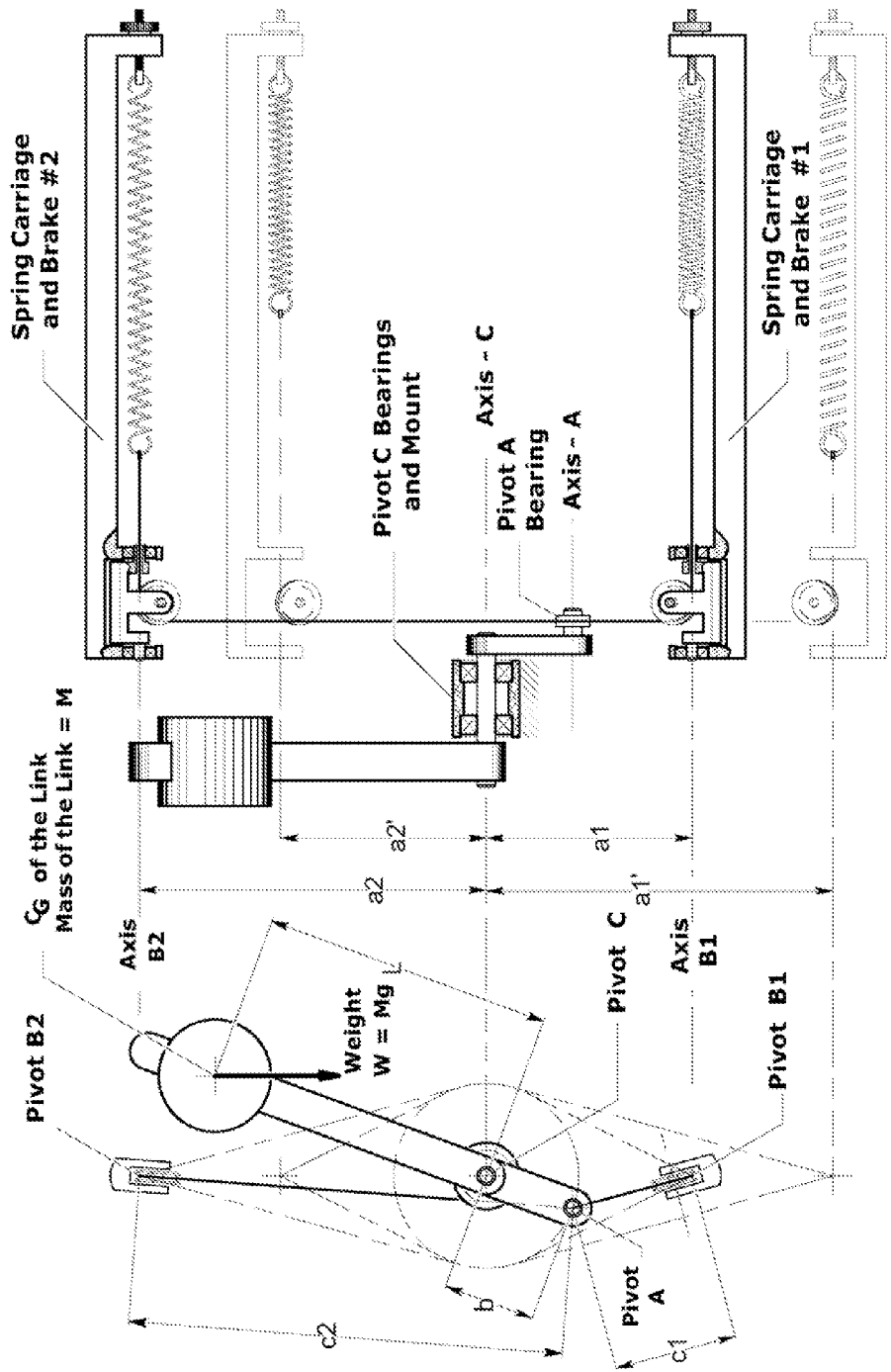
FIGS. 30a and 30b are illustrations of a dual opposed counterbalance mechanism.

Multiple gravity counterbalance mechanisms can be connected to the same axis of rotation. FIGS. 30a and 30b show two counterbalance mechanisms that are arranged on opposite sides of the axis of rotation. Each mechanism can be adjusted by moving its spring carriage along a vertical path. The torque from the lower mechanism about the axis of rotation is:

$T_1 = -a_1 b K_1 \sin \theta$

The torque from the upper mechanism is:

$T_2 = a_2 b K_2 \sin \theta$

The sum of the torques is:

$T_1 + T_2 = b(a_2 K_2 - a_1 K_1) \sin \theta$

This torque will balance a load $MgL \sin \theta$ when:

$MgL = b(a_2 K_2 - a_1 K_1)$ eq. 39

One advantage of the dual opposed counterbalance mechanism is that it allows small loads to be balanced throughout the full 360° rotation of the axis. With only one counterbalance mechanism, to balance a small load, dimension a must be small. But when dimension a is small, the pivot bearing on axis-A interferes with the idler pulley on the cable gimbal. From equation 39, the dual opposed counterbalance mechanism can be adjusted to balance a zero load by adjusting $a_1$ and $a_2$ so that:

$a_2 K_2 - a_1 K_1 = 0$

Both minimum values of dimensions $a_1$ and $a_2$ can be large enough to avoid interference between the pivot bearing and the idler pulleys. Note that spring constants $K_1$ and $K_2$ do not need to be equal to each other. The dual counterbalance mechanism can be adjusted by moving either one of the spring carriages, or it can also be adjusted by moving both of the spring carriages. The system can be simplified by fixing the upper carriage and adjusting only the lower carriage. This eliminates the need for linear bearings on the upper carriage. The two counterbalance mechanisms shown in FIGS. 30a and 30b are type #2 adjustable mechanisms described earlier. Any of the other types of counterbalance mechanisms can be substituted. For example, if the upper mechanism is a simple fixed type #1 mechanism, and the lower mechanism is a complete type #7 mechanism, the resulting dual mechanism has all of the adjustability of the type #7 mechanism.

Multiple Mechanisms for Adjustable Phase and Magnitude

Figures 31A, 31B:
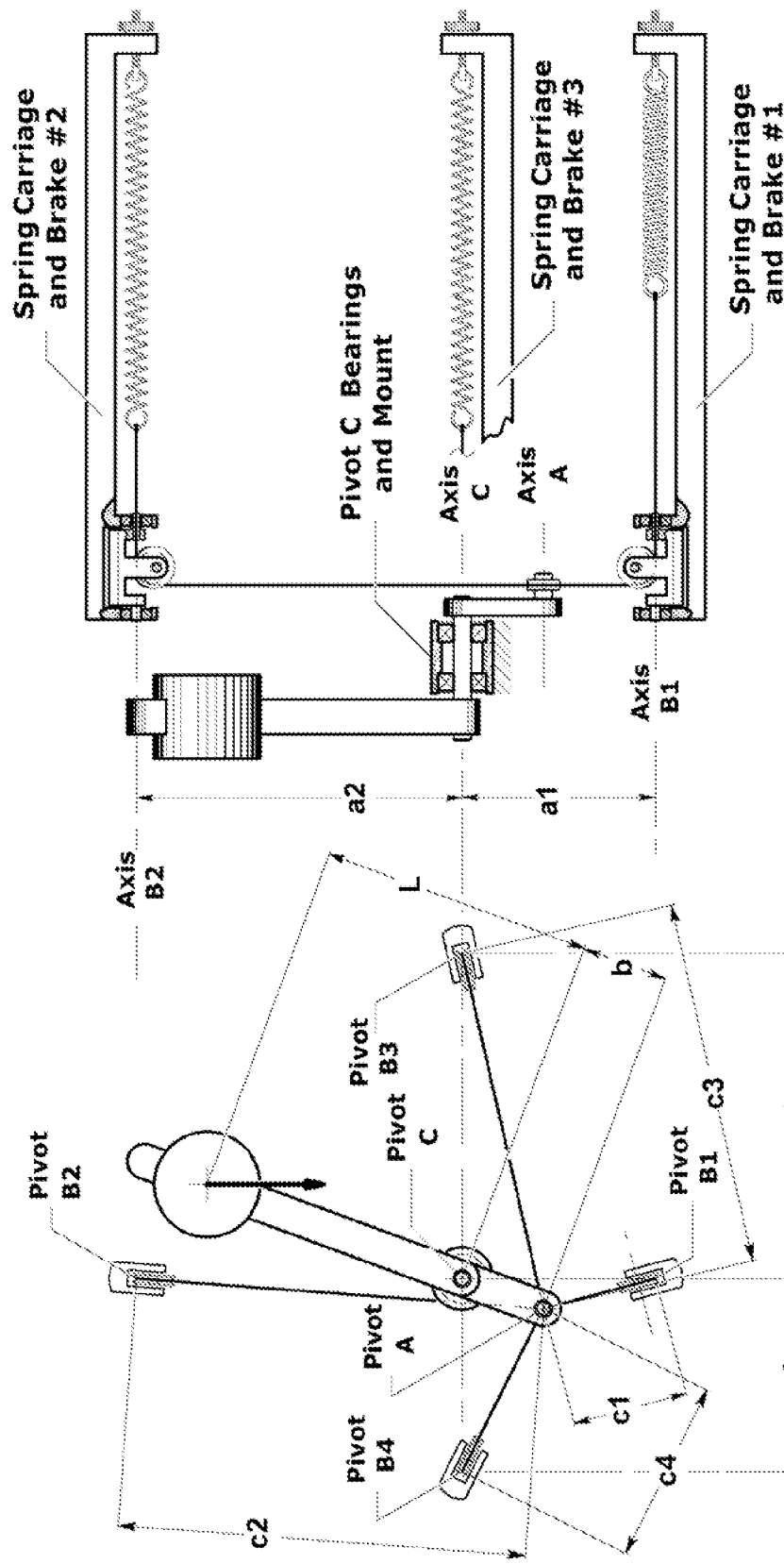
FIGS. 31a and 31b are illustrations of the multiple opposed counterbalance mechanisms.

FIGS. 31a and 31b show a system with four counterbalance mechanisms acting on one axis of rotation. The mechanisms are oriented at 90° intervals around the axis. Each one of the mechanisms delivers a torque that varies sinusoidally with the link angle $\theta$. Each of the sinusoids is phased 90° apart. If two or more adjacent mechanisms are adjustable, it's possible to deliver a sinusoidal torque with an arbitrary phase and magnitude.

The ability to adjust the phase of the torque has advantages. For example, a system may become tilted relative to gravity. The phase adjustment allows the system to compensate for the tilt. With the appropriate type of individual mechanisms, the phase can be adjusted without consuming any energy.

Up until now, we have assumed that the counterbalance system would be used to balance the gravity torque on a link. A counterbalance mechanism can be used to deliver a torque that is not a function of gravity alone. For example, if the link is part of a robot arm, the arm will apply forces in various directions, not just up or down. The ability to adjust the phase of the counterbalance torque allows a link to deliver a force in any direction. The torque may even be used to accelerate or decelerate the link. This can all be done with negligible energy consumption.

Dual Phase Shifted Counterbalance Mechanism

Figures 32A, 32B:
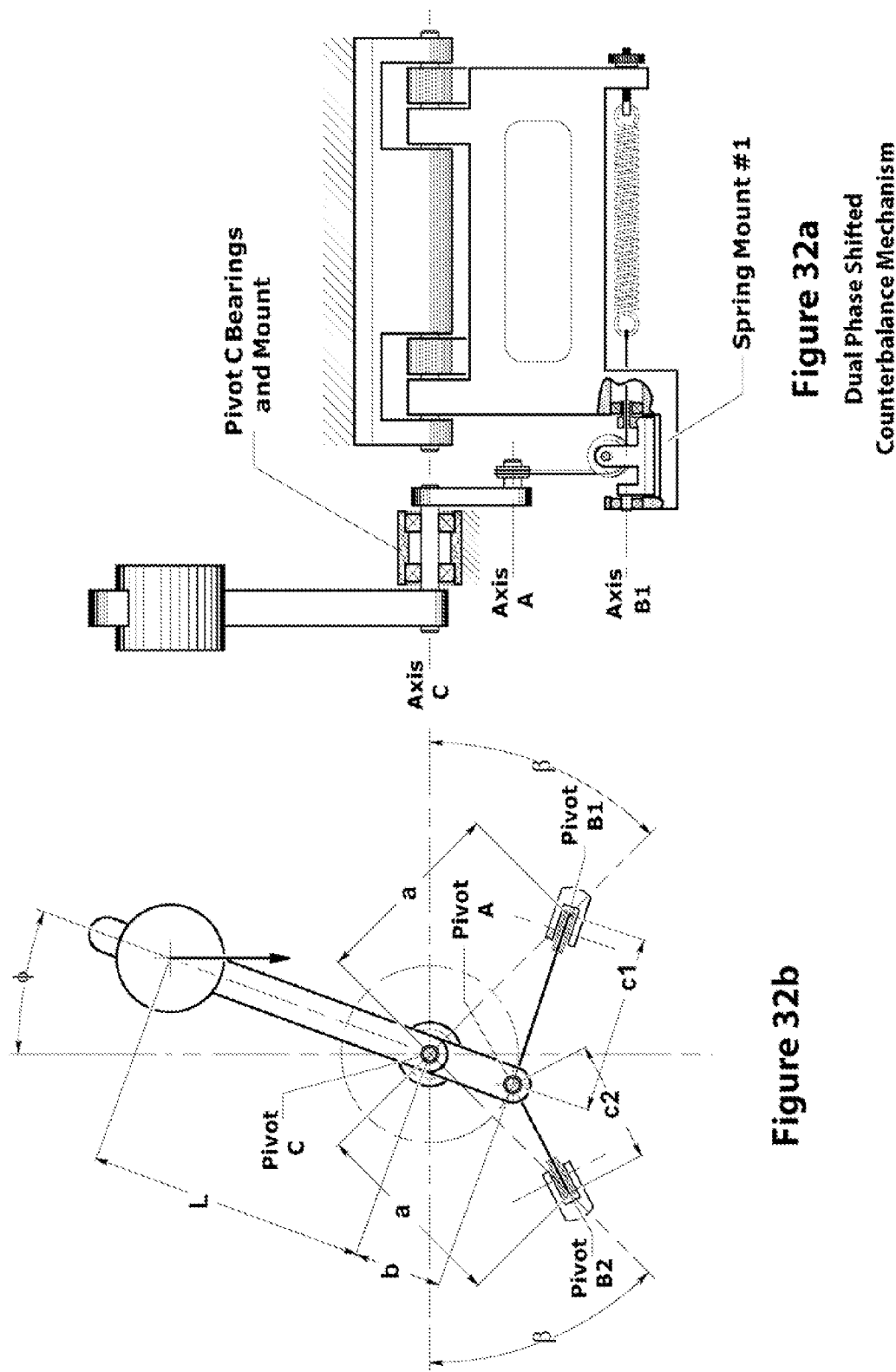
FIGS. 32a and 32b are illustrations of the dual phase shifted counterbalance mechanism.

FIGS. 32a and 32b show a system with two cable gimbal mechanisms. Each of the cables is connected to the same pivot bearing on axis-A. Each cable gimbal mechanism is mounted on a pivot that rotates about axis-C. This is the same axis that the link rotates about. The distance a is a constant for both mechanisms. Angle b is the angle from the horizontal to the line CB for each mechanism.

The magnitude of the counterbalance torque will be zero when angle $\beta=0°$. When angle $\beta=90°$, both counterbalance torques add together. The net torque is:

$T_{net} = -2ab K_1 \sin \theta \sin \beta$ eq. 40

This system can be adjusted to zero torque without any mechanical interference. Unlike the dual opposed counterbalance mechanism, both spring mechanisms act together to produce a higher peak torque with the same springs. The phase of the net torque can be adjusted by rotating the individual cable gimbal mechanisms to different angles.

9. Translational Counterbalance Mechanisms

The previous gravity counterbalance mechanisms were designed for links with rotary joints. They provide a torque to balance the gravity moment at the joint. Prismatic or translational joints can be counterbalanced too. A constant force mechanism is required to counterbalance a translating link.

Figures 35A, 35B:
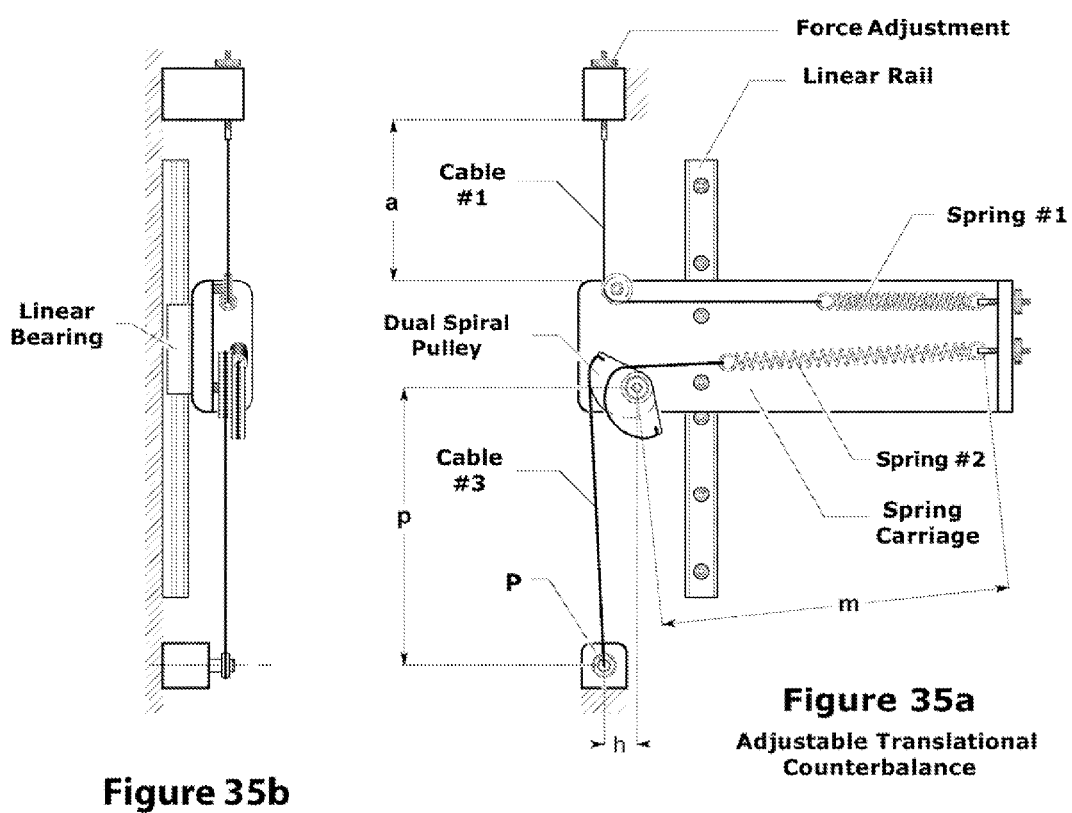

FIGS. 35a and 35b show a constant force mechanism. The mechanism is similar to the rotary counterbalance shown in FIGS. 23a and 23b. The rotating link and the cable gimbal have been eliminated.

In FIGS. 35a and 35b, the translating link is called the spring carriage. The carriage is constrained by a linear bearing so that it has only one translational degree of freedom and zero rotational degrees of freedom. The path of the bearing is oriented at an angle $\psi$ relative to vertical. The force on the carriage, in the direction of travel, from spring #1 is $F_1$, where:

$$F_1 = K_1 a + f_1 \quad \text{eq. 41}$$

The dual spiral pulley, in combination with spring #2 produces a force on the carriage in the direction of travel equal to $F_3$, where:

$$F_3 = K_1 p + f_3$$

The spiral pulley and spring mechanism can be designed using the methods previously discussed. As before, it can be designed with a negative stiffness equal in magnitude to the stiffness of spring #1.

$$K_3 = -K_1$$

Substituting the above equations:

$$F_3 = --K_1 p + f_3 \quad \text{eq. 42}$$

If $M_c$ is the mass of the carriage, g is the gravitational acceleration, and "a" is the acceleration of the carriage, summing all forces on the link in the direction of travel:

$$0 = F_1 - F_3 - M_c g \cos\Psi - M_c a \quad \text{eq. 43}$$

$$M_c(g \cos\Psi + a) = F_1 - F_3$$

If we assume for now that the carriage is not accelerating, then the force required to counterbalance the carriage is:

$$M_c g \cos\psi = K_1(a+p) + f_1 - f_3 \quad \text{eq. 44}$$

For a given $M_c$, g, and $\psi$, the counterbalance force $M_c g \cos\psi$ is constant and independent of the position of the link along the linear bearing. If the load $M_c g \cos\psi$ changes, the counterbalance force must be adjusted to rebalance the link.

Figure 33A:
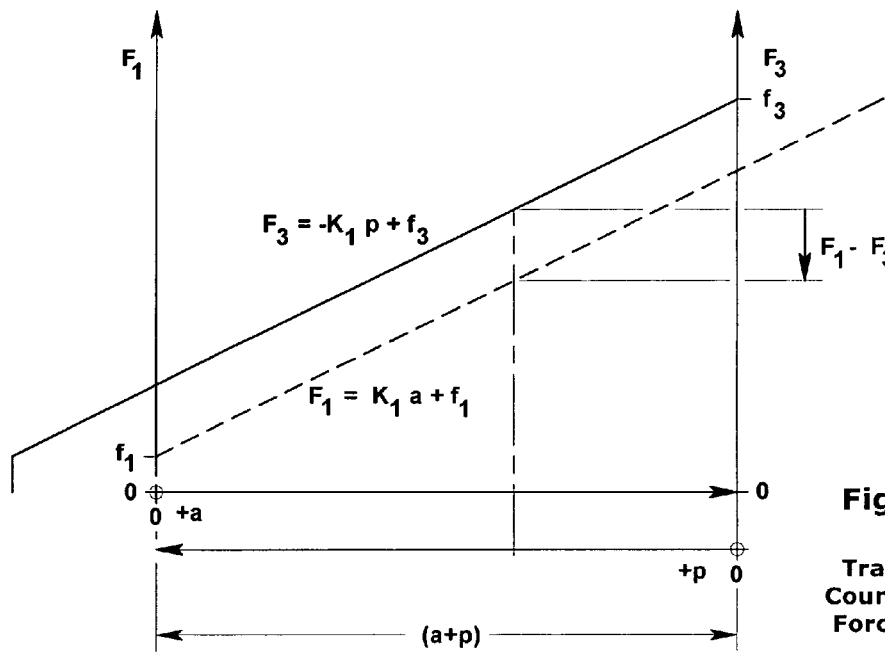
FIGS. 33a, 33b, and 33c are illustrations of the translational counterbalance force diagram.
Figure 33B:
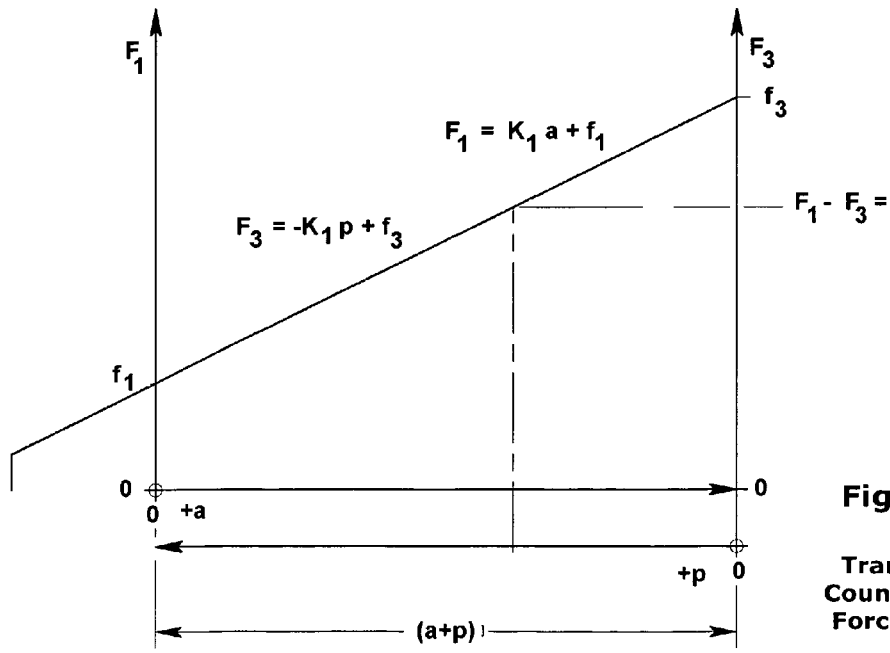
Figure 33C:
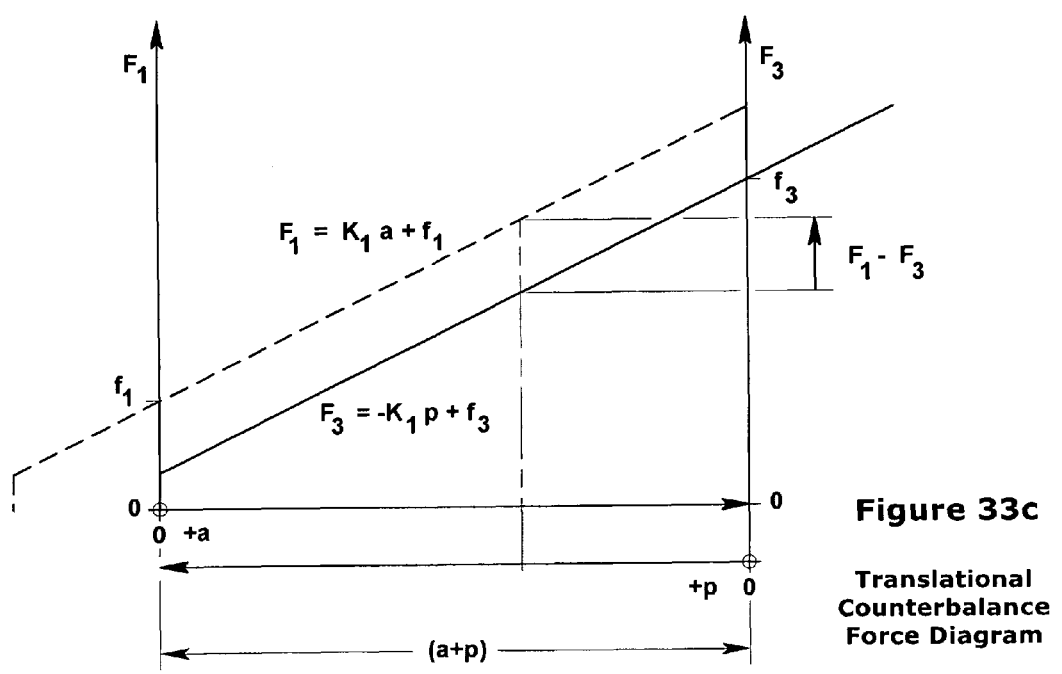

FIGS. 33a, 33b, and 33c show how the forces $F_1$ and $F_3$ change as the carriage moves from one extreme position where a=0 to the opposite extreme where p=0. For fixed values of spring preload force $f_1$ and force $f_3$, the difference between force $F_1$ and $F_3$ is constant. As a result, the counterbalance force $(F_1-F_3)$ is constant. Note that (a+p) also remains constant as the carriage moves from one end to the other.

In FIG. 33a, the spring preload forces, $f_1$ and $f_3$, result in a negative counterbalance force $(F_1-F_3)$.

In FIG. 33b, the preload force $f_1$ of spring #1 has been increased so that the counterbalance force $(F_1-F_3)=0$. In figure 35, the increase in force $f_1$ would be accomplished by tightening the spring #1 force adjustment nut. This pulls on cable #1 and increases the spring force.

In FIG. 33c, the preload force $f_3$ of the dual spiral pulley and spring mechanism has been decreased so that the counterbalance force $(F_1-F_3)$ is now positive. In FIG. 35, the decrease in force $f_3$ would be accomplished by lengthening dimension p without moving the spring carriage.

The counterbalance force can be adjusted from a positive to a negative force by adjusting the preload force of either spring mechanism or by adjusting both.

Figures 36A, 36B:
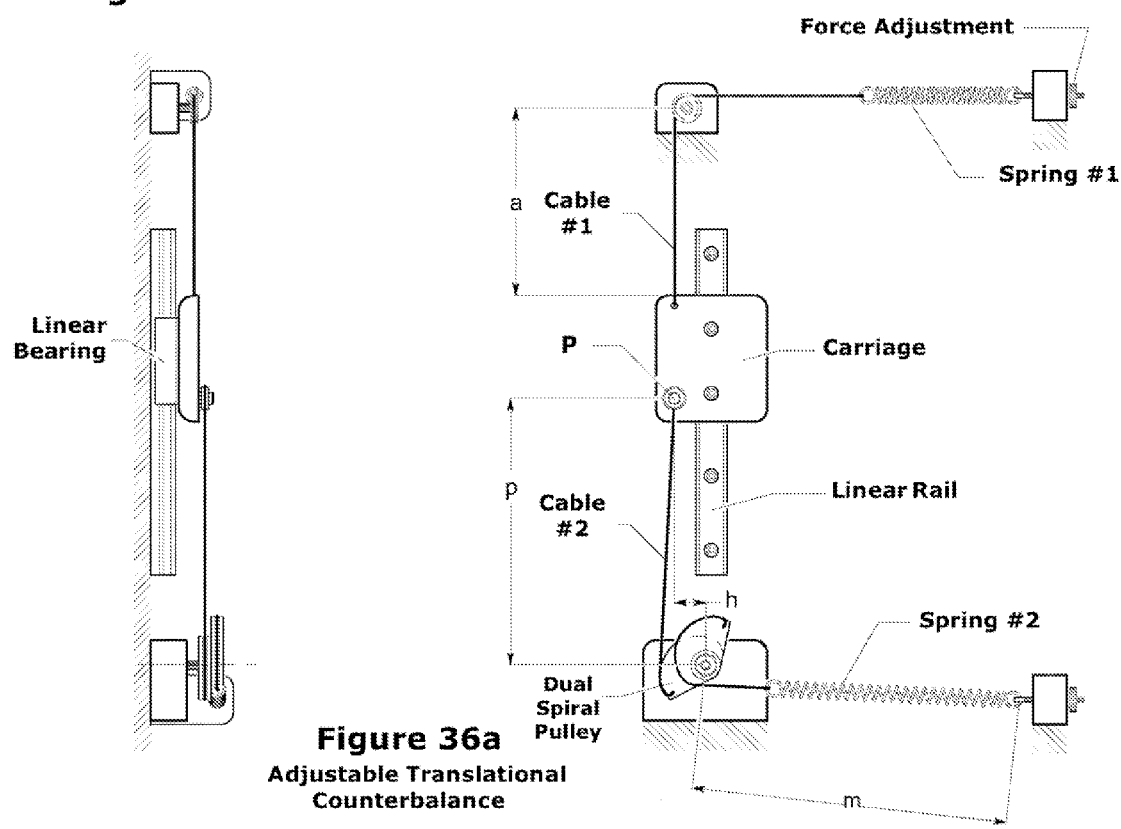

FIGS. 36a and 36b show a modified version of the translational counterbalance in FIGS. 35a and 35b. Both of the springs and the dual spiral pulley have been removed from the carriage. The resulting counterbalance system has less inertia. The smaller carriage sweeps out less volume as it moves from one end of travel to the other.

FIGS. 37a and 37b show a modified version of the translational counterbalance in FIGS. 36a and 36b. A dual capstan has been added. This allows the stiffness of spring #1 to be accurately adjusted so that it matches the stiffness of the dual spiral pulley mechanism.

In FIGS. 38a and 38b, a third spring along with a dual capstan and brake have been added to the counterbalance. The extra spring acts to counterbalance the adjustment of the counterbalance force. The adjustment is balanced at only one position of the spring carriage. At other positions, the brake on the dual capstan should be set.

FIGS. 39a and 39b show a modified version of the translational counterbalance in FIG. 38. A motor has been added to automate the force adjustment.

In FIGS. 40a and 40b, a fourth spring along with another dual spiral pulley and dual capstan and brake have been added to the counterbalance. The additional components allow the counterbalance force to be adjusted at any position of the spring carriage.

The counterbalance systems in FIGS. 38a, 38b, 39a, 39b, 40a, and 40b all have counterbalanced adjustment mechanisms. In each case, the adjustment counterbalance spring #3 is connected to the negative stiffness spring #2 assembly. As shown earlier, the counterbalance force can be adjusted by changing the preload force on either spring #1 or spring #2. The adjustment of spring #1 can be counterbalanced too. Spring #1 is a common positive stiffness spring. As a result, a negative stiffness spring assembly is needed to counterbalance the adjustment of spring #1.

10. A Rotary Counterbalance Made from a Scotch Yoke and Translational Counterbalance Mechanism FIGS. 41a and 41b show a rotary gravity counterbalance mechanism. The translational counterbalance system shown in FIGS. 36a and 36b is combined with a Scotch Yoke mechanism to counterbalance the gravity moment of a rotary link.

Equation 44 shows the criteria for counterbalancing the translating carriage. The carriage by itself will be balanced when:

$$0 = M_c g \cos\psi - K_1(a+p) + f_3 - f_1$$

The net force on the Scotch Yoke mechanism is $F_Y$, where:

$$F_Y = M_c g \cos\psi - K_1(a+p) + f_3 - f_1$$

The torque produced by the Scotch Yoke mechanism is:

$$T_y = F_y b \sin\theta \quad \text{eq. 45}$$

$$T_y = [M_c g \cos\Psi - K_1(a+p) + f_3 - f_1] b \sin\theta$$

From equation 1, the gravity torque produced by the rotary link is:

$$T_1 = MgL \sin \theta$$

The rotary link will be balanced when:

$$0 = T_1 + T_Y \qquad \text{eq. 46}$$

$$MgL \sin \theta = [Mcg \cos \psi - K_1(a+p) + f_3 - f_1] b \sin \theta$$

$$MgL = [Mcg \cos \psi - K_1(a+p) + f_3 - f_1] b$$

The spring preload forces, $f_1$ and $f_3$, can be adjusted to bring the rotary link into balance.

Any of the different translational counterbalances can be used in place of the one shown in FIGS. 41a and 41b.

Multiple Scotch Yoke counterbalance mechanisms can be connected to the same axis of rotation. From equation 45, it can be seen that the sine function can be multiplied by a positive number, a negative number, or zero. Two of the Scotch Yoke counterbalance mechanisms, phased 90° apart, can be connected to the same axis of rotation. With this arrangement, it's possible to deliver a net sinusoidal torque with any phase and magnitude.

11. Extending the Counterbalance to Multiple Degrees of Freedom

The zero-length spring rotary counterbalance system was analyzed in the first section. Until now, the counterbalanced link has been shown with one degree of freedom. The counterbalance is not limited to one degree of freedom.

Let's look back at the criteria for the zero-length spring counterbalance. First, the link should be constrained in all three translational degrees of freedom at point C. Second, the spring mechanism should deliver a force F that acts along the line that intersects point A on the link and point B on the cable gimbal axes.

The key to counterbalancing more than one rotational degree of freedom lies in the mechanical constraints at points A and B. As the link rotates, the spring mechanism attachment at point A should not introduce a moment to the link, and the spring mechanism attachment at point B should not introduce a moment to the spring mechanism. In other words, the degree of rotational freedom at the attachment points must be large enough to avoid any rotational constraint.

In all of the previous systems, the link was constrained at point C so that it was free to rotate about only one axis. As a result, only one rotational degree of freedom was needed at the cable gimbal and only one rotational degree of freedom was needed at point A.

There is a variety of options for counterbalancing the link as it rotates about more than one axis. At the point A cable attachment, a ball joint can be used.

A ball joint can provide a complete three rotational degrees of freedom. Ball joints typically have a limited range of motion however.

A universal joint can also be used at the cable attachment point. FIGS. 42a and 42b show a conventional u-joint consisting of two yokes with a spider between them. A pitch axis passes through yoke #1 and the spider. A yaw axis passes through yoke #2 and the spider. The pitch and yaw axes intersect at point A of the link. Yoke #1 is attached to the link, and yoke #2 is attached to the cable. Two roll axes are also shown. Roll axis #1 allows for rotation between yoke #1 and the link. Roll axis #2 allows for rotation between yoke #2 and the cable. Both roll axes also intersect at point A.

Not all of the four u-joint axes shown are needed for every application. Remember that in all of the previous systems there was only one axis or degree of freedom at point A. The number of axes needed at point A depends on the rotational freedom at the point C link pivot and the orientation of the axes at both points A and C. For example, if the axis of rotation of the link at point C is vertical, then the angle between the cable and the link does not change. In this case, zero axes are needed at point A. The link might be part of a boom and the counterbalance system would be used to eliminate the moment from the pivot bearing at point C.

Depending on the application, the u-joint in FIGS. 42a and 42b may be eliminated, or it can be used with one, two, three, or four of its axes. The redundant fourth degree of freedom may be needed for a large range of motion.

When the u-joint pitches or yaws by 90°, it is at a singularity. It no longer has 4 degrees of freedom. At 90° pitch or yaw, two of the u-joint axes are aligned with each other and there are only 3 degrees of freedom.

Several two degree of freedom cable gimbal mechanisms were discussed in section 2. Any one of the cable gimbal mechanisms can be combined with a u-joint at point A. If the u-joint at point A allows for rotation about the cable axis, then a third degree of freedom for the cable gimbal is not needed. For example, a link can be counterbalanced about any axis of rotation passing through point C by combining any of the two degree of freedom cable gimbals with a four-degree of freedom universal joint at point A.

There are several approximate methods of providing rotational freedom at points A and B. Depending on the cost, accuracy, range of motion and other system requirements, the approximate systems may be preferable. For example, the cable can be fixed at point A with no pivot mechanism. The bending and torsional stiffness of the cable will introduce a moment error and a force direction error at point A.

In some situations, a single idler pulley can be substituted for the cable gimbal mechanism. With this simplification, the apparent position of point B will not be fixed and there will be an error in the distance C between points A and B.

With the zero-length spring counterbalance, the link can be counterbalanced about all axes passing through point C even if there is no freedom for the link to rotate about the axis. The next section shows a variety of arrangements for the joint axes. Most systems are shown with the adjacent axes orthogonal to each other. The yaw axes are often shown vertical and the pitch axes are shown horizontal. With the zero-length spring counterbalance, the adjacent axes do not need to be orthogonal, and all axes may have any orientation relative to gravity.

If a moment is introduced by the spring mechanism at point A, then the constraint on the link at point C must support this moment.

12. Extending the Counterbalance to Multiple Link Arms

The previous systems were designed for counterbalancing a single rigid body or link. Arms with two or more links in series can be counterbalanced too.

Pantograph Mechanisms

The analysis of the zero-length spring counterbalance mechanism assumed that the force from the spring acted directly on the link at point A. It assumed that point A was located on the line that passes through point C and the center of gravity of the link. It assumed that point B was located on the line that passes vertically through point C.

With the above constraints, it's difficult to spring counterbalance a multiple link arm. For example, assume a two-link arm with an upper arm link and a forearm link. The upper arm is connected to ground by a shoulder joint, and the forearm is connected to the upper arm by an elbow joint. A vertical gravity reference is needed to counterbalance each link. The upper arm is next to ground for its vertical reference. The forearm usually does not usually have a vertical reference on the adjoining upper arm link. The one exception is when the shoulder joint has only a vertical axis of rotation.

The above limitations can be avoided with the following mechanism. Another link can be added at a location remote from the link to be balanced. The two links can be mechanically coupled so that the remote link copies the relevant angular motion of the link to be balanced. If the remote link is at a location with a vertical reference, then a spring counterbalance can be connected to the remote link. The spring counterbalance will balance both links. The mechanism that couples the link to the remote link is a pantograph mechanism. We can call the remote link the pantograph link.

Reasons for Using a Pantograph Mechanism

The pantograph link does not need to have the same length, mass, or inertia of the link that is being balanced. In the case of the above two-link serial arm, the pantograph link for the forearm can be located at the shoulder joint at a location with a vertical reference. This arrangement provides several benefits. First, it provides the vertical reference for the forearm. Second, it moves the mass of the counterbalance system closer to the shoulder rotation axes. The rotational inertia of the arm about its shoulder axes will be less. Third, if the arm has joint motors, the elbow motors can be located in the shoulder and connected to the pantograph too. This will decrease the arm inertia. Finally, if there isn't space available at a joint, the pantograph can be used to move the counterbalance to a different location.

Examples of Pantograph Mechanisms

Axial Offset Pantograph

Many of the figures have shown a simple pantograph mechanism. In FIGS. 4a and 4b for example, the link is mounted on a pair of bearings. The bearings limit the link rotation to only one axis. We can call this axis C. The counterbalance system should support the gravitational moment about axis C. Other moments are supported by the two bearings. Point C in FIG. 1 has been replaced by axis C.

The counterbalance torque is produced by the zero-length spring mechanism and the pantograph link. The torque is coupled to the link by the shaft that connects the two links. In this case, the shaft can be thought of as a very simple pantograph mechanism. The angle at one end of the shaft is reproduced at the other end of the shaft. The shaft has been used to axially offset the counterbalance mechanism to a new location.

Many other mechanisms can be used to axially offset the link from the counterbalance mechanism. One or more universal joints can be used in series on the shaft. Some u-joints do not have "constant velocity" or a 1 to 1 input/output ratio. They can usually be used in pairs to produce a 1 to 1 ratio. Flexible shafts or flexible u-joints may also be used. A parallel link Schmidt type coupling may also be used. The Schmidt coupling allows both axial and radial offset of the counterbalance mechanism.

Phase Shifting Pantograph

Figure 43:
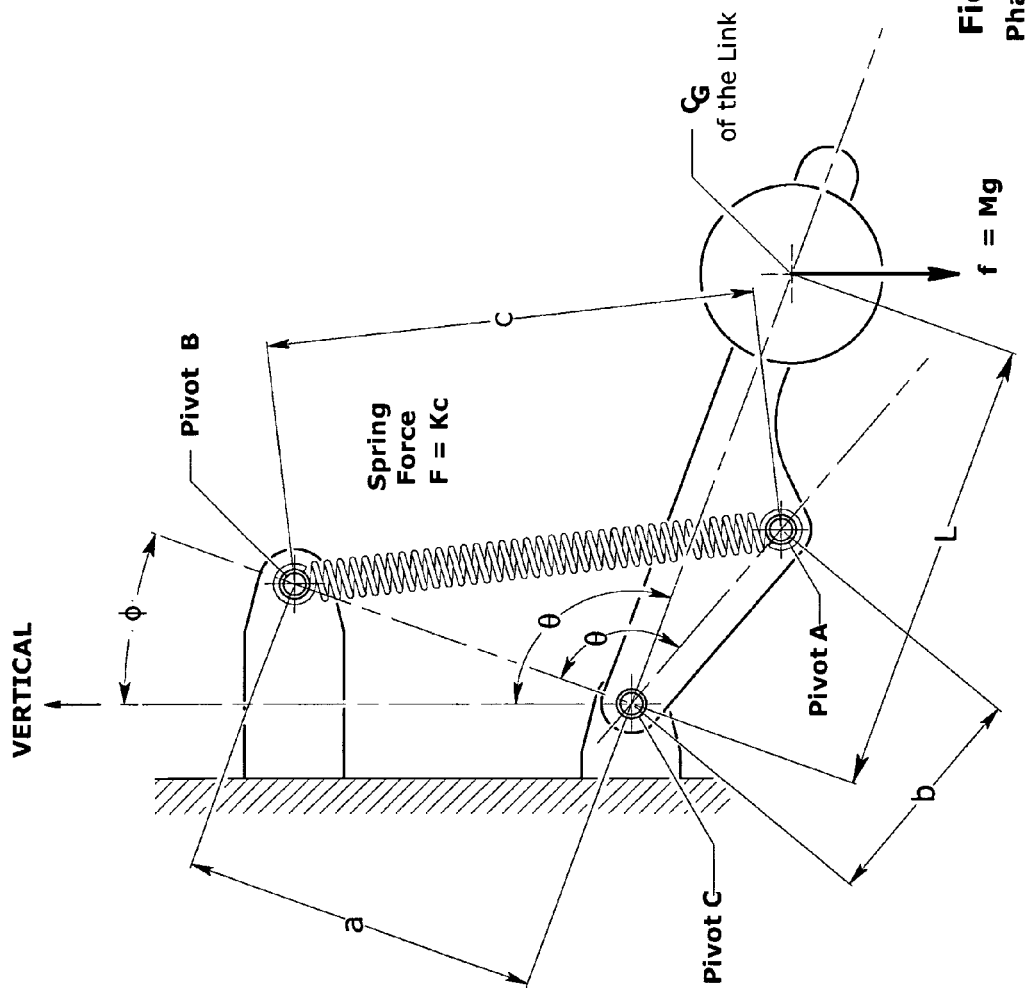
FIG. 43 is an illustration of a phase shifted counterbalance mechanism.

FIG. 43 shows another very simple form of pantograph mechanism. In section 1, $\phi$ was defined as the angle between the vertical and the line from point C to the link center of gravity. In the phase shifting pantograph mechanism, angle $\phi$ has been copied at an orientation offset from vertical by phase angle f. The zero-length spring is oriented at the offset phase angle f.

It should be noted that this very simple pantograph mechanism works for only one axis. If the link is free to rotate about an axis other than the phase shift axis, then the moments will not balance properly. If the link is connected by a joint with more than one degree of freedom, then a more complex pantograph mechanism is required. The pantograph mechanism must duplicate the angular motion of the link.

One or Two Degree of Freedom Pantograph

Figure 44:
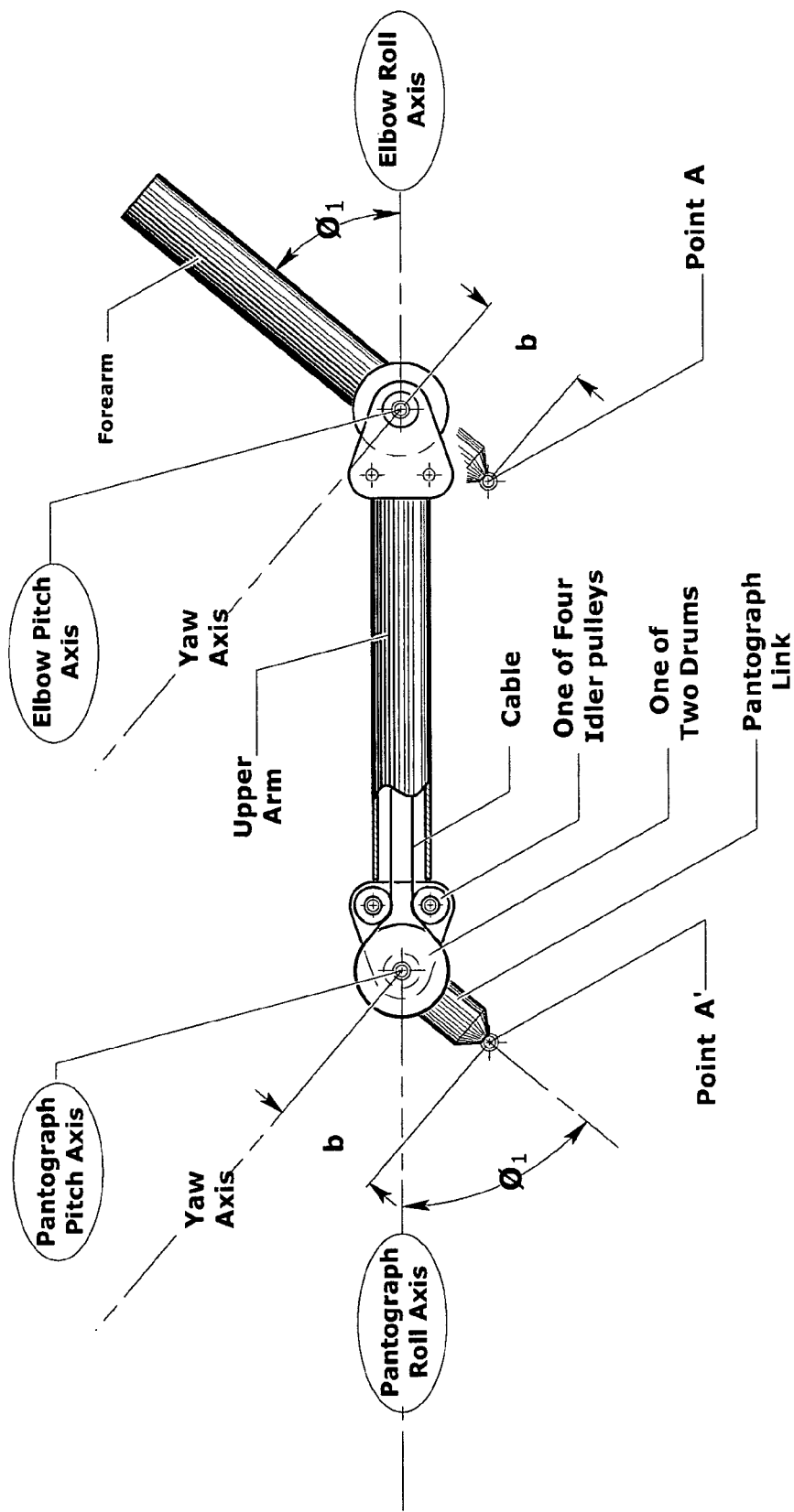
FIG. 44 is an illustration of a two degree of freedom elbow pantograph.

FIG. 44 shows a two degree of freedom pantograph mechanism. The angular motion of the forearm is duplicated by the pantograph link. The elbow pitch angle is copied at the pantograph pitch axis. The elbow roll angle is copied at the pantograph roll axis. The forearm extends in one direction from the elbow pitch axis. In FIG. 44, a "phantom" extension of the forearm is drawn in the opposite direction. Point A is shown as part of this "phantom" extension. The position of point A moves as if it was part of the same rigid body as the forearm link. Point A' is located on the pantograph link. The forearm can be balanced by connecting the zero-length spring at point A'.

In the FIG. 44 mechanism, the elbow roll axis is coincident with the pantograph roll axis. As a result, roll axis motion and torque at the elbow joint is transmitted by the upper arm, directly to the pantograph joint.

Pitch axis motion is a little more complex. The forearm link is rigidly connected to a capstan or drum. The pantograph link is rigidly connected to a drum with the same diameter. The forearm link and drum are supported and constrained by bearings to rotate about the elbow pitch axis. The pantograph link and drum are similarly supported and constrained about the pantograph axis. One or more flexible cables connect the two drums so that they rotate in the same direction at a ratio of 1 to 1. For torque transmission, the cable ends can be rigidly fastened to the drums. Alternatively, the cables can be tensioned so that friction will enable torque to be transmitted from one drum to the other. FIG. 44 also shows four optional idler pulleys. These pulleys pinch the cables together so that they will pass through an upper arm with a smaller diameter.

FIG. 44 shows a yaw axis at both joints. The pantograph does not have any yaw freedom of rotation. That does not mean that the forearm needs to be perpendicular to the pitch axis. The forearm and pantograph link can have fixed matching yaw angles. The yaw angle of the link is the angle to the center of gravity of the link, not to the outside geometry of the link. The elbow and pantograph pitch axes should be parallel to each other. The pitch axes should intersect the common roll axis. The two pitch axes do not need to be perpendicular to the roll axis.

The two degree of freedom pantograph can be converted to a one degree of freedom pantograph by locking one of the two rotational freedoms. For example, the upper arm must be mounted on bearings to have roll axis freedom. If the upper arm is rigidly mounted, then the pantograph will have only pitch axis freedom.

Three Degree of Freedom Pantograph

Figure 45A:
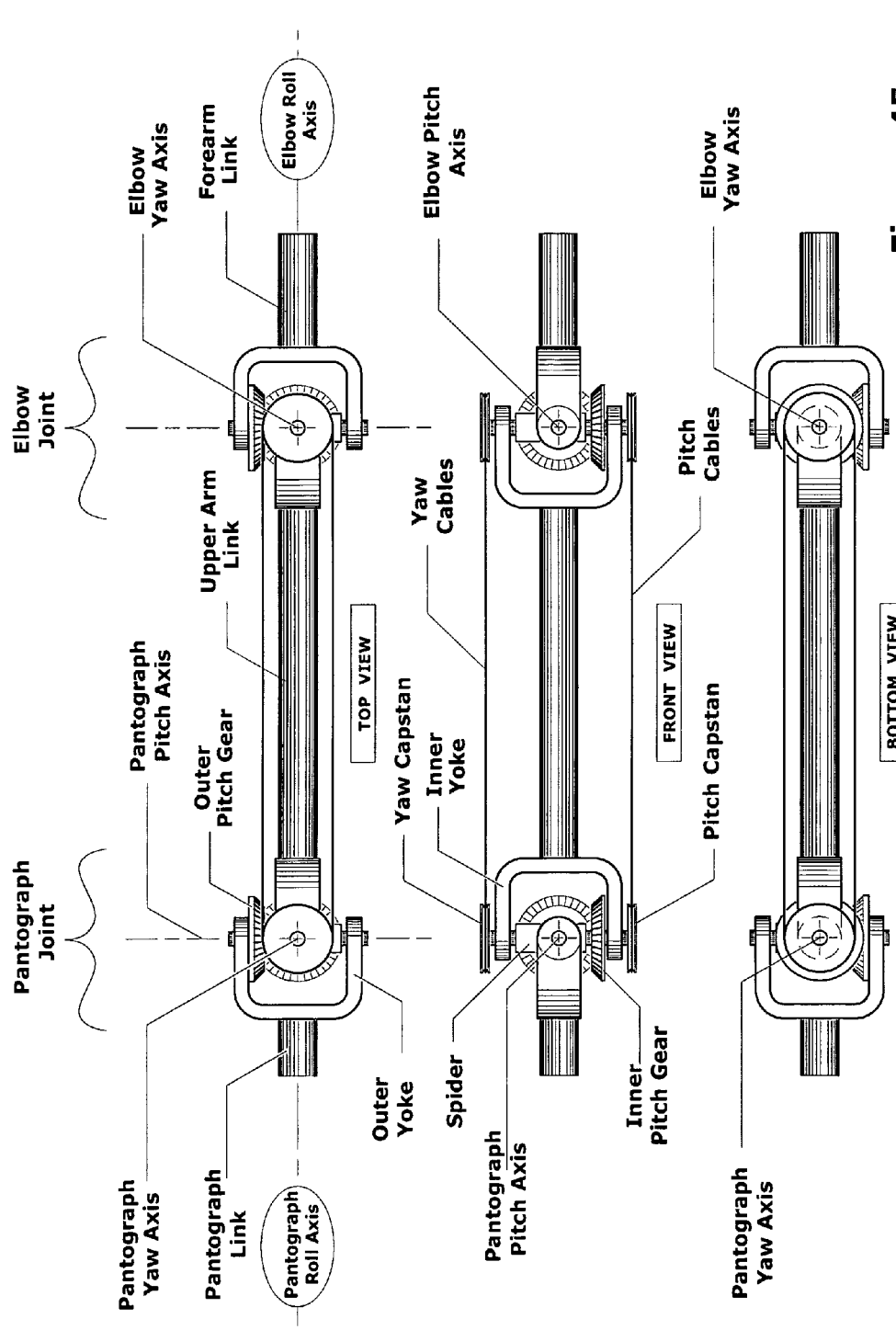
FIGS. 45a, 45b and 45c are illustrations of a three degree of freedom elbow pantograph.
Figure 45B:
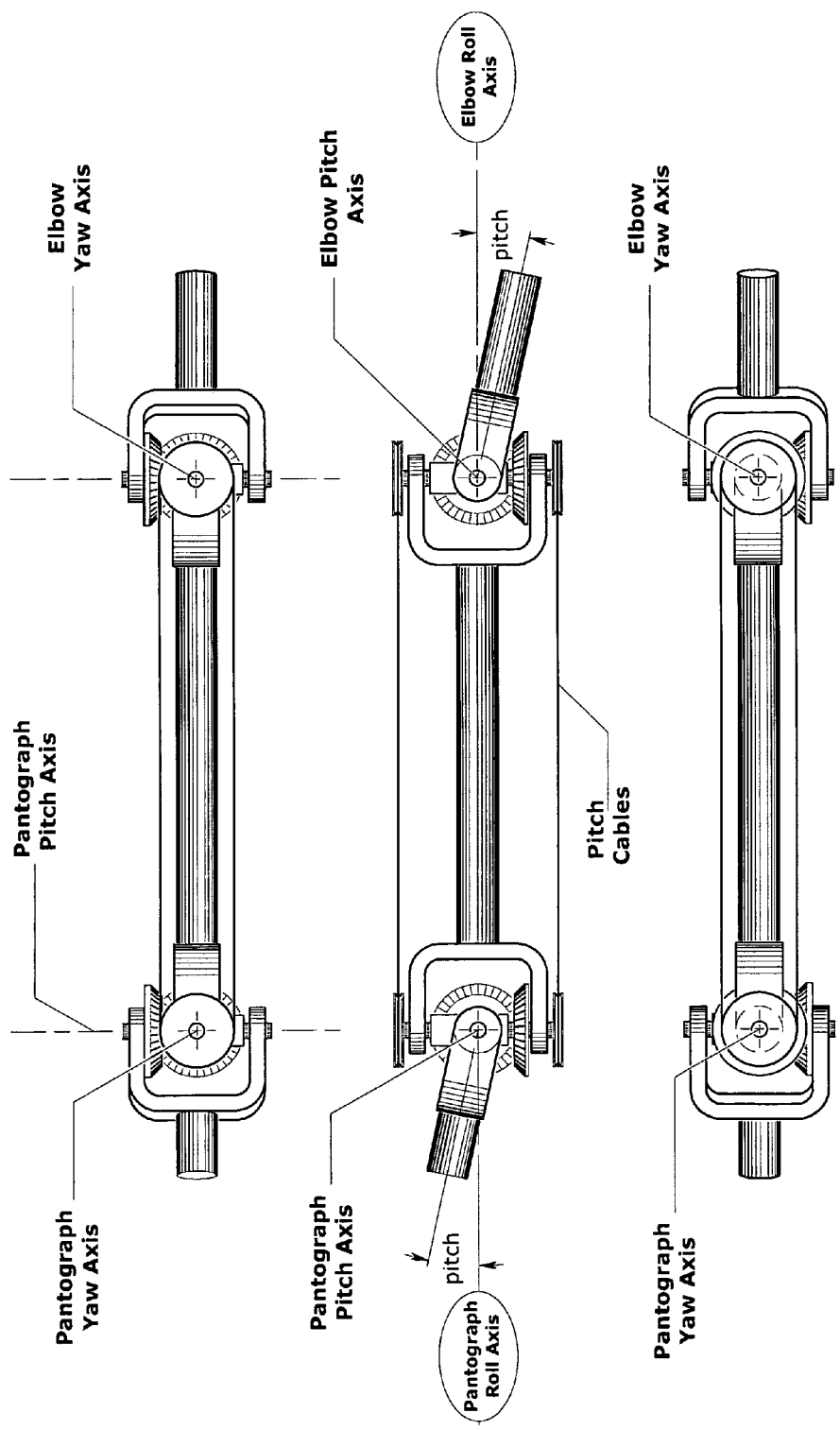
Figure 45C:
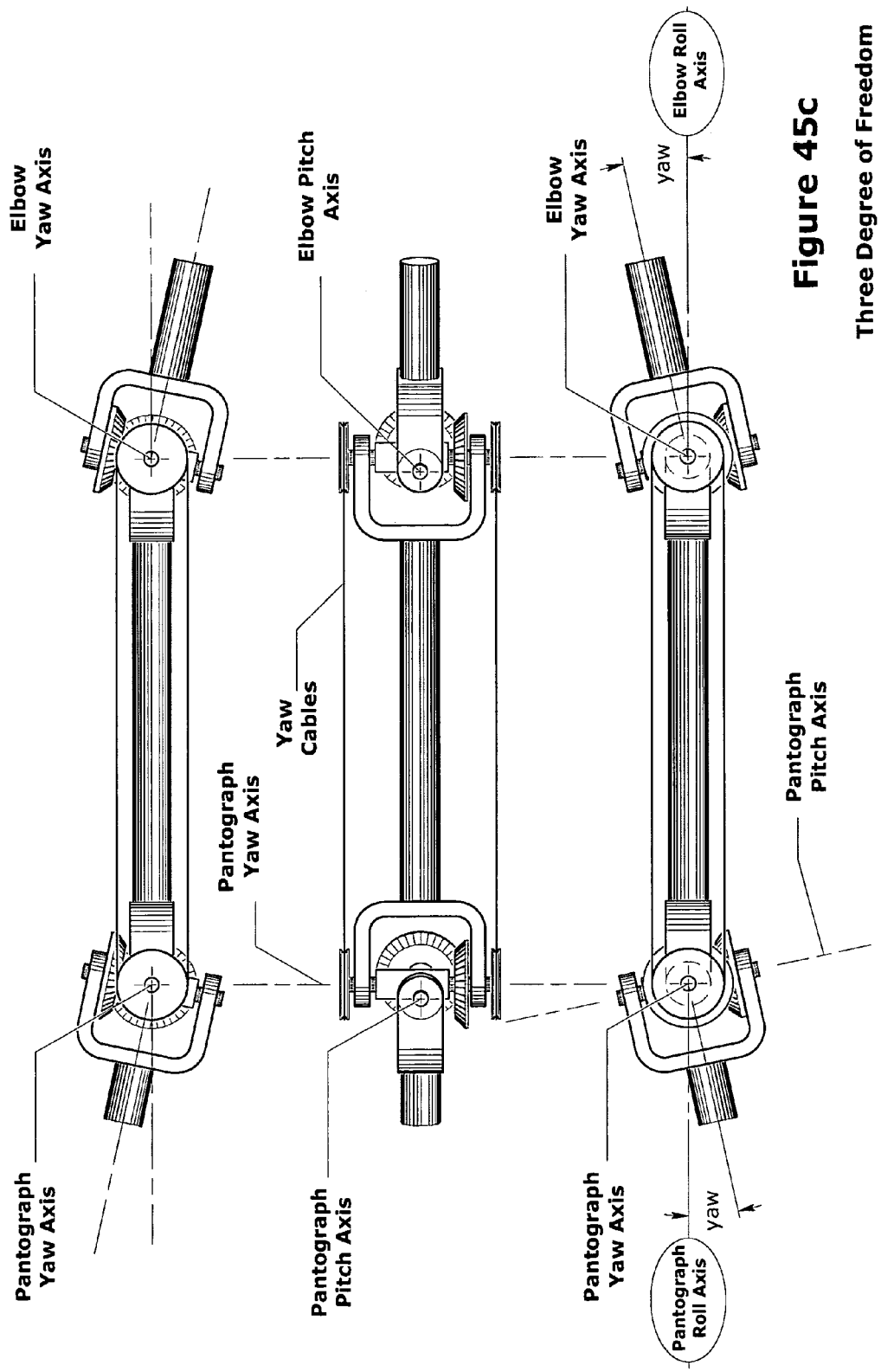

FIGS. 45a, 45b, and 45c show a three degree of freedom pantograph mechanism. The angular motion of the forearm is duplicated in all three degrees of freedom by the pantograph link. The elbow and the pantograph joints are mirror images of each other. Each joint is a universal joint, with its inner yoke rigidly connected to the upper arm link. Each joint has an outer yoke. The outer yoke of the elbow joint is rigidly attached to the forearm link. The outer yoke of the pantograph joint is rigidly attached to the pantograph link. Each joint has a spider that is located between its pair of yokes. The pitch axis passes through the outer yoke and spider of each joint. The yaw axis passes through the inner yoke and spider of each joint. At each joint, the roll, yaw, and pitch axes intersect at a point. At each joint, the adjacent axes do not need to be perpendicular to each other. For example, the elbow yaw axis does not need to be perpendicular to the elbow roll axis. The corresponding angles on the elbow and pantograph joints need to be the same. The pitch axes need to be parallel to each other.

The roll motion and torque is transmitted by the upper arm as it was in the FIG. 44 pantograph mechanism. Yaw axis motion is transmitted in the following way. The spider of each joint is rigidly coupled to a yaw capstan. One or more flexible cables connect the two capstans so that they rotate in the same direction at a ratio of 1 to 1. Pitch axis motion is more complex. A bevel gear is rigidly attached to the outer yoke of each joint. They are called the outer pitch gears. Another bevel gear is mounted on bearings that rotate about the yaw axis of each joint. These are called the inner pitch gears. On each joint, the outer and inner pitch gears mesh with each other. Each inner pitch gear is rigidly coupled to a pitch capstan. One or more flexible cables connect the two pitch capstans so that they rotate in the same direction at a ratio of 1 to 1. Idler pulleys can be added as in the FIG. 44 pantograph mechanism.

Other Parallel Axis Pantograph Mechanisms

In FIGS. 44 and 45a-45c, motion and torque is transmitted from one parallel axis to the other. There are many other ways to accomplish this. The flexible cables and capstans can be replaced by flat belts and pulleys, tooth belts and pulleys, metal bands and pulleys, or chain and sprockets. Two pairs of bevel gears and a shaft can also transmit the motion. For example, the shaft can be parallel to the upper arm link. One pair of bevel gears would be at each end of the shaft to change the axis of rotation by 90°. A series of gears can also transmit the motion. An odd number of gears will produce rotation in the same direction at each end. Over a limited range of motion, a parallelogram four-bar link will transmit motion between parallel shafts. The four-bar link has four links in series, with the end of the last link connecting to the start of the first link. In a parallelogram four-bar mechanism, opposite links have the same length. To avoid a singularity, a single four-bar mechanism is limited to less than + or −90° rotation. Two parallelogram four-bar mechanisms phased 90° apart can be used to couple two parallel axes. The two four-bar mechanisms can deliver unlimited rotation. This is the same arrangement that steam engines used. The cranks on each side are shifted by 90°.

Pantograph Mechanisms in Series

More than one pantograph mechanism can be used in series to transmit motion from the link to the counterbalance mechanism. The number of degrees of freedom is limited to the individual pantograph with the lowest number. If the last pantograph mechanism in the series has a vertical reference, it can be connected to the counterbalance mechanism at that location. A series of pantograph mechanisms may be needed to reach a vertical reference. For example on a three serial link arm, for the outer joint, the series of pantograph mechanisms may need to pass through the next two inner joints to get back to a vertical reference.

An alternate approach may be used for counterbalancing a joint. A pantograph mechanism can be used to transfer a vertical reference out to the joint. The spring counterbalance mechanism can then be located at the outer joint.

13. Examples of Counterbalanced Two Link Arms

FIGS. 47a through 54c show a variety of two link arms with different degrees of freedom and ranges of motion. Most of them are shown with fixed spring counterbalance mechanisms. Any of these can be converted to fully adjustable counterbalance mechanisms. In all of the figures, the joint axes are labeled and numbered. The numbering starts from ground and works out to the end of the arm. In all of the arms, axis number one is a vertical axis at the shoulder joint. Vertical axes are inherently balanced relative to gravity. As a result, the details of the vertical have been omitted.

FIGS. 47a, 47b and 47c show a three degree of freedom arm. The shoulder joint has yaw and pitch axes. The elbow joint has a pitch axis. The upper arm, forearm, and pantograph assembly are the same as shown in FIG. 44. Axis #2, the shoulder pitch axis, is counterbalanced by an axial offset pantograph mechanism combined with a zero-length spring and gimbal mechanism. The axial offset pantograph mechanism is used to move the shoulder counterbalance mechanism, to make room for the elbow counterbalance mechanism.

The arm in FIG. 44 has been shown with the shoulder and elbow pitch axes in a horizontal orientation. Because of this, only one rotational degree of freedom is needed at each counterbalance cable attachment. The cable gimbals need only one degree of freedom. The shoulder and elbow pitch axes do not need to be horizontal. If a pitch axis is not horizontal, then the cable gimbal must have at least two degrees of freedom. The cable attachment should be converted to a u-joint with three or more degrees of freedom. The shoulder and elbow pitch axes do not need to be parallel.

Mounting Constraints for the Pantograph Axis

The elbow pantograph axis should be aligned so that it intersects the shoulder pitch axis. If it does not, then both the elbow and shoulder counterbalances will not work properly. There will be a coupling between the shoulder joint and the pantograph joint.

In general, to avoid coupling between the joint counterbalance mechanisms, the pantograph axis should intersect all of the non-vertical axes of the local arm joint. With this alignment, the elbow counterbalance mechanism in FIGS. 47a, 47b and 47c will balance the forearm moment at the elbow joint and the moment from the elbow joint will not couple into the shoulder pitch axis.

The forearm still has an affect on the moment at the shoulder pitch axis. The weight of the forearm acts to increase the moment at the shoulder pitch axis. The weight of the forearm acts as if it was concentrated along the elbow axis. This concentrated weight needs to be added to calculate the moments of the upper arm about the shoulder axes. An effective center of gravity and weight can be calculated for the upper arm in combination with the forearm. For example, in FIGS. 47a, 47b and 47c, the mass of the forearm link maps onto the elbow pitch axis at a point. This point is at the intersection of the joint axis with the plane that is both perpendicular to the axis and that contains the center of gravity of the forearm link. The pantograph and counterbalance mechanisms effectively resolve the load at each joint into a force and a moment.

For an elbow joint with more than one axis, the axes should intersect. The weight of the forearm link will act at the intersection point.

This process can be repeated for arms with more than two links in series. At each joint, a pantograph mechanism can be used to support the moment load. The weight of all of the distal links acts on the axis of rotation of the joint. To avoid coupling the moments into the proximal joints, a pantograph joint or a new pantograph mechanism can be used at each proximal joint. Each pantograph axis should intersect the axis of the proximal joint so that a moment isn't coupled into the proximal joint. The counterbalanced moment is transmitted back to ground without affecting the joints in between.

FIGS. 48a, 48b and 48c show a four degree of freedom arm. The shoulder joint has yaw and pitch axes. The elbow joint has roll and pitch axes. This difference between this arm and the last one is that a set of bearings has been added. The bearings allow the elbow to rotate about a roll axis. With the extra degree of freedom, a three or four degree of freedom u-joint is needed at the cable connection to the elbow pantograph link. A two degree of freedom cable gimbal is needed for the elbow joint counterbalance. The pantograph roll and pitch axes should intersect the shoulder pitch axis at one point.

Figure 50:
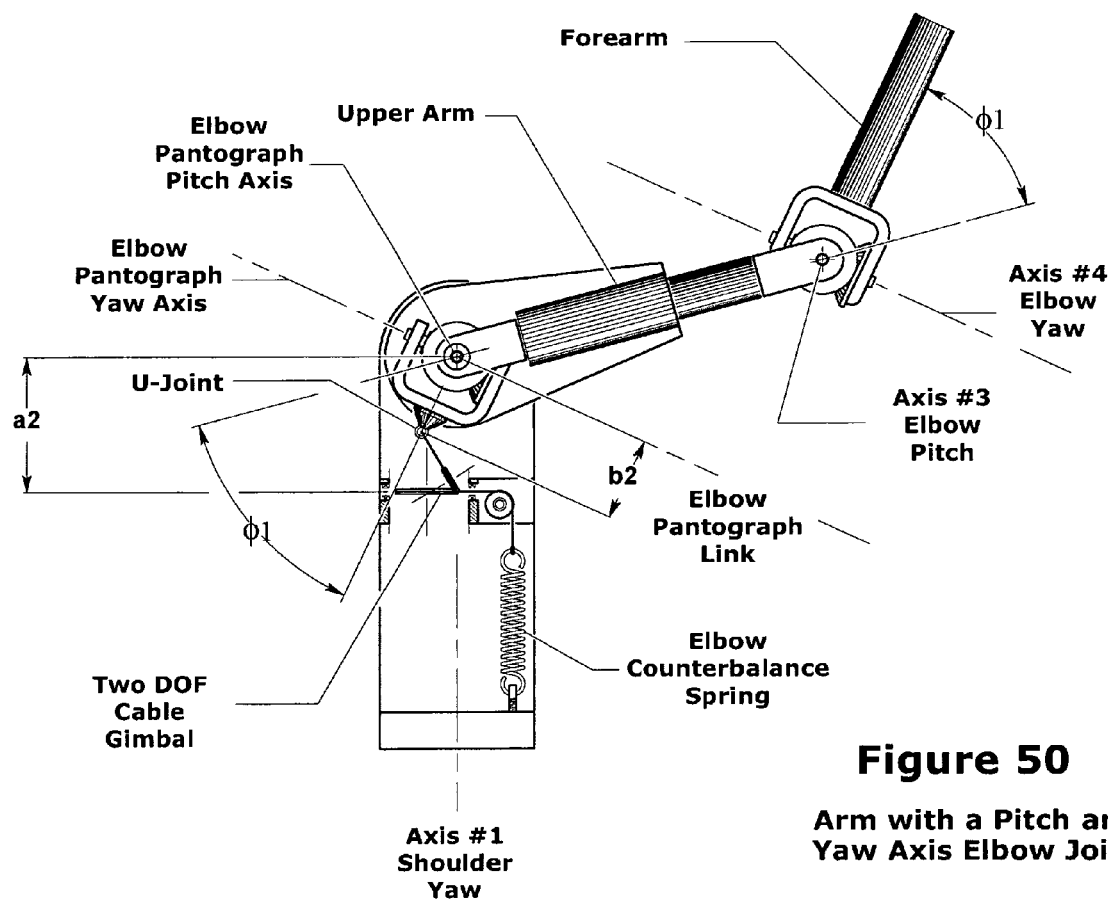
FIG. 50 is an illustration of an arm with a pitch and yaw axis elbow joint.

FIG. 50 shows another four degree of freedom arm. The shoulder joint has yaw and pitch axes. The elbow joint has pitch and yaw axes. The upper arm, forearm, and pantograph assembly are the same as shown in FIGS. 45a, 45b and 45c. A three or four degree of freedom u-joint is needed at the cable connection to the elbow pantograph link. A two degree of freedom cable gimbal is needed for the elbow joint counterbalance. The pantograph pitch and yaw axes should intersect the shoulder pitch axis at one point.

Figure 51:
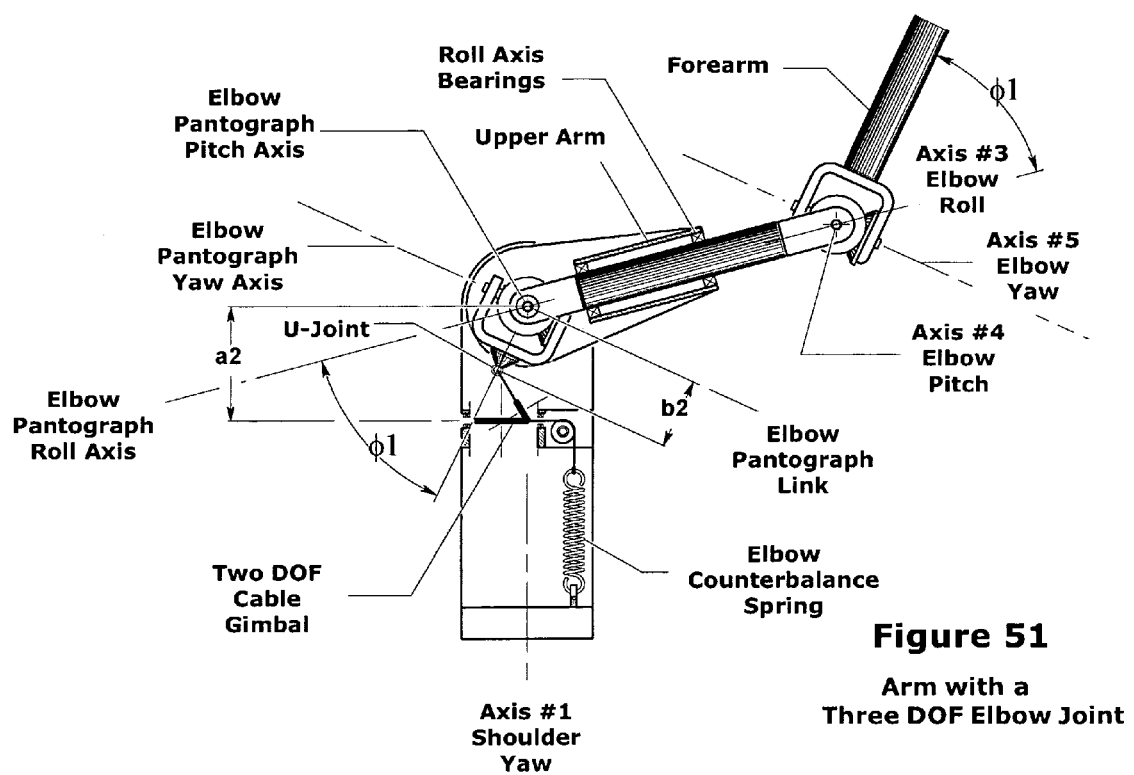
FIG. 51 is an illustration of an arm with a three DOF elbow joint.

FIG. 51 shows a five degree of freedom arm. The shoulder joint has yaw and pitch axes. The elbow joint has roll, pitch, and yaw axes. This difference between this arm and the last one is that a set of bearings has been added. The bearings allow the elbow to rotate about a roll axis. A three or four degree of freedom u-joint is needed at the cable connection to the elbow pantograph link. A two degree of freedom cable gimbal is needed for the elbow joint counterbalance. All of the pantograph axes should intersect the shoulder pitch axis at one point.

FIGS. 49a, 49b and 49c show a three degree of freedom arm. All joint axes on this arm can have an unlimited range of motion. The shoulder joint has yaw and pitch axes. The elbow joint has a pitch axis. The upper arm, forearm, and pantograph assembly are similar to the mechanism shown in FIG. 44. In FIGS. 49a, 49b and 49c, the upper arm and the forearm have been offset. The offset allows both the upper arm and the forearm to rotate without interference. The shoulder pitch axis has an axial offset pantograph. The shoulder pantograph is connected to another pantograph consisting of two capstans with cables. The far capstan connects to the shoulder pantograph link. The link connects to the counterbalance spring mechanism. The elbow axis is pantographed several times, first by an axial offset at the elbow, then by the mechanism of FIG. 44, then by another axial offset to the rear of the arm. At the rear, the elbow pantograph link connects to the spring mechanism.

FIGS. 52a, 52b and 52c show shows an arm with five degrees of freedom. The shoulder joint has yaw, roll, and pitch axes. The elbow joint has roll and pitch axes. The elbow counterbalance is very similar to the elbow counterbalance in FIGS. 48a, 48b and 49c. The elbow spring and cable have been rerouted. Another degree of freedom has been added to the shoulder joint. This is shoulder roll axis #2.

To counterbalance the shoulder joint, another pantograph consisting of two capstans and cables has been added. This can be seen in the right hand view. The shoulder pantograph link connects to the far capstan through a shaft.

Figures 53A, 53B, 53C:
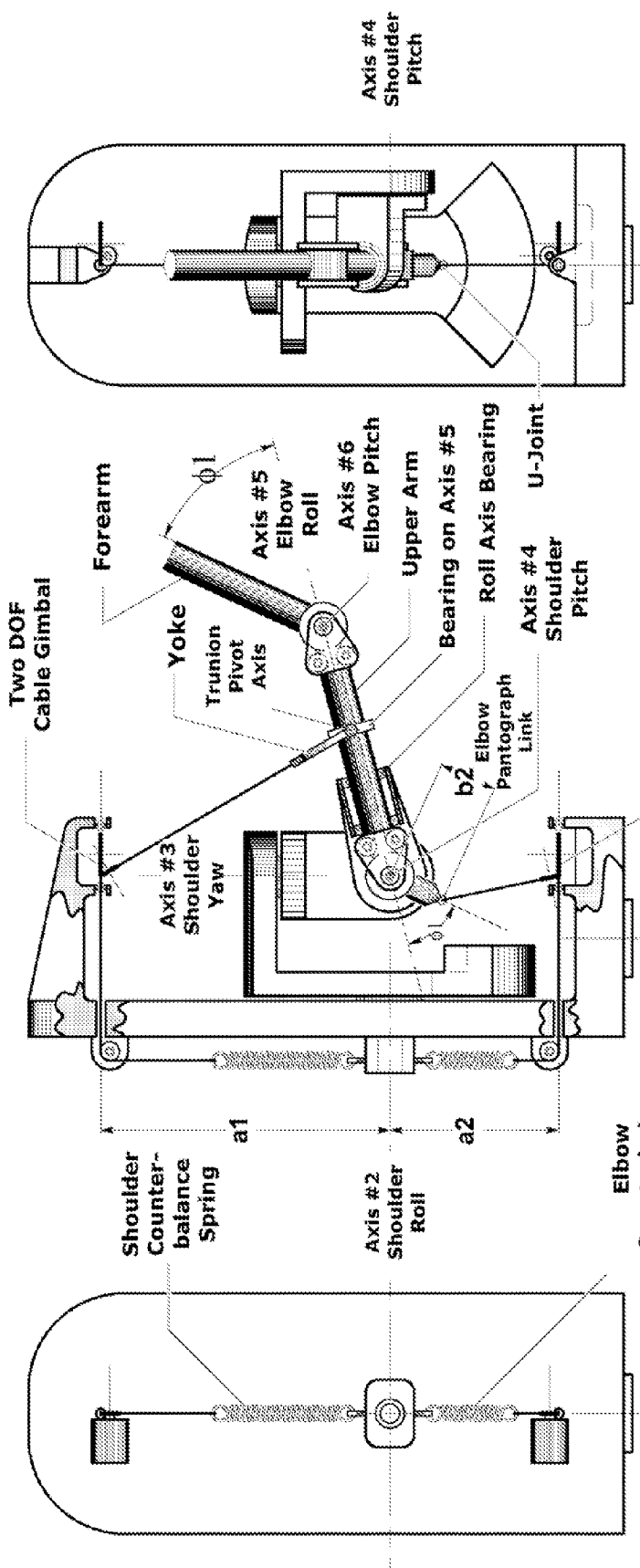
FIGS. 53a, 53b, and 53c are illustrations of an arm with a four DOF shoulder joint.

FIGS. 53a, 53b and 53c show an arm with six degrees of freedom. The shoulder joint has yaw, roll, yaw, and pitch axes. The elbow joint has roll and pitch axes. The elbow counterbalance is very similar to the elbow counterbalance in the previous The shoulder has one more degree of freedom than the previous arm did. It's possible but cumbersome to "pantograph" around the additional axis. Another approach has been taken to counterbalance the shoulder. A spring and cable gimbal mechanism is connected directly to the upper arm. The cable gimbal is above the shoulder joint. As a result, the cable connects to the "front" end of the upper arm link. This arrangement keeps the shoulder counterbalance from interfering with the elbow counterbalance.

The shoulder counterbalance cable connects to the arm through a three degree of freedom joint. The joint has a yoke that spans the upper arm. A bearing surrounds the upper arm. The bearing axis is coaxial with the elbow roll axis #5. The yoke is attached to the outer race of the bearing through trunnion pivot bearings. The cable connects to the yoke through a bearing. The axis of rotation of the bearing is coincident with the cable centerline. All three of the axes intersect at one point. This point should be point A for the upper arm link.

FIGS. 54a, 54b and 54c show a detailed drawing of a four degree of freedom arm. The shoulder joint has yaw and pitch axes. The elbow joint has roll and pitch axes. This arm has the same kinematics as the arm shown in FIGS. 48a, 48b and 49c.

In FIGS. 54a, 54b and 54c, the fixed counterbalance mechanisms have been replaced with adjustable counterbalance mechanisms similar to the one shown in FIGS. 27a and 27b. The gravity counterbalance mechanisms have counterbalanced adjustment, link-angle compensation with counterbalance, and load compensation. An additional idler pulley has been added to each counterbalance. The pulleys enable spring #1 and spring #2 to be aligned parallel to the load adjustment direction. As a result, the counterbalance mechanisms use less volume.

In FIGS. 54a, 54b and 54c, the components of the shoulder joint counterbalance are labeled, and the elbow joint components are not labeled. The elbow counterbalance has a two degree of freedom cable gimbal. The shoulder counterbalance has a one degree of freedom cable gimbal. Except for this one difference, the elbow joint counterbalance is the mirror image of the shoulder joint counterbalance.

A System that Uses Weight to Store Energy

Here is an example of a system that would be gravity counterbalanced with a counterbalanced adjustment. It uses weight rather than springs to store energy. It may not make financial sense, but it is easier to understand.

Assume that there is an elevator with only a ground floor and a second floor. It might be in a tall tower, with the second floor far above the ground floor. A cable pulls the cabin of the elevator up and down. The cable goes from the top of the cabin, up to a drum, around the drum several times, and then back down to a counterweight.

If the counterweight is equal to the weight of the cabin, then the system will be balanced. (assuming that the cable is weightless) Assuming no friction, the elevator can go up and down without any energy. If passengers get into the cab at the ground floor, energy will be needed to take them to the top. When they get back on the elevator to return to the ground floor, energy will exit the system. Either the energy will be turned into heat, or a motor-generator may generate electricity.

The elevator can be adjustably counterbalanced in the following way. A water tank can be added to the counterweight. Another water tank, full of water, can be put on the second floor. A third water tank can be located at the ground floor. Assume that the empty elevator is balanced when the tank on the counterweight is empty.

Now, when people get onto the elevator at the ground floor, an equal weight in water can be transferred from the tank on the second floor into the counterweight tank. The system will be balanced so that the elevator can take the passengers up to the second floor without any energy. Only a small motor would be needed to drive the system. If the elevator makes any moves up or down, water should be transferred to or from the ground or second floor tanks so that the system is balanced before the elevator moves. The elevator can move people and freight up to the second floor until the second floor tank is empty. At that point, someone or something needs to return to ground floor before anything else can go up.

The Effect of System Efficiency on Energy Consumption

A purely mechanical, regenerative spring system can be much more efficient than an electromechanical regenerative system. For example, a car with regenerative braking may have a motor-generator efficiency of about 90% and a DC to DC converter efficiency of about 90%. When regenerative braking is applied, 90% of the kinetic energy is converted to electrical energy by the motor-generator. Ten percent of the electrical energy is lost when it the voltage is converted to a higher voltage by the DC to DC converter. The electrical energy may be stored in a battery or capacitor. When the car accelerates again, 10% of the electrical energy is lost in the DC to DC converter. The motor-generator converts 90% of the remaining electrical energy back into kinetic energy.

The amount of energy that is converted back into kinetic energy after one cycle can be calculated by taking 0.9 to the $4^{th}$ power. This is about 0.65, or 65%. For each braking and acceleration cycle, about 65% of the energy is recovered. This doesn't account for any battery loss. A spring system should be able to recoup about 95% of the energy per cycle.

Let's look at what happens after multiple cycles with each system. After two cycles with the electromechanical system, 42% of the energy remains.

$(0.65)^2 = 0.4225$

With the spring system, it takes 17 cycles before the remaining energy is down to 42%.

$(0.95)^{17} = 0.4181$

The spring system can do about 17/2 cycles=8.2 times as many cycles before using up about 1−0.42=0.58 or 58% of the available energy.

Looking at it another way, outside energy can be added during each cycle to bring the total kinetic energy back up to 100% of the original amount. The electromechanical system will need 35% of the original amount and the spring system will need 5% of the original amount. The spring system will need only 1/7 or 14% as much energy as the electromechanical system.

The third spring in the counterbalances mechanism operates as follows:

The first spring mechanism counterbalances the gravity torque on the link.

The second spring mechanism counterbalances the force needed to adjust the first spring mechanism. Unfortunately, the first and second spring mechanisms are matched at only one link angle. If the system tries to adjust for a different payload at a different link angle, one of two things will happen. Either extra energy will be needed to make the adjustment, or spring energy will be lost while the adjustment is made.

The third spring mechanism is used to adjust the force of the second spring mechanism so that it matches the force of the first spring mechanism. This enables the link to change payloads at any angle. Energy will not be needed or lost in the process.

In FIGS. 54*a*, 54*b* and 54*c*, I show that a second motor-encoder-brake can be used to adjust the spring #2-spring #3 combination. The motor can be replaced with a Scotch Yoke mechanism that is coupled to the axis of rotation of the link. The spring #2-spring #3 combination would be automatically adjusted as the link rotates.

The load compensation adjustment of dual capstan #2 in FIGS. 28*a* and 28*b*, can be coupled to the spring carriage.

14. Other Mechanisms to Use in Place of the Spiral Pulley and Cable Mechanism

Direct Substitution

1. A band can be substituted for the cable. The pulley should have a flat or slightly crowned profile. The resulting mechanism should have very high efficiency.
2. A flat belt can be substituted for the cable. The pulley should have a flat or slightly crowned profile.
3. A toothed belt or timing belt can be substituted for the cable. The pulley should have mating grooves.
4. A roller or silent chain can be substituted for the cable. The spiral pulley should be replaced with a spiral sprocket with a mating tooth profile. The sprocket on a chain drive may be smaller than the corresponding spiral pulley. The chain doesn't have the same bend radius limitation that a cable does. The chain drive will have a chordal error.

Other Variable Ratio Transmissions

Figure 29A:
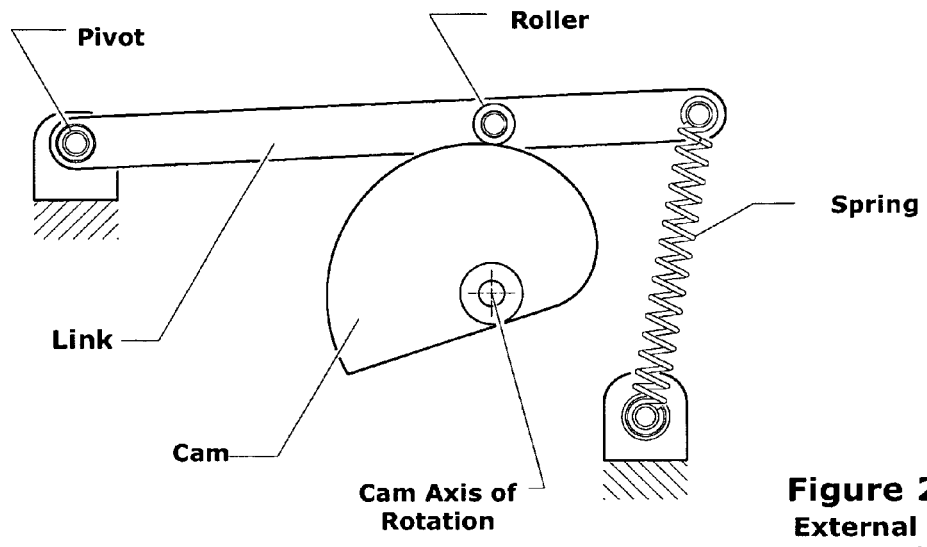
FIGS. 29a and 29b are illustrations of the external and internal cam and roller.
Figure 29B:
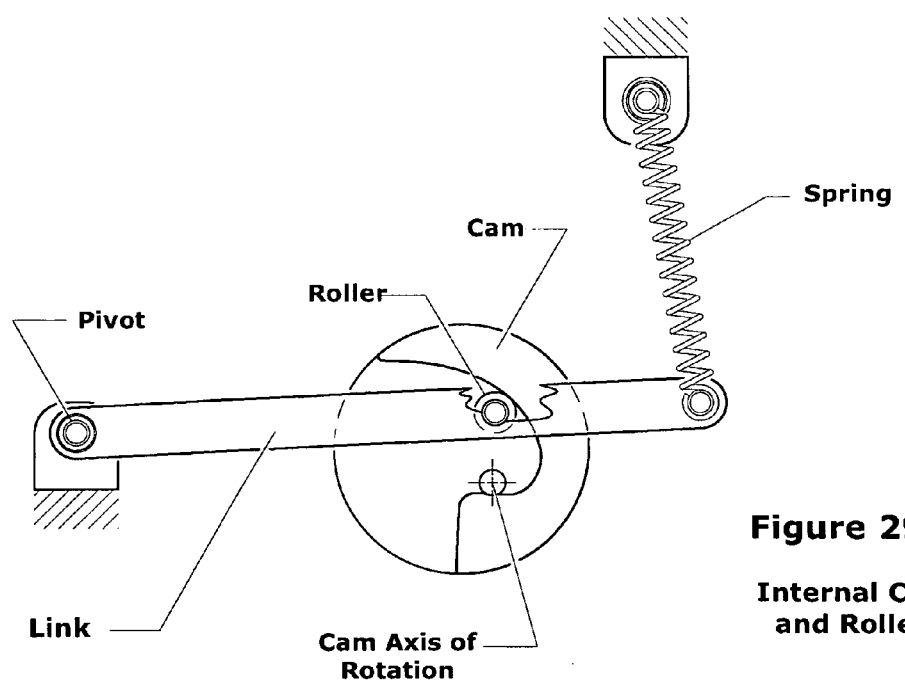

5. The spiral pulley and cable mechanism is a type of variable ratio transmission. Gears can be made with a spiral profile. Gears with mating spiral profiles can be connected to various types of springs. A torsion spring can be connected directly to a spiral gear. The mating spiral gear can be connected to another torsion spring. If it is difficult to achieve the desired ratio with one pair of gears, two pairs can be used in series. This is very similar to the dual spiral pulley system.
6. A cam with a roller follower can be used in place of the spiral pulley and cable. FIGS. 29*a* and *b* show cam and roller mechanisms connected to a spring. The cam in FIG. 29*a* is an external cam. The roller follower rolls on the outside surface of the cam. The cam in FIG. 29*b* is an internal cam. The roller follower rolls on the inside surface of the cam. The cam profiles can be generated using a method similar to the way that the spiral pulley profiles were generated. For example, the cam can be designed to produce a constant torque over its range of rotation. Differential equations can be generated and solve numerically for the required cam profile. As with the spiral pulleys, the torque profile does not need to be constant, parabolic or other profiles should work too. The cam and roller mechanism should be very efficient, and it may be smaller than a spiral pulley with the same output.

15. Other Mechanisms Constant Force or Torque Mechanism

Figures 34A, 34B:
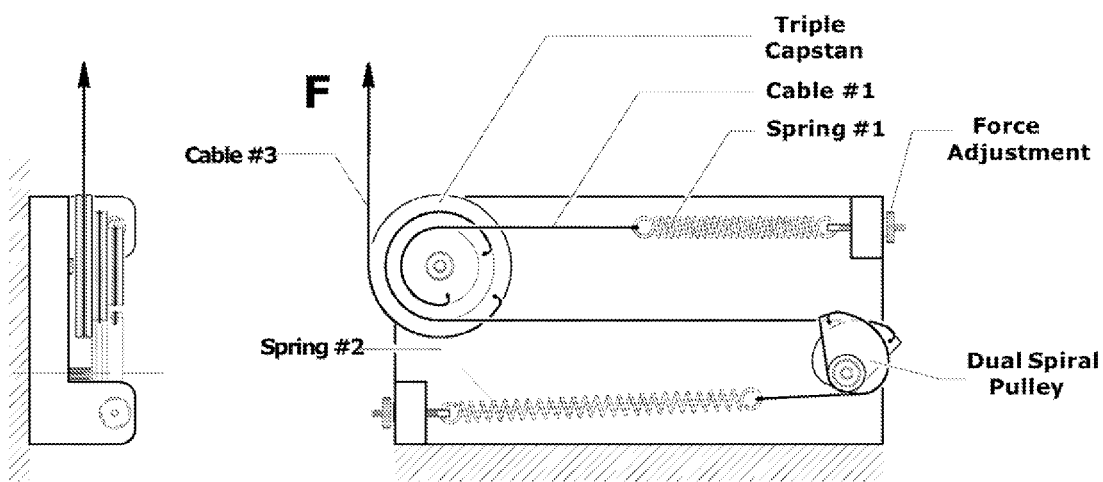
FIGS. 34a and 34b are illustrations of the adjustable constant force or constant torque mechanism.

FIGS. 34*a* and 34*b* show an adjustable constant force mechanism. It is similar to the adjustable translational counterbalance mechanisms shown in FIGS. 35*a*, 35*b*, 36*a*, 36*b*, 37*a*, and 37*b*. In FIGS. 37*a* and 37*b*, cable #3 is attached to a pivot that translates with the carriage. Cable #3 wraps around a sliding pivot spiral pulley. The other spiral pulley in FIGS. 37*a* and 37*b* is a fixed pivot spiral pulley.

In FIGS. 34*a* and 34*b*, both of the spiral pulleys are fixed pivot spiral pulleys. The torque on the triple capstan is constant. The torque can be adjusted by changing the tension on either of the springs. Cable #3 and the third capstan convert the torque to a constant force. The force from cable #3 can be used to counterbalance a translating link.

Adjustable Stiffness Rotary Counterbalance

Figures 55A, 55B:
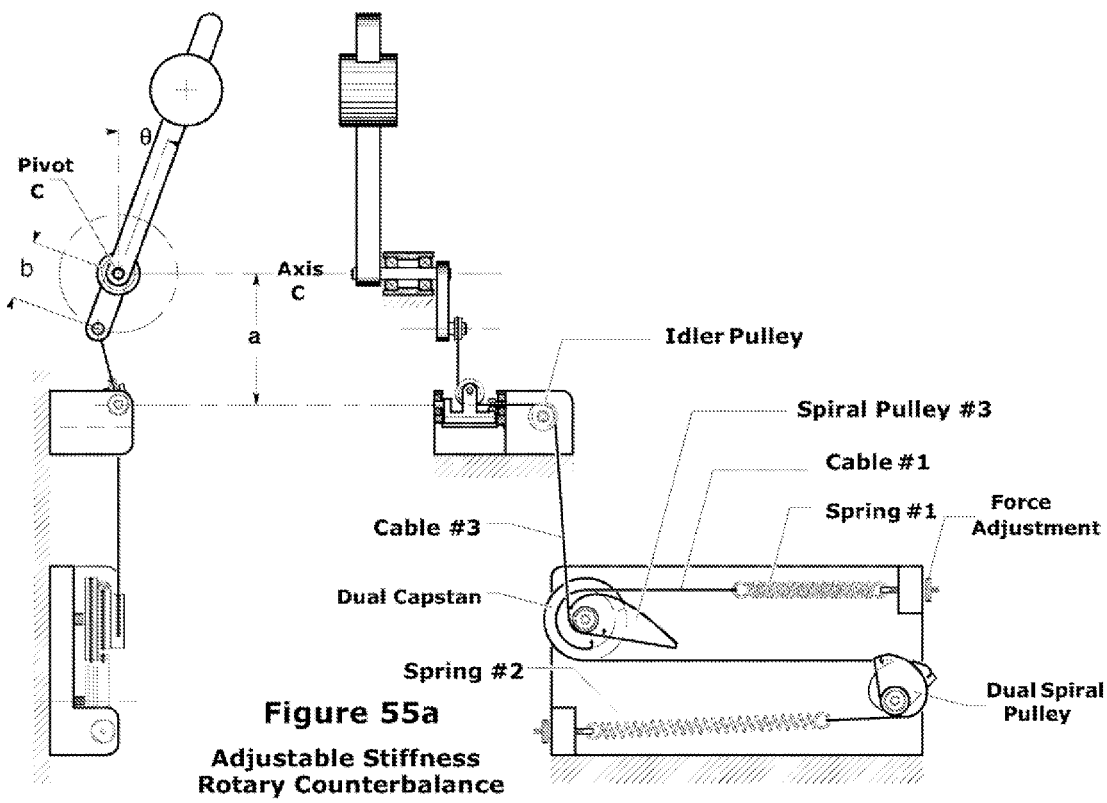
FIGS. 55a and 55b are illustrations of an adjustable stiffness rotary counterbalance.

FIGS. 55a and 55b show an adjustable rotary counterbalance mechanism. Looking back at equation 6, the magnitude of the counterbalance torque can be changed by adjusting dimension a, dimension b, or spring constant $K_1$. In most of the previous rotary counterbalance mechanisms, dimension a was adjusted. In FIGS. 55a and 55b, the spring constant is adjusted.

The mechanism shown below the idler pulley is a constant torque mechanism. It's the same mechanism shown in FIGS. 34a and 34b. Spiral pulley #3 has been rigidly attached to the dual capstan. Spiral pulley #3 is a fixed pivot spiral pulley. It's the type of spiral pulley that converts the force from a linear spring into a constant torque. In this case, the torque from the lower mechanism is converted to a force in cable #3. The effective stiffness of the force in cable #3 can be changed by adjusting the lower constant torque mechanism.

Moving the Counterbalance Mechanism Away from the Link

The counterbalance mechanism shown in FIGS. 55a and 55b can be located away from the link that's being counterbalanced. A pantograph mechanism can also allow a counterbalance mechanism to be located away from the link. In the FIGS. 55a and 55b mechanism, only one cable is needed to transmit the force to the link. The counterbalance mechanism can be located on an adjacent link by routing cable #3 along the connecting axis of rotation. The inertia of the arm can be reduced by moving the mass of the mechanism to a link that's closer to ground. Less torque may also be needed to support the weight of the mechanism.

Figures 46A, 46B:
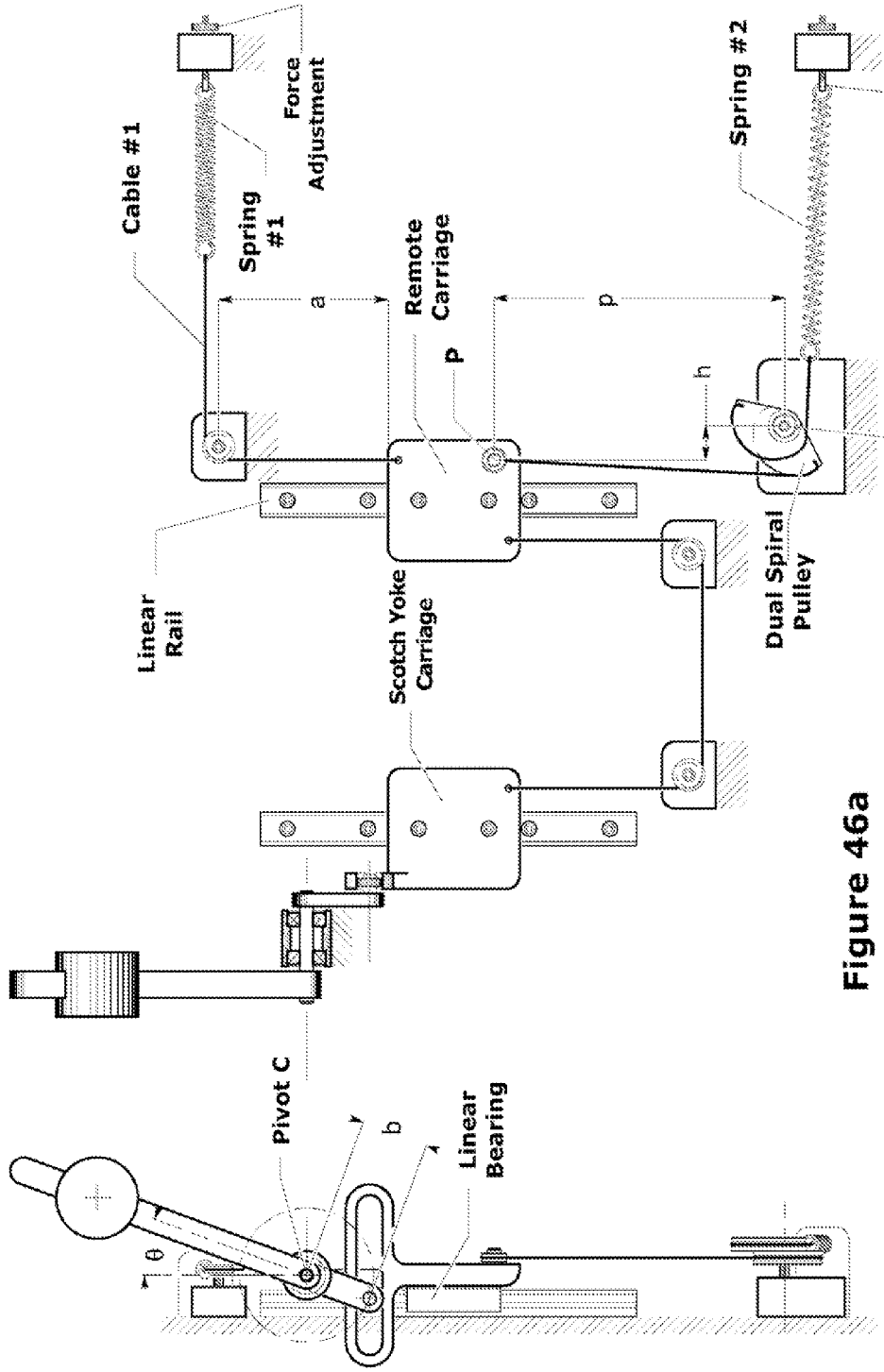
FIGS. 46a and 46b are illustrations of a remote rotary counterbalance with a scotch yoke.

The Scotch Yoke counterbalance shown in FIGS. 41a and 41b can also be located away from the link. FIGS. 46a and 46b show how a single cable can be used to couple the output of a constant force mechanism to the Scotch Yoke mechanism.

Some Uses and Advantages of The Adjustable Load, Energy Conserving Counterbalance Mechanism And the Multiple Serial Link Balance Mechanisms Robotics
  Advantages
  Much larger payloads can be lifted with the same motors.
  Smaller less expensive motors can be used. The power supply and electronics can be smaller too.
  Less energy consumption. It will be a big advantage for mobile robots.
  Able to apply a constant force in any direction without any energy consumption. Infinitely more efficient than with servo motors.
  Multiple link mechanisms enable counterbalancing of arms with more degrees of freedom than currently possible.
  With a counterbalance, the motors don't have to hold the weight of the payload. Accuracy and response or bandwidth is improved. Accurate and delicate movement is possible, even with a heavy load.
  Counterbalancing with weights increases the weight and inertia of the system. Counterbalancing with springs will add very little to the weight and inertia. With less inertia, the robot can accelerate faster
  Zero stiffness will make it safer around humans.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

I claim:

1. A mechanical arm, comprising:
  a forearm;
  a first spring;
  an upper arm connected between the forearm and the first spring, wherein the forearm applies a mass that generates a first moment at the upper arm;
  a copy device associated with the upper arm, the copy device copying the first moment to the first spring, wherein the first spring applies a counter-force to a tension member connected between the first spring and the upper arm to resist at least a portion of the moment;
  a shoulder with which the upper arm is rotatably connected, wherein the upper arm generates a second moment at a junction of the upper arm and the shoulder;
  a second spring, wherein the second spring applies a counter-force to resist at least a portion of the second moment;
  a pitch gimbal mechanism pivotable based on pitch movement of the upper arm at the shoulder; and
  a yaw gimbal mechanism pivotable based on yaw movement of the upper arm at the shoulder.

2. The mechanical arm of claim 1, wherein:
  the upper arm is adapted to lift a payload, whereby the first moment is increased by the payload; and
  the first spring is adjustable to adjustably apply a counter-force to balance the first moment.

3. The mechanical arm of claim 2, wherein the first spring is adjustable to adjustably apply a counter-force to balance the first moment when the first moment is increased or decreased.

4. The mechanical arm of claim 2, further comprising:
  a first spring adjustment device to alter a response characteristic of the first spring; and
  wherein the first moment is selectively balanced by adjusting the first spring with the first spring adjustment device.

5. The mechanical arm of claim 4, wherein:
  the first spring adjustment device is a first movable carriage;
  the first spring is fixedly connected with the first movable carriage; and
  a stiffness of the first spring changes with a position of the first movable carriage.

6. The mechanical arm of claim 1, wherein:
  one or both of the upper arm and the forearm is adapted to lift a payload, whereby the second moment is increased by the payload;
  the second spring is adjustable to adjustably apply a counter-force to balance the second moment.

7. The mechanical arm of claim 6, wherein the second spring is adjustable to adjustably apply a counter-force to balance the second moment when the second moment is increased or decreased.

8. The mechanical arm of claim 6, further comprising:
a second spring adjustment device to alter a response characteristic of the second spring; and
wherein the second moment is selectively balanced by adjusting the second spring with the second spring adjustment device.

9. The mechanical arm of claim 8, wherein:
the second spring adjustment device is a second movable carriage;
the second spring is fixedly connected with the second movable carriage; and
a stiffness of the second spring changes with a position of the second movable carriage.

10. The mechanical arm of claim 1, further comprising:
a pitch gimbal mechanism to adjust a connection of the tension member to the first spring based on pitch movement of the forearm at the upper arm.

11. A mechanical arm comprising:
a forearm adapted to support a payload;
an upper arm rotatably connected with the forearm, wherein a first moment is generated at a connection of the forearm and the upper arm;
wherein the forearm is moveable in a yaw motion or a pitch motion relative to the upper arm;
a first spring;
a link rotatably connected with the upper arm at a first end and connected to the first spring at a second end by a tension member;
a copy device copying the first moment to the link, wherein the first spring applies a first counter-force to the tension member to resist at least a portion of the first moment copied to the link;
wherein the link is moveable in a yaw motion or a pitch motion relative to the upper arm in response to a corresponding yaw motion or pitch motion of the forearm;
a shoulder with which the upper arm is rotatably connected, wherein the upper arm generates a second moment at a junction of the upper arm and the shoulder;
a second spring, wherein the second spring applies a second counter-force to resist at least a portion of the second moment;
a first cable gimbal to adjust an orientation of the first tension member relative to the first spring based on one or both of yaw movement and pitch movement of the link; and
a second cable gimbal pivotable relative to the second spring based on pitch movement of the upper arm at the shoulder.

12. The mechanical arm of claim 11, wherein the first spring is adjustable to adjustably apply a counter-force to balance the first moment when the first moment is increased or decreased.

13. The mechanical arm of claim 12, further comprising:
a first spring adjustment device to alter a response characteristic of the first spring; and
wherein the first moment is selectively balanced by adjusting the first spring with the first spring adjustment device.

14. The mechanical arm of claim 13, wherein:
the first spring adjustment device is a first movable carriage;
the first spring is fixedly connected with the first movable carriage; and
a stiffness of the first spring changes with a position of the first movable carriage.

15. The mechanical arm of claim 11, wherein the second spring is adjustable to adjustably apply a counter-force to balance the second moment when the second moment is increased or decreased.

16. The mechanical arm of claim 15, further comprising:
a second spring adjustment device to alter a response characteristic of the second spring; and
wherein the second moment is selectively balanced by adjusting the second spring with the second spring adjustment device.

17. The mechanical arm of claim 16, wherein:
the second spring adjustment device is a second movable carriage;
the second spring is fixedly connected with the second movable carriage; and
a stiffness of the second spring changes with a position of the second movable carriage.

* * * * *